US012776097B2

(12) United States Patent
Deixler et al.

(10) Patent No.: US 12,776,097 B2
(45) Date of Patent: Oct. 27, 2026

(54) LIGHTING VIRTUALIZATION

(71) Applicant: SIGNIFY HOLDING B.V., Eindhoven (NL)

(72) Inventors: Peter Deixler, Arlington, MA (US); Sara Shishehchi, Belmont, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 168 days.

(21) Appl. No.: 18/675,482

(22) Filed: May 28, 2024

(65) Prior Publication Data

US 2024/0412451 A1 Dec. 12, 2024

Related U.S. Application Data

(60) Provisional application No. 63/471,674, filed on Jun. 7, 2023.

(30) Foreign Application Priority Data

Jun. 20, 2023 (EP) .................................... 23180383

(51) Int. Cl.
*G06T 15/50* (2011.01)
*G06N 3/0475* (2023.01)

(52) U.S. Cl.
CPC ......... *G06T 15/506* (2013.01); *G06N 3/0475* (2023.01)

(58) Field of Classification Search
None
See application file for complete search history.

(56) References Cited

U.S. PATENT DOCUMENTS

| | | | |
|---|---|---|---|
| 2020/0104432 A1 | 4/2020 | Harrison et al. |
| 2020/0380652 A1 | 12/2020 | Olaleye et al. |
| 2022/0157012 A1 | 5/2022 | Ghosh et al. |

FOREIGN PATENT DOCUMENTS

WO 2019149888 A1 8/2019

OTHER PUBLICATIONS

Ren et al.,Data-driven Digital Lighting Design for Residential Indoor Spaces, ACM Transactions on Graphics, vol. 42, No. 3, Article 28. Publication date: Mar. 2023 (Year: 2023).*

(Continued)

*Primary Examiner* — Kee M Tung
*Assistant Examiner* — Biao Chen

(57) ABSTRACT

A lighting appearance virtualization method includes receiving a user image of an area, luminaire information, and light appearance information. The method further includes generating, using a trained GAN, a first synthetic image based on the user image and the luminaire information. The first synthetic image shows the luminaire in the area. The method also includes generating, using a derived GAN, a second synthetic image based on the first synthetic image. The second synthetic image shows the luminaire and a synthetic light appearance associated with the luminaire. The trained GAN is modified to derive the derived GAN, where value(s) of one or more parameters of the derived GAN are different from value(s) of the one or more corresponding parameters of the trained GAN. The synthetic light appearance depends on the values of the one or more parameters of the derived GAN.

20 Claims, 32 Drawing Sheets

(56) References Cited

OTHER PUBLICATIONS

Cherepkov et al., Navigating the GAN Parameter Space for Semantic Image Editing, arXiv.org, arXiv:2011.13786v3 [cs.LG] Apr. 21, 2021 (Year: 2021).*

Edmund, Laser Beam Shaping Overview, archive.org, https://web.archive.org/web/20230309201922/https://www.edmundoptics.com/knowledge-center/application-notes/optics/laser-beam-shaping-overview/ (Year: 2023).*

Unity, Micro Shadows, https://docs.unity3d.com/Packages/com.unity.render-pipelines.high-definition@12.1/manual/Override-Micro-Shadows.html (Year: 2021).*

Xia et al., GAN Inversion: A Survey, IEEE Transactions on Pattern Analysis and Machine Intelligence, vol. 45, No. 3, Mar. 2023 (Year: 2023).*

Karras et al., A Style-Based Generator Architecture for Generative Adversarial Networks, arXiv.org, arXiv:1812.04948v3 [cs.NE] Mar. 29, 2019 (Year: 2019).*

Bhattad, Anand, et al., "Stylitgan: Prompting Stylegan to Produce New Illumination Conditions," arxiv.org, Cornell University Library, 201 Olin Library Cornell University Ithaca, NY, May 1, 2023 (11 pages).

Bhattad, Anand, et al., "Stylitgan: Prompting Stylegan to Produce New Illumination Conditions," https://anandbhattad.github.io/stylitgan/, arxiv.org, Cornell University. Library, May 2023 (11 pages).

* cited by examiner

LIGHTING VIRTUALIZATION

CROSS-REFERENCE TO RELATED APPLICATIONS

This patent application claims the priority benefit of U.S. Provisional Patent Application No. 63/471,674, filed on Jun. 7, 2023 and European Patent Application No. 23180383.4, filed on Jun. 20, 2023, the contents of which are herein incorporated by reference.

FIELD OF THE INVENTION

The present disclosure relates generally to lighting, and more particularly to artificial intelligence (AI) based lighting virtualization.

BACKGROUND OF THE INVENTION

Consumers and some lighting designers often purchase light fixtures for a particular space, such as a living room, a kitchen, a bedroom, etc., by guessing the spatial light appearance that will be provided by the light fixtures. Such an approach can sometimes lead to a disappointment in the actual lighting appearance provided by the purchased light fixtures once installed and lit up in the room. For example, the actual lighting appearance of the light provided by light fixtures may not match a consumer's expectations. To illustrate, brightness level, beam width, color temperature, crispness, uniformity of intensity within the beam, etc. of the light provided by one or more light fixtures may constitute and affect the light appearance provided by one or more light fixtures in view of their installation location. Thus, a solution that provides lighting virtualization to estimate the lighting appearance provided by one or more light fixtures prior to purchase and/or installation may be desirable.

SUMMARY OF THE INVENTION

The present disclosure relates generally to lighting, and more particularly to AI based lighting virtualization. In an example embodiment, a computer implemented lighting appearance virtualization method includes receiving a user image of an area, luminaire information of one or more luminaires including a luminaire, installation location(s) of the luminaire, and light appearance information. The method further includes generating, using a trained GAN, a first synthetic image of the area based on the user image and the luminaire information, where the first synthetic image shows the luminaire in the area. The method also includes generating, using a derived GAN, a second synthetic image of the area based on the first synthetic image, where the second synthetic image of the area shows the luminaire and a synthetic light appearance associated with the luminaire in the area, where the light appearance information is related to one or more parameters of the trained GAN, where the trained GAN is modified to derive the derived GAN, where one or more values of one or more parameters of the derived GAN are different from one or more values of the one or more parameters of the trained GAN, where the one or more parameters of the trained GAN correspond to the one or more parameters of the derived GAN, and where the synthetic light appearance depends on the one or more values of the one or more parameters of the derived GAN.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

Figure 1:
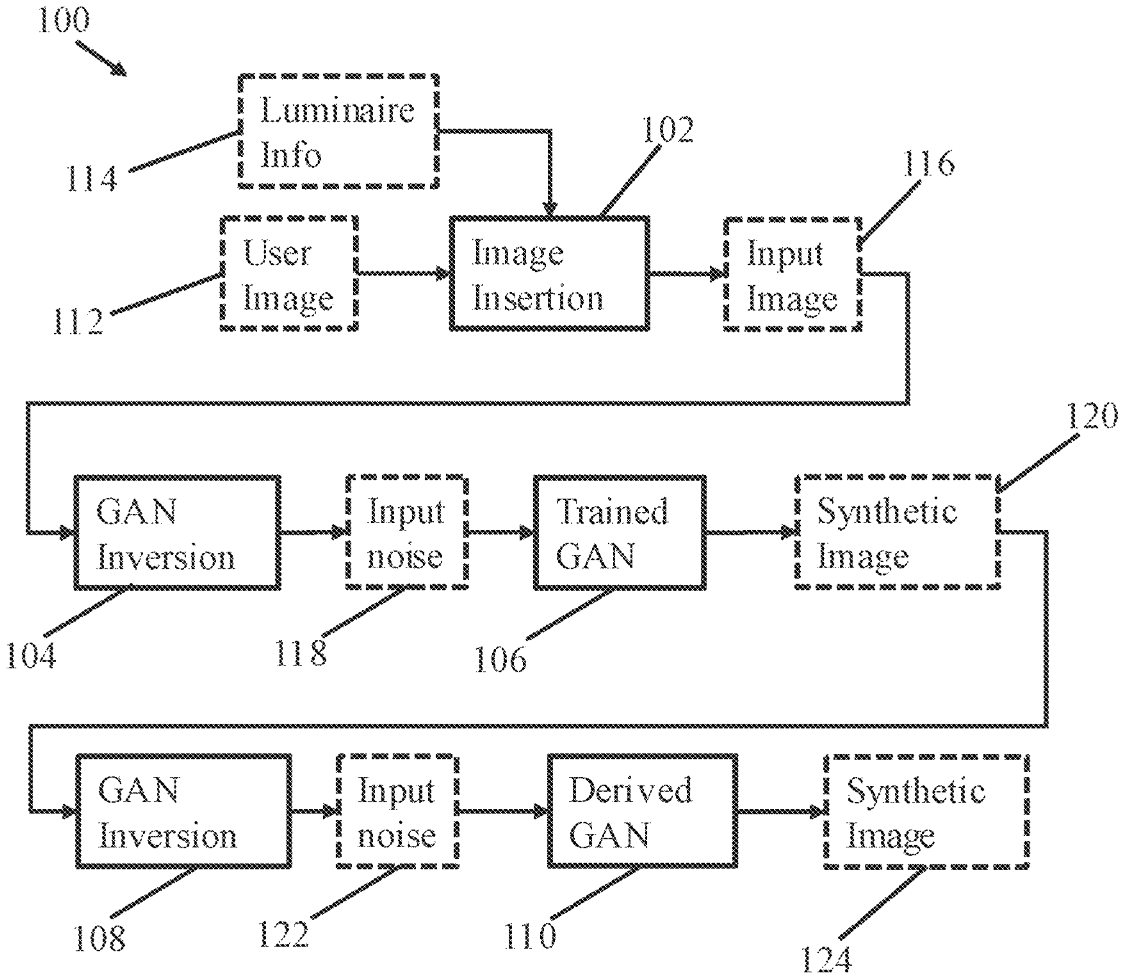
FIG. 1 illustrates a lighting virtualization system according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings may designate like or corresponding but not necessarily identical elements.

DETAILED DESCRIPTION

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, a GAN may be trained to generate an image (i.e., a synthetic image) that includes structures, objects, animate subjects and synthetic light appearances. For example, a GAN may generate a synthetic image of a room that has structures such as walls, objects such as furniture and one or more luminaires, and synthetic light appearances associated with the one or more luminaires. A synthetic light appearance as used herein generally refers to a light rendered in a synthetic image generated by a GAN as well as the rendered light being on or off, a luminaire associated with the light (i.e., the source of the rendered light) appearing lit or unlit, one or more characteristics of the rendered light such as light beam size and/or shape, light intensity level, color, correlated color temperature (CCT), edge sharpness, polarization, and/or other light characteristics, and/or one or more lighting effects such as micro-shadows on a surface such as a wall. In general, some feature maps of a generator of a GAN may be related to a particular structure or object in the synthetic image. Some feature maps of a generator of a GAN may be related to synthetic light appearances in the synthetic image. To illustrate, a feature map that is related to a synthetic light appearance in the synthetic image may have a precise causal relationship with the synthetic light appearance such that changes in a channel of the feature map, i.e., changes in a neural unit of the feature map, may result in specific changes in the synthetic light appearance without adversely affecting other elements of the synthetic image. For example, changing weight(s), bias(es), activation function(s), and/or input parameter(s) of a neural unit of a layer of a generator of a trained GAN may result in a different synthetic light appearance than the synthetic light appearance produced by the trained GAN without such change(s) to the neural unit.

In some example embodiments, a trained GAN that is trained to generate synthetic images of a space including objects, subjects, (e.g., a person and a pet) and a synthetic light appearance may be modified to derive another GAN (i.e., a derived GAN) by modifying a unit of the trained GAN. That is, the trained GAN may be modified and saved/stored as the derived GAN. For example, a trained GAN may be modified to derive a derived GAN by changing one or more weights of a layer (e.g., a convolutional layer) of a generator of the trained GAN. That is, the derived GAN may correspond to the trained GAN except, for example, having one or more values of one or more weights that are different from the one or more values of the corresponding one or more weights of the trained GAN. As another example, a trained GAN may be modified to derive a derived GAN by changing one or more input parameters of a layer (e.g., input parameter(s) of an adaptive instance normalization (AdaIN) layer or input parameter(s) of an affine transformation layer that outputs one or more input parameters provided to the AdaIN layer) of a generator of a trained GAN. Because the derived GAN is derived from the trained GAN, the derived GAN may operate in the same manner as the trained GAN and generate a synthetic image as the trained GAN except in relation to the changes to the weight(s) and/or input parameter(s).

In some example embodiments, a trained GAN may be modified based on a user input to generate a derived GAN such that the derived GAN can generate a synthetic image that shows a space (e.g., a room), a subject (e.g., a person or a pet), and a luminaire with an associated synthetic light appearance. For example, the synthetic image may be generated by the derived GAN based on one or more user inputs that include an image of a room, an image or description of one or more luminaires, an image or description of a subject, and a description of a desired light appearance such as light being on, light intensity level (or dim level), one or more of a beam shape, a beam width, polarization, color, CCT, level of micro-shadows on surfaces, etc. To illustrate, a trained GAN that is trained to generate a synthetic image of a space with synthetic light appearances may be modified based on a desired light appearance indicated by a user such that the derived GAN generates a synthetic image that includes a synthetic light appearance that matches or that is otherwise based on the desired light appearance.

In some example embodiments, a synthetic image may include one or more lighting artifacts. In general, the term lighting artifact refers to an unrealistic light appearance(s) in a synthetic image. For example, a light source of the light fixture in a synthetic image appears as a black hole to represent an unlit light source. As another example, a lampshade of a light fixture may be rendered as a black shade to show an unlit light fixture. As yet another example, a light appearance corresponding to a lit-up luminaire on each side of a bed in a synthetic image although the synthetic image includes a single bedside luminaire that is on one side of the bed. As yet another example, although a proper light appearance may include a near field effect (e.g., light on a nearby wall) and a far field effect (e.g., light on a ceiling), a lighting artifact may be that the near field effect or the far field effect is not rendered. In general, lighting artifacts are undesirable in synthetic images. In some cases, a GAN may be derived in the same manner as described with respect to light appearances such that the GAN can generate synthetic images with suppressed lighting artifacts.

FIG. 1 illustrates a lighting virtualization system 100 according to an example embodiment. In some example embodiments, the lighting virtualization system 100 includes an image insertion module 102, a GAN inversion module 104, a trained GAN 106, a GAN inversion module 108, and a derived GAN 110. For example, the image insertion module 102, the GAN inversion module 104, the trained GAN 106, the GAN inversion module 108, and the derived GAN 110 may each be a software module that can be stored in a memory device and executed by a processor, such a microprocessor, of a user device and/or a server such as a local network server or a cloud server. A user device and/or a server shown in FIG. 31 may be used to execute the image insertion module 102, the GAN inversion module 104, the trained GAN 106, the GAN inversion module 108, the derived GAN 110 as well as other operations described herein with respect to the lighting virtualization system 100 of FIG. 1. In FIG. 1, modules that are executed as part of the operation of the lighting virtualization system 100 are shown in a respective solid box, and inputs and outputs of the modules are shown in a respective dotted box for clarity of illustration.

Figure 6:
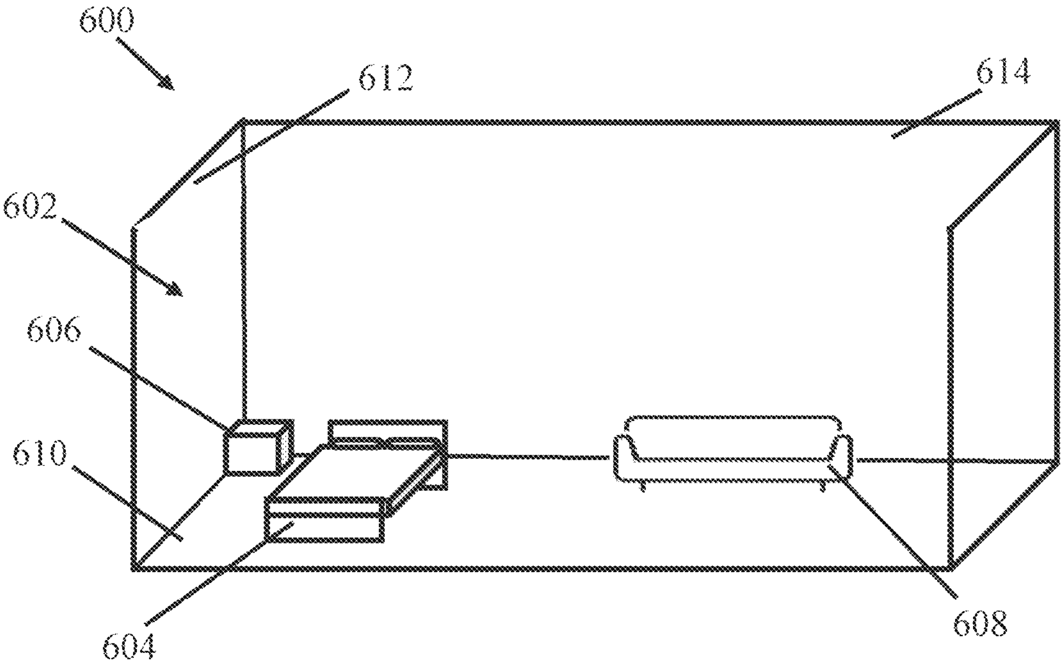
FIGS. 6-9 illustrate images of a user space at different stages of lighting virtualization operations according to an example embodiment.
Figure 10:
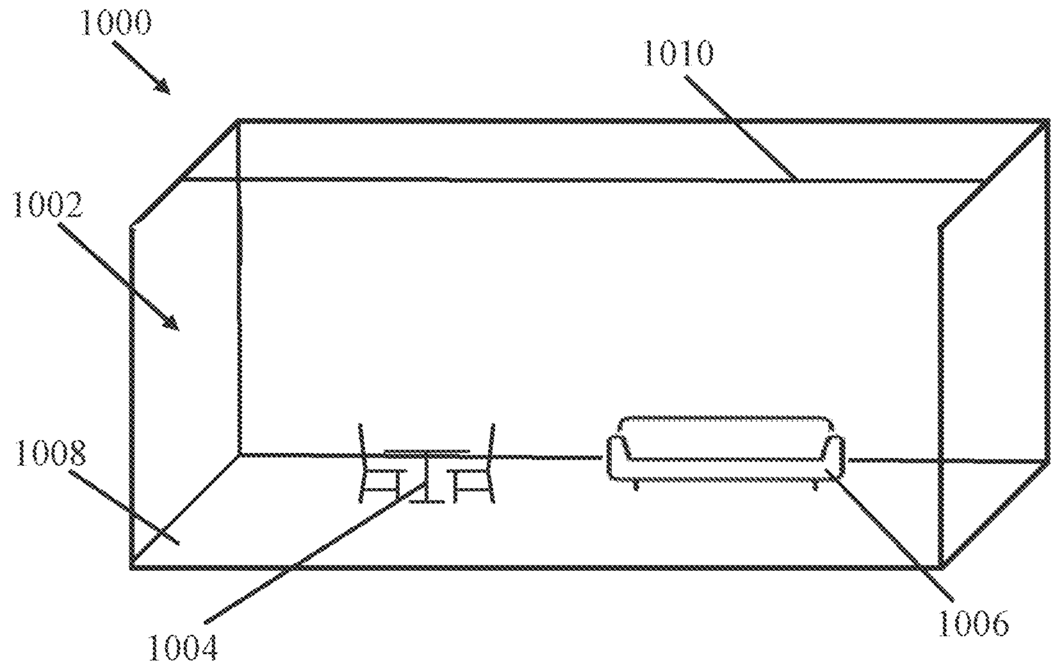
FIGS. 10-13 illustrate images of a user space at different stages of lighting virtualization operations according to another example embodiment.

In some example embodiments, the image insertion module 102 is designed to insert an object or subject (e.g., one or more persons and/or one or more pets) in image, for example, at a location indicated by a user. In general, the image insertion module 102 operates as an object insertion tool to insert an object in an image in a manner known by those of ordinary skill in the art. As shown in FIG. 1, the image insertion module 102 may receive a user image 112. For example, the user image 112 may be an image of a room, another type of indoor space, or an outdoor space. FIGS. 6 and 10 show example images of a room that may be provided to the image insertion module 102, for example, by a user, such as a consumer or a lighting designer. To illustrate, a user may use a user device, such has a mobile phone, a tablet, a laptop, or another camera device, to receive or capture the user image 112 and/or to provide the user image 112 as input to the image insertion module 102. For example, the user image 112 may be a color image, a black and white image, or an infrared image, a hyperspectral image, or a grayscale image.

In some example embodiments, the image insertion module 102 may receive luminaire information 114 that includes, for example, an image of a luminaire. For example, the luminaire information may include an image of a luminaire in a page of a store catalog or in a picture taken by a person. Alternatively or in addition, the luminaire information may include a description of a luminaire such as the type of luminaire. For example, a user may describe a luminaire as one or more of a ceiling recessed luminaire, a pendant, a chandelier, a floor lamp, a troffer, spotlight, table shade lamp, a down light, etc. As another example, the user may provide a stock keeping unit ("SKU") number or another identifier, and the user device may retrieve an image of the luminaire from a database based on the SKU number or the other identifier.

In some example embodiments, the image insertion module 102 may insert the luminaire shown in or described by the luminaire information in the user image 112, for example, at a location in the user image 112 indicated by the user. For example, the user may provide coordinates or may use a cursor to indicate the location in the user image 112 for the insertion of the luminaire in the user image 112. The image insertion module 102 may insert the luminaire in the user image 112 at the indicated location and generate an input image 116 that shows, for example, the room in the user image 112 and the luminaire at the indicated location in the room. For example, the image insertion module 102 may display the input image 116 on a display screen of the user device or in an augmented reality/virtual reality (AR/VR) headset. The image insertion module 102 or another module may request the user for approval of the input image 116 before providing the input image 116 for subsequent operations. If the user disapproves the input image 116, the object insertion operation may be repeated by the image insertion module 102 until the user approves the input image 116. If the user approves the input image 116, the input image 116 may be provided to the GAN inversion module 104. Before approving, the user may for instance request to remove a privacy sensitive item from the input image so that he can for instance share the image with a lighting designer advising him on the lighting upgrade of the room, and the privacy sensitive item may be deleted before proceeding. Alternatively, the input image 116 may be provided to the GAN inversion module 104 without the approval of the input image 116 by the user.

In some example embodiments, the luminaire information 114 may include an image of multiple luminaires (e.g., two luminaires) of the same or different type, multiple images of luminaires (e.g., two images that each show a single luminaire). For example, the image insertion module 102 may insert two luminaires in the user image 112 at respective locations indicated by the user such that the input image 116 shows, for example, the room shown in the user image 112 and the two inserted luminaires at the respective locations in the room.

In some example embodiments, the trained GAN 106 may be used to generate a synthetic image 120 based on the input image 116. To generate the synthetic image 120 by the trained GAN 106 such that the synthetic image 120 closely matches the input image 116 and thus closely represents the user image 112, the GAN inversion module 104 may determine from the input image 116 an input noise vector 118 that is provided to the trained GAN 106. To illustrate, using the input image 116, the GAN inversion module 104 may perform mapping of the input image 116 backward through the trained GAN 106 to identify the input noise vector 118 in a manner known by those of ordinary skill in the art. The input noise vector 118 may correspond to a latent space that can be used to provide a noise input at the input layer and/or another layer of a generator of the trained GAN 106.

In some example embodiments, the input noise vector 118 is provided to the trained GAN 106 that uses the input noise vector 118 to generate the synthetic image 120 of a space such as a room in the input image 116 and the user image 112 as well as one or more luminaires inserted in the room by the image insertion module 102. For example, the trained GAN 106 may have been trained using training images to generate synthetic images of rooms or other spaces that include structures (e.g., walls, a ceiling, pillars, and windows), objects (e.g., one or more types of luminaires, furniture, and appliances), subjects (e.g., persons, pets) and synthetic light appearances (e.g., light on or off, different light beam sizes and shapes, light intensity levels, colors, correlated color temperatures (CCTs), polarization, level of micro-shadows, light edge sharpness levels, and other light characteristics).

In general, the trained GAN 106 may have been trained such that the trained GAN 106 renders a particular synthetic light appearance in the synthetic image 120 based on the location of the luminaire associated with the synthetic light appearance (i.e., based on the location of the luminaire in the space (e.g., a room) shown in the synthetic image 120, where the luminaire is shown as providing a synthetic/rendered light of the synthetic light appearance). Alternatively or in addition, the trained GAN 106 may have been trained such that the synthetic light appearance in the synthetic image 120 depends on the location of the luminaire in a room shown in the synthetic image 120. For example, the synthetic light appearance may depend on whether the luminaire is in a kitchen, a bedroom, a hallway, at a corner, etc. Alternatively or in addition, the trained GAN 106 may have been trained such that the synthetic light appearance in the synthetic image 120 depends on the type of luminaire in a room shown in the synthetic image 120. Alternatively or in addition, the trained GAN 106 may have been trained such that the synthetic light appearance in the synthetic image 120 depends on the geolocation of the room. For example, a downlight installed in Asia usually has cool color temperatures while an identically looking downlight in Europe most likely will utilize a warm white light engine.)

In some alternative embodiments, the trained GAN 106 may have been trained using training images that include one type of luminaire and exclude another type of luminaire. In some alternative embodiments, the trained GAN 106 may have been trained using training images that show a light appearance (e.g., a narrow beam width or a warm CCT) provided by a luminaire and exclude another light appearance (e.g., a wide beam width or a cool CCT) provided by a luminaire. Using the input noise vector 118 derived based on the input image 116, the trained GAN 106 may generate the synthetic image 120 that shows a room and one or more luminaires in the room, where the room and the one or more luminaires shown in the synthetic image 120 correspond to a room and one or more luminaires shown in the input image 116, respectively.

In some example embodiments, the synthetic image 120 may be provided to the user, for example, by displaying the synthetic image 120 on a display interface of a user device. For example, the synthetic image 120 may be provided to a user for approval of the synthetic image 120 before proceeding with other operations that use the synthetic image 120. If the synthetic image 120 is disapproved by the user, the synthetic image 120 may be regenerated starting back with the image insertion module 102, the GAN inversion module 104, or the trained GAN 106. If the user approves the synthetic image 120, the synthetic image 120 may be provided to the GAN inversion module 108. Alternatively, the synthetic image 120 may be provided to the GAN inversion module 108 without requesting and/or receiving the approval of the synthetic image 120 by the user.

In some example embodiments, the GAN inversion module 108 may determine from the synthetic image 120 an input noise vector 122 that is provided to the derived GAN 110. To illustrate, using the synthetic image 120, the GAN inversion module 108 may perform mapping of the synthetic image 120 backward through the derived GAN 110 to identify the input noise vector 122 in a manner known by those of ordinary skill in the art. The input noise vector 122 may correspond to a latent space that can be used to provide a noise input at the input layer and/or another layer of a generator of the derived GAN 110.

In some example embodiments, the input noise vector 122 is provided to the derived GAN 110 that uses the input noise vector 122 to generate the synthetic image 124 of, for example, a room shown in the synthetic image 120 and corresponding to the room in the input image 116 and the user image 112. The synthetic image 124 may also include the one or more luminaires that are in the synthetic image 120 and that correspond to the one or more luminaires inserted in the user image 112 by the image insertion module 102 as described above. In some alternative embodiments, the GAN inversion module 108 may be omitted or skipped, and, instead of the input noise vector 122, the input noise 118 determined by the GAN inversion module 104 may be used as input noise vector to the derived GAN 110. For example, in some example embodiments, the user may make changes to the synthetic image 120 before approving the synthetic image 120. If the user approves the synthetic image 120 without making changes, the input noise 118 generated based on the input image 116 may be used as input noise vector to the derived GAN 110.

In some example embodiments, the synthetic image 124 generated by the derived GAN 110 may include one or more synthetic light appearances that are associated with one or more luminaires included in the synthetic image 124. To illustrate, the derived GAN 110 may be derived from the trained GAN 106 by changing one or more values of a neural unit of a layer of a generator of the trained GAN 106 and saving/storing the resulting modified trained GAN as the derived GAN 110. For example, the trained GAN 106 may be modified to derive the derived GAN 110 by changing one or more weights of a layer (e.g., a convolutional layer) of a generator of the trained GAN 106 and/or by changing one or more input parameters of a layer (e.g., an AdaIN layer or an affine transformation layer that generates one or more outputs that are provided to the AdaIN layer) of the generator of the trained GAN 106. The particular weights and/or input parameters of the trained GAN 106 that are changed to derive the derived GAN 110 may have a precise causal relationship with one or more synthetic light appearances that can be included in the synthetic image 120. That is, the difference between the trained GAN 106 and the derived GAN 110 may be in the values of corresponding weights and/or input parameters of the trained GAN 106 and the derived GAN 110. Thus, the weights and/or input parameters of the derived GAN 110 corresponding to the weights and/or input parameters of the trained GAN 106 that may be modified to derive the derived GAN 110 may have a precise causal relationship with one or more synthetic light appearances that can be included in the synthetic image 124. That is, synthetic light appearances in the synthetic image 124 may depend on the particular values of the weights and/or input parameters of the derived GAN 110 that are different from the values of the corresponding weights and/or input parameters of the trained GAN 106. Indeed, particular one or more weights and/or input parameters of the trained GAN 106 may be selected for changing their respective value(s) to produce one or more desired synthetic light appearances in the synthetic image 124 by the derived GAN 110.

Weights, input parameters, and other elements of the trained GAN 106 that are modifiable (i.e., that have changeable values) and that have a precise causal relationship with one or more synthetic light appearances that can be included in the synthetic image 120 may generally be referred to individually as a parameter of the trained GAN 106. As described above, because the derived GAN 110 is derived from the trained GAN 106 by changing one or more values of one or more parameters of the trained GAN 106, the weights, input parameters, and other elements of the derived GAN 110 that correspond to the modifiable weights, input parameters, and other elements of the derived GAN 110 have a precise causal relationship with one or more synthetic light appearances that can be included in the synthetic image 124. Such weights, input parameters, and other elements of the derived GAN 110 may generally be referred to individually as a parameter of the derived GAN 110.

Figure 2:
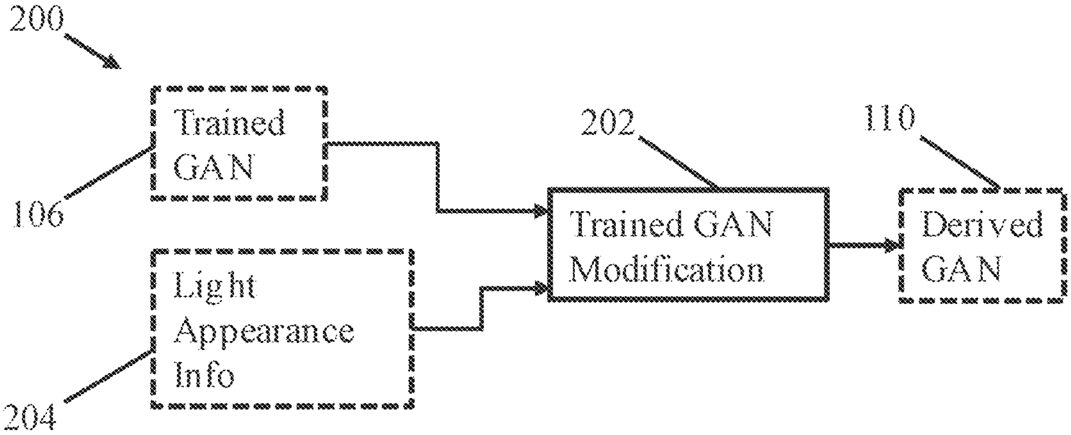
FIG. 2 illustrates a generative adversarial network (GAN) modification system according to an example embodiment.

In some example embodiments, the trained GAN 106 is modified to derive the derived GAN 110 based on light appearance information. FIG. 2 illustrates a GAN modification system 200 according to an example embodiment. Referring to FIGS. 1 and 2, in some example embodiments, the GAN modification system 200 may include a GAN modification module 202 that modifies the trained GAN 106 based on light appearance information 204 to derive the derived GAN 110. For example, the light appearance information 204 may be provided by a user that provides the user image 112 and the luminaire information 114 that are used by the lighting virtualization system 100 of FIG. 1 to ultimately generate the synthetic image 124.

In some example embodiments, a user may provide the light appearance information 204 and the luminaire information 114 as a single input as text, voice command, and/or an image. For example, the user may use voice or text to state, "Place SKU # luminaire set to 2700K and dimmed to 30% of 600 lumens." Similarly, the user may specify "Place the same luminaire as in Tom Brady's bedroom in Vogue in my room and dim it to reading light setting". The light appearance information 204 may indicate a desired light appearance (e.g., narrow beam width and 800 lux) the user wants in the synthetic image 124. The light appearance information 204 may be related to the particular one or more parameters of the trained GAN 106 such that changing the values of the one or more parameters results in the synthetic light appearance closely matching the desired light appearance indicated by the light appearance information 204.

To illustrate, to achieve a synthetic light appearance in the synthetic image 124 that closely matches/corresponds to the desired light appearance indicated by the light appearance information 204, particular one or more parameters of the trained GAN 106 that have a precise causal relationship with the desired specific light appearance (e.g., narrow beam width, wide beam width, 50% percent dim level) or a category of the desired light appearance (e.g., a beam width, a CCT, an intensity or dim level, a polarization, a crispness of the white light) may be modified to derive the derived GAN 110. That is, one or more parameters of the trained GAN 106 may be modified, thereby deriving the derived GAN 110 having the one or more corresponding parameters with the new value(s). Executing the derived GAN 110, which has the parameters corresponding to the relevant parameters of the trained GAN 106 but with different values, may result in the synthetic image 124 showing a synthetic light appearance that closely matches the desired light appearance. To be clear, the trained GAN 106 in FIG. 1 retains its original/unaltered values of the parameters, and the derived GAN 110 has the corresponding parameters with changed/new values.

In some example embodiments, the GAN modification module 202 can generate the derived GAN 110 based on a particular desired light appearance indicated by the light appearance information 204. For example, the GAN modification module 202 may generate the derived GAN 110 designed to render a narrow beam width in the synthetic image 124. As another example, the GAN modification module 202 may generate the derived GAN 110 designed to render a wide beam width in the synthetic image 124. As another example, the GAN modification module 202 may generate the derived GAN 110 designed to render a particular dim level (e.g., off, 10%, 50%, 75%, 100%) in the synthetic image 124 based on a dim level indicated by the light appearance information 204. Alternatively, the GAN modification module 202 may generate the derived GAN 110 that can render a dim level that is brighter than indicated by the light appearance information 204. To illustrate, if the light appearance information 204 indicates maximum brightness level of a particular maximum lumen output expected from a luminaire, the GAN modification module 202 may generate the derived GAN 110 such that the derived GAN 110 renders the synthetic light appearance (i.e., the brightness level) brighter (e.g., 10% brighter) than indicated by the light appearance information 204. Such an operation, for example, may ensure that the user can more easily recognize the sub-region illuminated by the luminaire.

In some example embodiments, if a desired dim level is not indicated by the light appearance information 204, the GAN modification module 202 may generate the derived GAN 110 such that one or more parameters of the derived GAN 110 that have a precise causal relationship with dim level in the synthetic image 124 have unaltered value(s) (i.e., same values as the corresponding parameters of the trained GAN 106) such that the derived GAN 110 renders a dim level based on training of the trained GAN 106 from which the derived GAN 110 is derived. Alternatively, if a desired dim level is not indicated by the light appearance information 204, the GAN modification module 202 may generate the derived GAN 110 that can render a dim level that is brighter than the dim level that would be generated strictly based on the training of the trained GAN 106. Alternatively, if the intensity level is not specified, the derived GAN 110 can generate a random intensity level.

In some example embodiments, the GAN modification module 202 may generate the derived GAN 110 designed to render a warm CCT in the synthetic image 124 based on the desired light appearance indicated by the light appearance information 204. As yet another example, the GAN modification module 202 may generate the derived GAN designed to render a cool CCT in the synthetic image 124 based on the desired light appearance indicated by the light appearance information 204. In general, the desired light appearance indicated by the light appearance information 204 may include one or more desired lighting appearances such as light from luminaire on or off, light beam size and/or shape, light intensity level, color, CCT, polarization, level of micro-shadows, light edge sharpness level, and/or other light characteristics, and the derived GAN 110 may render synthetic light appearances that closely match the desired light appearances.

In some example embodiments, the GAN modification module 202 may generate multiple derived GANs including the derived GAN 110 based on different desired light appearances prior to receiving a desired light appearance from a user. Upon receiving the light appearance information 204 from a user indicating a desired light appearance, the derived GAN 110 or another one of the multiple derived GANs may be selected based on the light appearance information 204 to render a synthetic light appearance in the synthetic image 124 that closely matches/corresponds to the desired light appearance indicated by the synthetic image 124.

In some example embodiments, the trained GAN 106 may be selected from among multiple trained GANs based on a desired light appearance indicated by the light appearance information 204. To illustrate, one trained GAN (e.g., the derived GAN 110) of the multiple GANs may have been trained using training images that include a first light appearance (e.g., a light having a narrow beam width or a warm CCT) provided by a luminaire and exclude a second light appearance (e.g., a light with a wide beam width or a cool CCT) provided by a luminaire, and another trained GAN of the multiple GANs may have been trained using training images that include the second light appearance (e.g., a wide beam width or a cool CCT) and exclude first light appearance (e.g., a narrow beam width or a warm CCT).

In some example embodiments, the trained GAN 106 may be selected from among multiple trained GANs based on the type of luminaire shown in or otherwise indicated by luminaire information 114. To illustrate, one trained GAN (e.g., the derived GAN 110) of the multiple GANs may have been trained using training images that include a first type of luminaire (e.g., a spotlight luminaire) and exclude a second type of luminaire (e.g., a troffer), and another trained GAN of the multiple GANs may have been trained using training images that include the second type of luminaire (e.g., a troffer) and exclude first type of luminaire (e.g., a spotlight).

By using the user image 112 that shows an actual space (e.g., a user's room) where a user wants to use particular one or more luminaires, the lighting virtualization system 100 of FIG. 1 can generate the synthetic image 124 of the actual space that not only closely matches the user's actual space as shown in the user image 112 but also shows synthetic light appearances that closely match/correspond to the user's desired light appearances indicated by the light appearance information 204. By allowing a user to provide one or more images of one or more desired luminaires as an input, the lighting virtualization system 100 can simplify the burden on a user to indicate a desired luminaire. By performing GAN inversion to determine an input noise vector, the lighting virtualization system 100 can generate synthetic images, such as the synthetic images 120, 124, that closely represent the actual space as shown in the user image 112 and one or more luminaires that may be added by the image insertion module 102. By using the derived GAN 110 derived from the trained GAN 106 that is trained using training images to understand luminaires and related illumination within the context of the real world, the lighting virtualization system 100 can render synthetic light appearances in the synthetic image 124 without requiring photometric files (e.g., IES), luminaire 3D models, and ray-tracing simulations.

In some alternative embodiments, one or more modules of the lighting virtualization system 100 may be omitted or combined with other modules without departing from the scope of this disclosure. For example, the image insertion module 102 may be emitted, and a user may provide the input image 116 that includes an image that shows a space (e.g., a room) and one or more in the space along with other objects. In some alternative embodiments, the lighting virtualization system 100 may include additional and/or different modules than shown in FIG. 1 without departing from the scope of this disclosure. For example, a GAN inversion operation may be performed by mapping the user image 112 backward through the trained GAN 106, and the trained GAN 106 may be used to generate an initial synthetic image that closely matches the user image 112 but that does not yet include an inserted luminaire. For example, the initial synthetic image may show a room that matches the room shown in the user image 112. Subsequently, the initial synthetic image can be provided to the image insertion module 102 along with the luminaire information 114, and the image insertion module 102 may generate the input image 116 that shows the room in the initial synthetic image and one or more luminaires inserted in the room based on the luminaire information 114. The operation of the lighting virtualization system 100 may continue with the GAN inversion module 104 to ultimately generate the synthetic image 124 as described above. In some alternative embodiments, GAN inversion may be performed to determine an input noise vector in a different manner than described above without departing from the scope of this disclosure.

Figure 3:
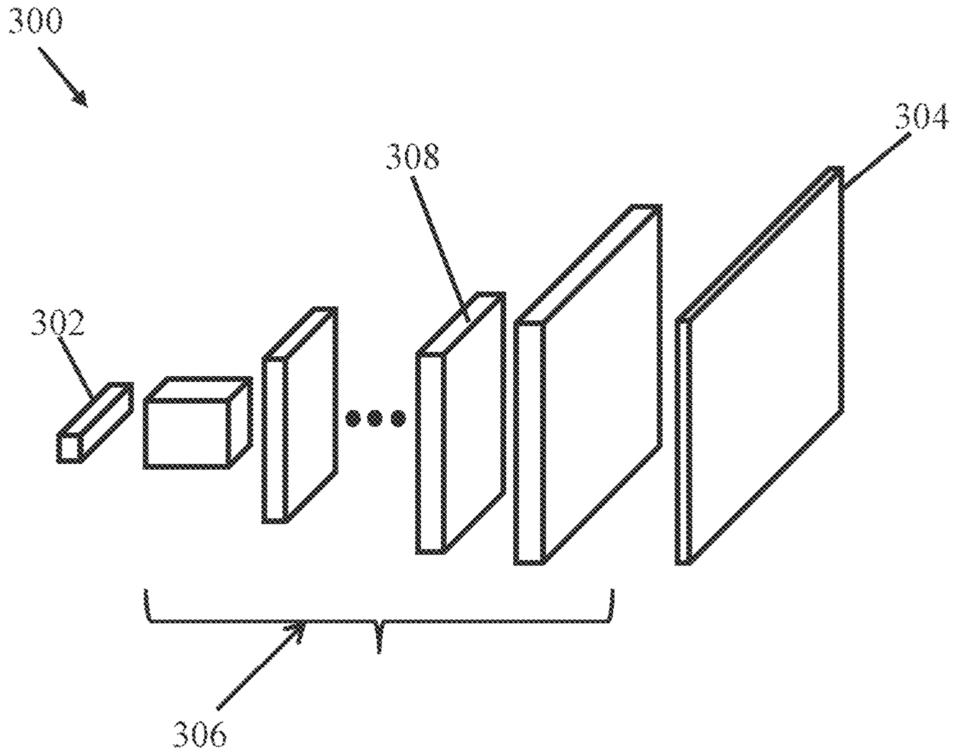
FIG. 3 illustrates a generator of a GAN according to an example embodiment.

FIG. 3 illustrates a generator 300 of a GAN according to an example embodiment. For example, the generator 300 may be a generator of the trained GAN 106 or the derived GAN 110 shown in FIG. 1. Referring to FIG. 3, in some example embodiments, the generator 300 may include an input layer 302, an output layer 304, and hidden layers 306. An input noise vector may be provided to the generator 300 at the input layer 302. The hidden layers 306 may include convolutional layers such as a convolutional layer 308. The hidden layers 306 may also include other layers such as, for example, one or more upsampling layers.

In some example embodiments, the convolutional layer 308 may include a feature map that is related to a light appearance (e.g., light intensity level, beam width, beam shape, or color) from a luminaire shown in a synthetic image generated by the generator 300. For example, a feature map in the convolutional layer 308 may have a precise causal relationship with the synthetic light appearance in the synthetic image such that changes in a channel of the feature map may result in changes in the synthetic light appearance shown in the synthetic image. In general, a channel of a feature map of a convolutional layer (i.e., a neural unit of the feature map of a convolutional layer) may refer to the feature map and a kernel of a filter of the convolutional layer. The neural unit of a feature map may also include other elements such as an activation function as can be readily understood by those of ordinary skill in the art with the benefit of this disclosure.

Figure 4A:
FIGS. 4A-4C illustrate some elements of a convolutional layer of a generator of a GAN according to an example embodiment.
Figure 4B:
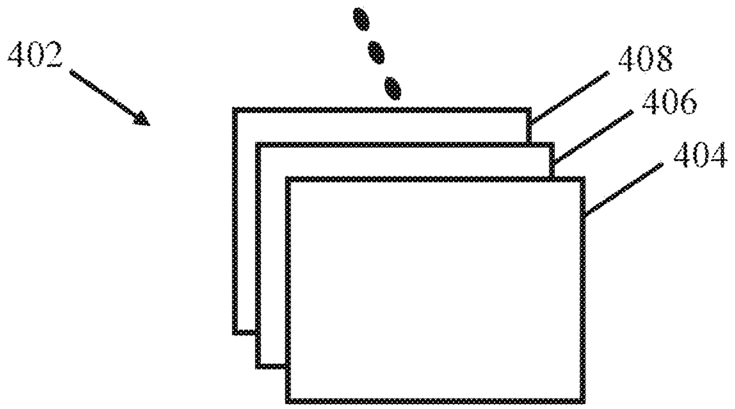
Figure 4C:
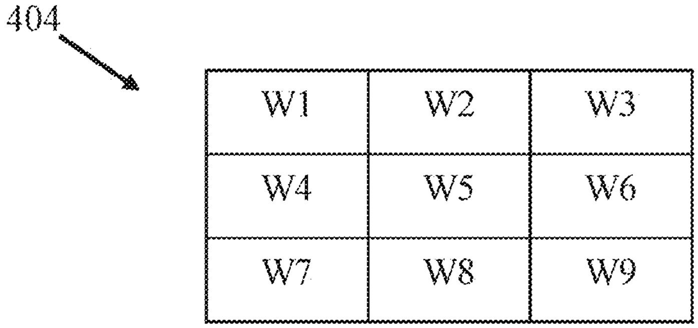

FIGS. 4A-4C illustrate some elements of a convolutional layer of a generator of a GAN model according to an example embodiment. For example, FIG. 4A illustrates a feature map 400, FIG. 4B illustrates a filter 402 that may include kernels 404, 406, 408, and FIG. 4C illustrates details of the kernel 404 of FIG. 4B. To illustrate, the feature map 400 and the filter 402 including kernels 404-408 may be elements of the convolutional layer 308 of the generator 300 of FIG. 3. As explained above, the generator 300 may be a generator of the trained GAN 106 or the derived GAN 110.

In some example embodiments, the feature map 400 and the kernel 404 may be elements of a neural unit of the feature map 400 of the convolutional layer 308 of the generator 300 of FIG. 3, where the kernel 404 is used in the convolution operation on the feature map 400. As an illustrative example, the kernel 404 may have a 3×3 dimension as shown in FIG. 4C or another dimension as can be readily understood by those of ordinary skill in the art with the benefit of this disclosure. The outcome of a convolution operation on the feature map 400 depends on the values represented of weights W1, W2, W3, W4, W5, W6, W7, W8, W9 of the kernel 404. The values of the weights of the kernel 404 and other kernels of the filter 402 may have been determined through the training of the trained GAN 106.

In some example embodiments, the neural unit of the feature map 400 may also include other elements such as an activation function as can be readily understood by those of ordinary skill in the art with the benefit of this disclosure. To be clear, the convolutional layer 308 of FIG. 3 may include other neural units in addition to the neural unit that includes the feature map 400 and the kernel 404. For example, the feature map 400 and the kernel 406 may be considered as elements of another neural unit of the convolutional layer 308. As yet another example, another feature map of the convolutional layer 308 of FIG. 3 along with a kernel of the filter 402 may be considered as elements of another neural unit of the convolutional layer 308.

Referring to FIGS. 1-4C, in some example embodiments, considering the generator 300 of FIG. 3 as the generator of the trained GAN 106 and considering the feature map 400 and the kernel 404 as elements of the convolutional layer 308 of the generator 300, the neural unit that includes the feature map 400 and the kernel 404 may be determined as having a precise causal relationship with a synthetic light appearance (e.g., light beam width) rendered as part of a synthetic image generated by the trained GAN 106 shown in FIG. 1. That is, changing the values of the weights of the kernel 404 with respect to the feature map 400 may result in a desired or otherwise a different synthetic light appearance (e.g., a wide beam width and/or a warm CCT) compared to the synthetic light appearance that may be rendered with the unaltered values of the weights of the kernel 404. To be clear, after one or more values of the weights of the kernel 404 in the trained GAN 106 have been changed, the modified trained GAN is saved/used as the derived GAN 110 and thus includes the feature map 400 and the kernel 404 having one or more weights that have different value(s) from the value(s) of the corresponding one or more weights of the kernel 404 in the trained GAN 106.

In some example embodiments, before one or more values of one or more weights of the kernel 404 can be changed to produce a desired synthetic light appearance, the neural unit of the feature map 400 that includes the kernel 404 needs to be identified as a neural unit that has a causal effect on one or more synthetic light appearances that may be rendered by the trained GAN 106 as part of a synthetic image. Indeed, one or more layers of the generator 300, such as the convolutional layer 308, that each have a precise enough causal relationship with one or more synthetic light appearances in the synthetic image generated by the trained GAN 106 need to be identified.

In some example embodiments, a particular convolutional layer and a neural unit of the convolutional layer that have a desired precision of causal relationship with a particular synthetic light appearance (e.g., intensity level or CCT) in a synthetic image generated by the trained GAN 106 may be identified through a trial-and-error process. To illustrate, considering the trained GAN 106 as having been trained to generate a synthetic image of a room that may have one or more luminaires with associated synthetic light appearance(s), an input noise vector from a latent space may be used to generate a synthetic image of a room objects such as furniture, subjects, and a luminaire and a synthetic light appearance (e.g., narrow beam width) associated with the luminaire.

To identify a convolutional layer that has one or more neural units with a precise enough causal relationship with one or more synthetic light appearances in the synthetic image, the trained GAN 106 may be dissected/split at a particular convolutional layer and a determination may be made whether changes to some outputs of the particular convolutional layer that are fed to subsequent layers make an adequate enough difference in the synthetic light appearance(s) and whether changes to other outputs of the particular convolutional layer do not make a difference in the synthetic light appearance(s). For example, the layer that is checked may be selected randomly or sequentially starting from, for example, one of the earlier layers of the hidden layers 306. Whether one or more changes to the output of the convolutional layer make an adequate difference in the synthetic light appearance(s) (e.g., adequate change in CCT, beam width, beam shape, and/or intensity level) may be determined based on user preference with respect to the amount of change observed. Different layers may be checked to identify one or more layers that have the desired precision of causal relationship with one or more synthetic light appearances in generated synthetic images.

After a particular layer (e.g., the convolutional layer 308 in FIG. 3) is identified, neural unit(s) of the particular layer that have a precise enough causal relationship with one or more synthetic light appearances without adversely altering other elements of synthetic images generated by the trained GAN 106 may be identified. To illustrate, to identify such neural unit(s) of the convolutional layer 308, synthetic light appearance(s) in synthetic images generated by the trained GAN 106 may be checked after each change to a particular neural unit of the identified layer to determine whether adequate changes in the synthetic light appearance(s) resulted from the change to the neural unit. For example, after a change to the values of the weights of the kernel 404 with respect to the feature map 400, the trained GAN 106 may be executed to generate a synthetic image and the synthetic light appearance in the synthetic image is checked for adequate difference (e.g., light from luminaire in the synthetic image is on or off, light intensity detectably increased or decreased, beam width is detectably wider or narrower, CCT is detectably warmer or cooler, etc.) compared to a synthetic image generated prior or subsequent to the change to the kernel 404. Changes in synthetic light appearances based on other neural units of the convolutional layer 308 (e.g., kernels 404-408 with respect to different feature maps including the feature map 400) and other identified layers of the generator 300 may be checked in the same manner to identify neural units that may have adequate enough causal relationship with synthetic light appearances in synthetic images generated by the trained GAN 106.

In some example embodiments, through the process described above, not only particular neural units of layers of the GAN 300 that have precise causal relationship with different synthetic light appearances may be identified, particular values of weights and other parameters (e.g., biases and/or activation function) that can result in specific synthetic light appearances (e.g., light on or off, spot light, flood light, narrow beam width (e.g., 30 degrees or less), wide beam width (e.g., 60 degrees or more), warm CCT, cool CCT, high luminosity, low luminosity, sharp light edge, blurred light edge, polarization, blue color, red color, etc.) may be determined. In general, neural units that have precise causal relationships with specific and general synthetic light appearances may be identified, and in some cases, particular values of parameters such as weights and biases that correspond to specific synthetic light appearances (e.g., a warm CCT or a wide beam) may be determined. To be clear, neural units that have the desired precision of causal relationships with different synthetic light appearances may be found in different layers of the generator 300.

In some example embodiments, after particular neural units of the generator 300 of the trained GAN 106 that have adequately precise causal relationships with synthetic light appearances have been identified, changes to one or more of the identified neural units may be made to derive the derived GAN 110 based on a desired light appearance indicated, for example, by the light appearance information 204 described above with respect to FIG. 2. For example, if the light appearance information 204 indicates that a narrow beam (e.g., 30 degrees or less) is desired, a neural unit of the generator 300 of the trained GAN 106 that has been determined to have a precise causal relationship to result in a narrow beam may be modified to derive the derived GAN 110 such that the derived GAN 110 renders a narrow beam in the synthetic image 124 that is subsequently generated. To be clear, the trained GAN 106 that is used to derive the derived GAN 110 may have unaltered values of parameters such as weights and biases that were determined during training using training images.

In some example embodiments, neural units of the generator 300 of the trained GAN 106 may be modified multiple times to derive multiple derived GANs including the derived GAN 110. For example, one of the multiple derived GANs may have values of parameters (e.g., weights of one or more kernels of one or more convolutional layers) such that the synthetic light appearance in the synthetic image generated by the particular derived GAN is a narrow beam. Another one of the derived GANs may have values of parameters such that the synthetic light appearance in the synthetic image generated by the particular derived GAN is a wide beam. Another one of the derived GANs may have values of parameters such that the synthetic light appearance in the synthetic image generated by the particular derived GAN is a warm CCT (e.g., less than 3000K). Another one of the derived GANs may have values of parameters such that the synthetic light appearance in the synthetic image generated by the particular derived GAN is a cool CCT (e.g., 4500K or higher). In some example embodiments, a particular one of the derived GANs including the derived GAN 110 may be selected based on the light appearance indicated, for example, by the light appearance information 204. That is, instead of deriving the derived GAN 110 based on the light appearance information 204 from a user, the derived GAN 110 may be selected based on the light appearance information 204 after having been derived previously based on light appearances that may be preferred by consumers.

In some alternative embodiments, the trained GAN modification module 202 may have more or different inputs than shown in FIG. 2 without departing from the scope of this disclosure. In some alternative embodiments, the GAN modification system 200 may have more or different elements than shown without departing from the scope of this disclosure. In some alternative embodiments, the generator 300 may include more or fewer elements including layers than shown in FIG. 3 without departing from the scope of this disclosure. In FIG. 3, the dimensions of the layers of the generator are not intended to suggest a particular size, relationship, and/or operation by or between the layers of the generator. In some alternative embodiments, the filter 402 shown in FIG. 4B may have more or fewer kernels than shown without departing from the scope of this disclosure. In some alternative embodiments, the kernel 404 shown in FIG. 4C may have more or fewer weights than shown without departing from the scope of this disclosure.

Figure 5:
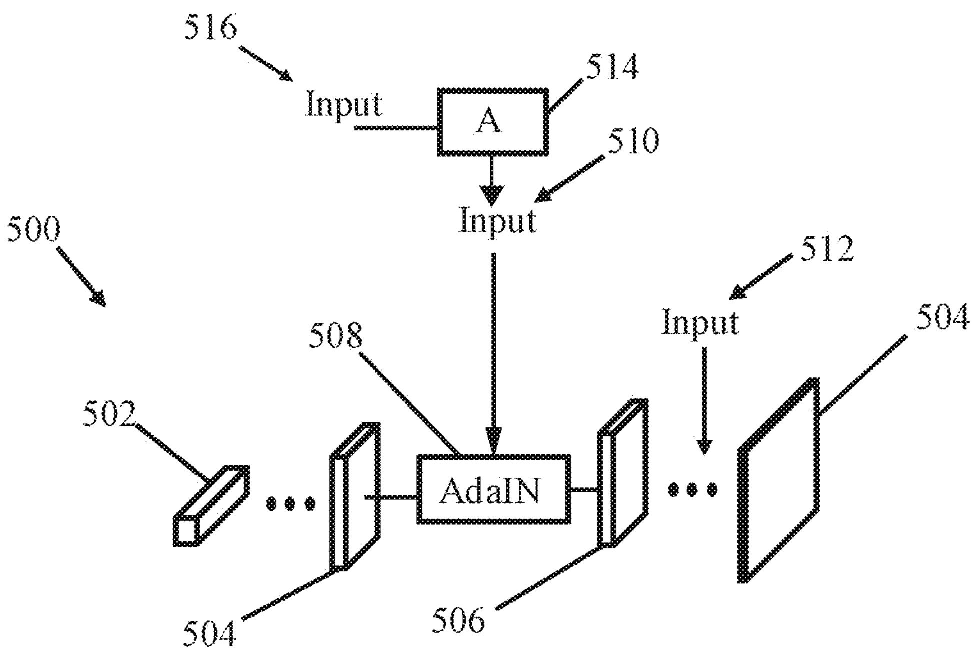
FIG. 5 illustrates a generator of a GAN according to another example embodiment.

FIG. 5 illustrates a generator 500 of a GAN according to another example embodiment. For example, the generator 500 may be a generator of the trained GAN 106 or the derived GAN 110 shown in FIG. 1. Referring to FIGS. 1-5, in some example embodiments, the generator 500 may include an input layer 502, an output layer 504, and intermediate layers including convolutional layers 504, 506 and an AdaIN layer 508. An input noise vector may be provided to the generator 500 at the input later 502. The generator 500 may also include other layers such as, for example, one or more upsampling layers. The generator 500 may also include other convolutional layers and AdaIN layers.

In some example embodiments, neural units of one or more of the convolutional layers of the generator 500 may have adequately precise causal relationship with synthetic light appearance(s) in synthetic images generated by the trained GAN 106 or the derived GAN 110 as described with respect to the generator 300 of FIG. 3. The particular neural units of the one or more convolutional layers of the generator 500 may be identified in the manner described above with respect to the generator 300 and FIGS. 1-4C. The derived GAN 110 may be derived from the trained GAN 106 by modifying one or more neural units as described above.

In some example embodiments, synthetic light appearances in a synthetic image generated by the trained GAN 106 may depend on the value of an input parameter 510 of the AdaIN layer 508. That is, the input parameter 510 may have a precise causal relationship with one or more synthetic light appearances in the synthetic image generated by the trained GAN 106 and ultimately by the derived GAN 110. For example, the brightness level of the light rendered in a synthetic image generated by the trained GAN 106 may depend on the value of the input parameter 510. To illustrate, the brightness level rendered in association with a luminaire in a synthetic image generated by the trained GAN 106 may be at maximum brightness level at one value of the input parameter 510 and the light be off at another value of the input parameter 510. By changing the value of the input parameter 510 and executing the trained GAN 106 after each change, the causal relationship, if any, between different values the input parameter 510 and synthetic light appearance(s) in synthetic images generated by the trained GAN 106 with the changed values may be determined. Values of the input parameter 510 that result in particular synthetic light appearances may also be determined. For example, a value that results in a light from luminaire being rendered as off, another value that results in a first dim level of the light being rendered, yet another value that results in yet another dim level, and yet another value that results in maximum brightness may be determined through the process. Causal relationships, if any, between other input parameters (e.g., an input parameter 512 of another AdaIN or another layer/operation such as an affine transformation layer) and synthetic light appearance(s) in synthetic images generated by the trained GAN 106 may be identified in the manner described with respect to the input parameter 510. Particular values of these input parameters and their specific relationship to synthetic light appearances may also be determined.

In some example embodiments, the derived GAN 110 may be derived from the trained GAN 106 by setting/changing the value of the input parameter 510 of the AdaIN layer 508 and saving the modified trained GAN as the derived GAN 110. The derived GAN 110 may also be derived from the trained GAN 106 by setting/changing the value of the input parameter 510 of the AdaIN layer 508 as well as value(s) of other neural unit(s) (e.g., values of weights) of the generator 500 and saving the modified trained GAN as the derived GAN 110.

In some example embodiments, an input parameter 516 may be provided to the affine transformation layer 514 that outputs the input parameter 510 that is provided to the AdaIN layer 508. To illustrate, instead of directly changing value(s) of the input parameter 510, the input parameter 516 may be changed with respect to the affine transformation layer 514 to produce desired light appearances in a synthetic image generated by the trained GAN 106 and the derived GAN 110. For example, the synthetic light appearances in a synthetic image generated by the trained GAN 106 may be determined as being dependent on the value of the input parameter 516 of the affine transformation layer 514, and particular values of the input parameter 516 that result in particular light appearances may be determined in the same manner as described with respect to the input parameter 510 of the AdaIN layer 508. In general, instead of changing the values of the input parameters of AdaIN layers, input parameters of affine transformation layers may be changed to achieve desired light appearances in synthetic images generated by the derived GAN 110. In general, descriptions herein with respect to the input parameter 510 and the AdaIN layer 508 may be applicable to the input parameter 516 and the affine transformation layer 514. References herein to other input parameters, such as the input parameter 512, may be applicable to other affine transformation layers that generate outputs that are provided to respective AdaIN layers as inputs as can be readily understood by those of ordinary skill in the art with the benefit of this disclosure.

In some example embodiments, after particular input parameter(s) of the AdaIN layer 508 or the affine transformation layer 514 and other AdaIN or affine transformation layers of the generator 500 of the trained GAN 106 that have adequately precise causal relationships with synthetic light appearances have been identified, changes to one or more of the input parameters may be made to derive the derived GAN 110 based on a desired light appearance indicated, for example, by the light appearance information 204 described above with respect to FIG. 2. For example, if the light appearance information 204 indicates that a 10 percent dim level is desired, the value of the input parameter 510 of the generator 500 of the trained GAN 106 may be changed to derive the derived GAN 110 such that the synthetic image 124 generated by the derived GAN 110 shows a dim level of a rendered light that is close to 10 percent of a maximum brightness level. As another example, if the light appearance information 204 indicates that a 100% dim level (i.e., full brightness) is desired, the value of the input parameter 510 of the generator 500 of the trained GAN 106 may be changed to derive the derived GAN 110 such that the synthetic image 124 generated by the derived GAN 110 shows a brightness level of a rendered light that is close to maximum brightness.

In some example embodiments, light dim levels ranging from off to full brightness may be rendered in the synthetic image 124 based on the value of the input parameter 510. In some cases, because adjustments of the input parameter 510 may result in dim levels such that the rendered light in the synthetic image 124 does not fit the human eye response curve, a wrapper parameter that results in the rendered light fitting in the human eye response curve may be used instead of directly changing the input parameter 510. For example, the wrapper parameter may map user dim level inputs provided, for example, as the light appearance information 204 to particular values of the input parameter 510 such that the light rendered in synthetic image 124 follows the human eye response curve.

In some example embodiments, synthetic light appearances other than dim level, such as beam width, beam shape, CCT, color, etc., may be controlled by setting/changing one or more input parameters of one or more AdaIN layers or other layers (e.g., affine transformation layers) of the generator 500 of the trained GAN 106 to derive the derived GAN 110 having the changed/new value(s) of the corresponding one or more input parameters, where the derived GAN 110 is executed to generate the synthetic image 124 with the synthetic light appearance(s) corresponding to the changed/new values. In some example embodiments, the input parameter 510 and other input parameters of the generator 500 may have values that are generated or otherwise controlled by other elements of the generator 500.

In some alternative embodiments, the generator 500 may include more or fewer elements, including layers, than shown in FIG. 5 without departing from the scope of this disclosure. In FIG. 5, the dimensions of the layers of the generator are not intended to suggest a particular size, relationship, and/or operation by or between the layers of the generator 500. In some alternative embodiments, instead of or in addition to identifying and changing AdaIN layer(s) and affine transformation layer(s) to achieve desired light appearances in synthetic images, inputs and/or parameters of one or more other neural structures that provide adequate disentangled representation of lighting related features and characteristics may be identified and changed without departing from the scope of this disclosure.

FIGS. 6-9 illustrate images of a user space at different stages of lighting virtualization operations according to an example embodiment. FIG. 6 illustrates a user image 600 of a room 602. For example, the user image 600 may correspond to the user image 112 shown in FIG. 1. For example, the room 602 may be a bedroom that has a bed 604, a bedside table 606, and a sofa 608 that are on a floor 610. The room 602 may have multiple walls such as wall 612, 614. In some alternative embodiments, the room 602 may be a different type of room and may have other structures, objects and/or more or fewer objects.

Referring to FIGS. 1 and 6, in some example embodiments, the user image 600 may be provided to the image insertion module 102 as the user image 112, and the image insertion module 102 may insert a luminaire in the user image 600 as provided by the luminaire information 114 and generate the input image 116 shown in FIG. 1. For example, an image 700 shown in FIG. 7 may correspond to the input image 116 generated by the image insertion module 102 according to an example embodiment. To illustrate, the image 700 shows the room 602, the bed 604, the bedside table 606, and the sofa 608 as well as a luminaire 702 that is inserted in the user image 600 of FIG. 6 to generate the image 700 of FIG. 7. As described above, the luminaire 702 may be obtained from the luminaire information 114 provided to the image insertion module 102 as an image and/or description. The luminaire 702 may inserted at a location/orientation in the room 602 indicated by the user that provided the luminaire information 114 or a location/orientation automatically determined, for example, based on the type of luminaire, the type of room, and/or objects in the room. In some alternative embodiments, the luminaire 702 may be a different type of luminaire than shown in FIG. 7 without departing from the scope of this disclosure.

Figure 7:
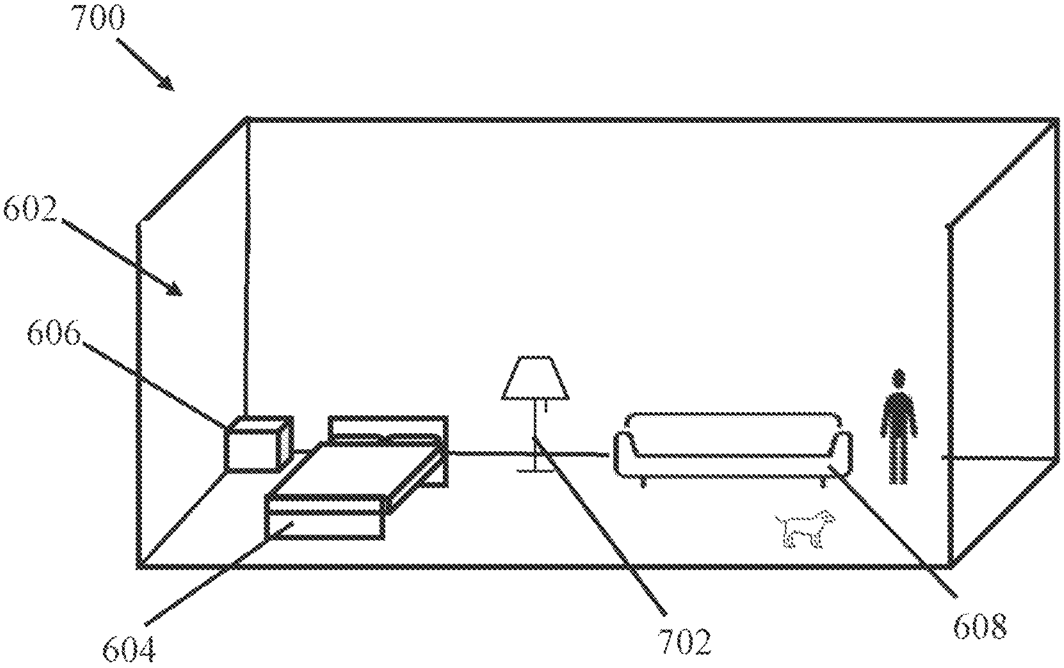

Referring to FIGS. 1, 2, and 7, in some example embodiments, the image 700 may be provided to the GAN inversion module 104 that performs GAN inversion on the trained GAN 106 to determine an input noise vector 118 in the manner described above with respect to FIG. 1. The trained GAN 106 may use the input noise vector 118 to generate the synthetic image 120 of the room 602 including the bed 604, the bedside table 606, the sofa 608, and the luminaire 702 in the room 602. The synthetic image 120 generated based on the input noise vector 118 determined from the image 700 of FIG. 7 closely matches the image 700. The synthetic image 120 generated based on the image 700 (i.e., based on the input image 116 in FIG. 1) is provided to the GAN inversion module 108 that performs a GAN inversion operation on the derived GAN 110 to generate the input noise vector 122 in the manner described above with respect to FIG. 1. Because the synthetic image 120 generated using the input noise vector 118 closely matches the image 700, for illustrative purposes, the image 700 of the FIG. 7 may be considered as the synthetic image generated by the trained GAN 106 and corresponding to the synthetic image 120.

Figure 8:
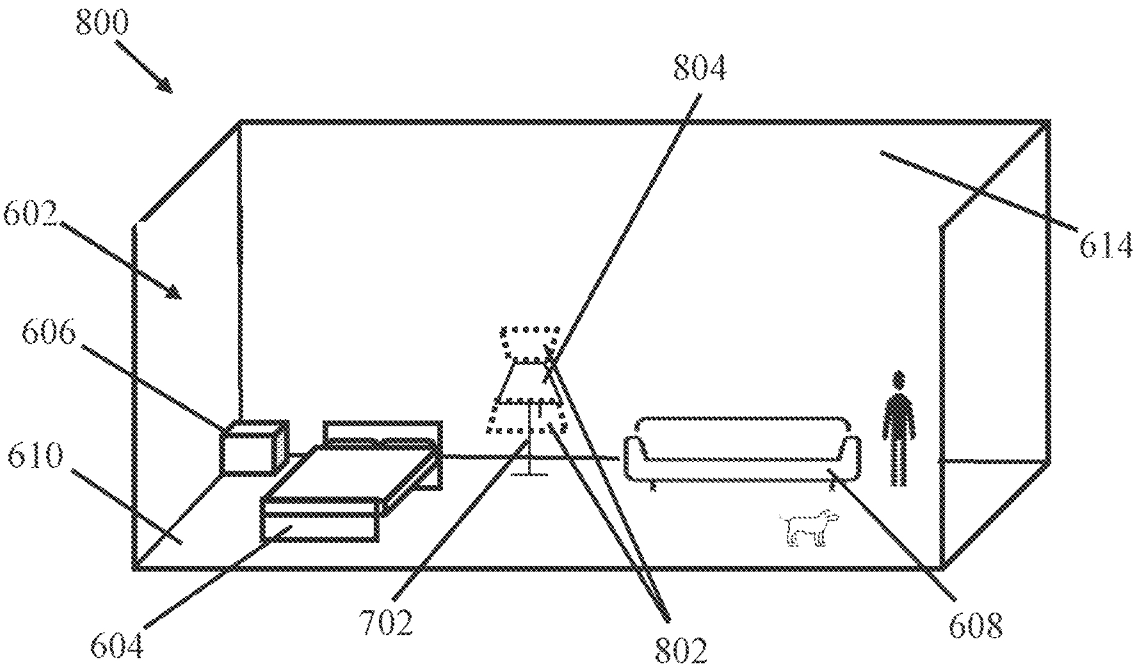

In some example embodiments, the derived GAN 110 may use the input noise vector 122 to generate the synthetic image 124 shown in FIG. 1. For example, a synthetic image 800 of FIG. 8 may correspond to the synthetic image 124 generated by the derived GAN 110 according to an example embodiment. The synthetic image 800 may include the room 602 including the bed 604, the bedside table 606, the sofa 608, and the luminaire 702 in the room 602 shown in FIG. 7. The synthetic image 800 may also show a synthetic light appearance 802 as generated by the derived GAN 110 as part of the synthetic image 800. In FIG. 8, the synthetic light appearance 802 is shown with a dotted line boundary for clarity of illustration. In general, the synthetic light appearance 802 is associated with the luminaire 702 in the synthetic image 800 and refers to the rendered (i.e., synthetic) light from the luminaire 702, the luminaire 702 itself being either off or on (e.g., a lampshade 804 appearing lit or unlit) as well as intensity level, CCT, color, beam width, beam shape, edge sharpness, micro-shadows on the wall 614, polarization, etc. of the rendered light from/associated with the luminaire 702. The synthetic light appearance 802 may closely match the desired light appearance indicated by the light appearance information 204 that is used to derive or select the derived GAN 110 to generate the image 800, which corresponds to the synthetic image 124 shown in FIG. 1.

In some example embodiments, the dim level rendered in the synthetic image 800 may closely match a dim level indicated by the light appearance information 204. That is, as described above, the derived GAN 110 may be derived from the trained GAN 106 based on the light appearance information 204 that indicates a desired dim level (e.g., 20%, 50%, 90%, or maximum brightness) to be rendered in the synthetic image 800 as part of the synthetic light appearance 802. As another example, the CCT rendered in the synthetic image 800 may closely match a CCT (e.g., warm CCT or cool CCT) indicated by the light appearance information 204. For example, the light appearance information 204 may indicate a desired dim level, a desired CCT, and/or another desired light characteristic or effect, and the derived GAN 110 may be derived from the trained GAN 106 based on the one or more desired light appearances as described above with respect to FIGS. 1-5.

In some alternative embodiments, the synthetic light appearance 802 may have a different shape than shown without departing from the scope of this disclosure. In some alternative embodiments, the luminaire 702 may be a different type of luminaire than shown without departing from the scope of this disclosure. In some alternative embodiments, the luminaire 702 may be at a different location than shown without departing from the scope of this disclosure. In some alternative embodiments, the luminaire 702 may be at a different orientation than shown without departing from the scope of this disclosure.

Figure 9:
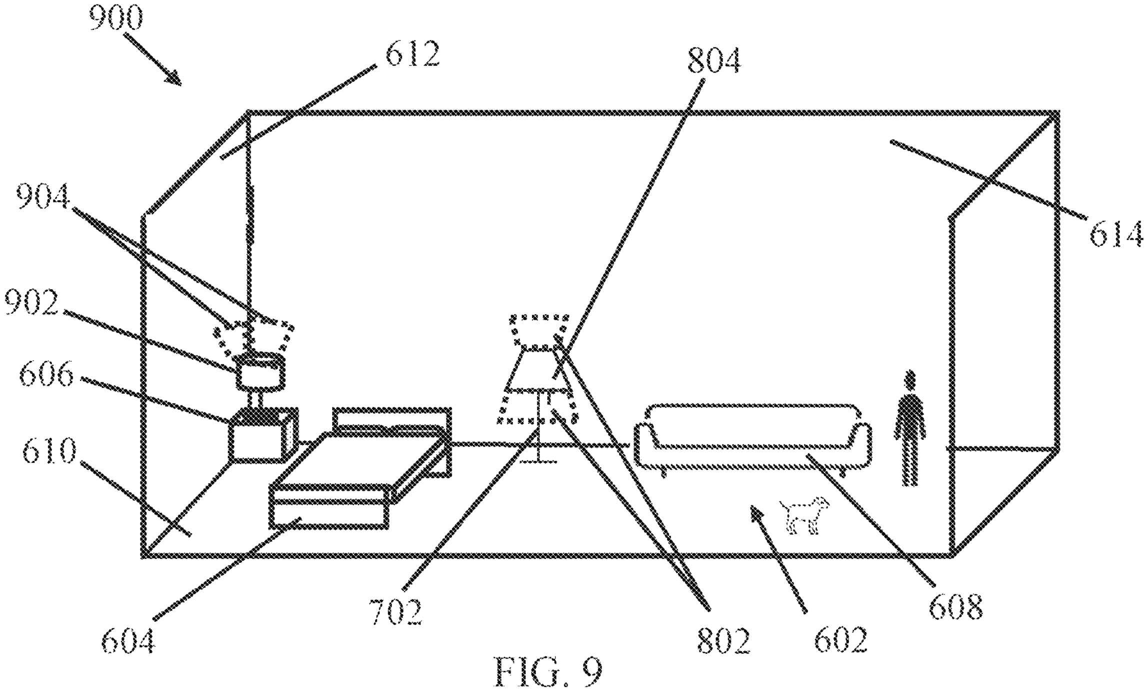

FIG. 9 shows a synthetic image 900 generated by the derived GAN 110 of FIG. 1 according to another example embodiment. Referring to FIGS. 1, 2, and 6-9, the synthetic image 900 of FIG. 9 may correspond to the synthetic image 124 generated by the derived GAN 110 as shown in FIG. 1. In some example embodiments, the synthetic image 900 may include the room 602, and the bed 604, the bedside table 606, the sofa 608, and the luminaire 702 shown in FIG. 7. The synthetic image 900 may also include a luminaire 902, a synthetic light appearance 802 associated with the luminaire 702, and a synthetic light appearance 904 associated with the luminaire 902. For example, the synthetic image 900 may be generated by the derived GAN 110 based on the synthetic image 120 shown in FIG. 1 that includes the room 602, the bedside table 606, the sofa 608, and the luminaires 702, 902.

To illustrate, the luminaires 702, 902 may be luminaires that are inserted in the user image 600 of FIG. 6 corresponding to the user image 112 of FIG. 1 by the image insertion module 102 that generates the input image 116. The synthetic image 120 may be generated by the trained GAN 106 from the input image 116 in a manner described with respect to FIG. 1, where the input image 116 and the synthetic image 120 each include the luminaires 702, 902. The derived GAN 110 generates the synthetic image 900 based on the synthetic image 120 in a manner described with respect to the synthetic image 124, which corresponds to the synthetic image 900.

As described above, parameters of the trained GAN 106 that have a precise causal relationship with particular synthetic light appearances that may be included in the synthetic image 900 are modified to derive the derived GAN 110. In particular, values of the parameters of the trained GAN 106 that have a precise causal relationship with particular synthetic light appearances corresponding to the desired light appearances indicated by the light appearance information 204 are modified to derive the derived GAN 110. That is, the values of the parameters of the trained GAN 106 may be modified to derive the derived GAN 110 such that synthetic light appearances 802, 904 in the synthetic image 900 closely match the desired light appearances with respect to the luminaires 702, 902, respectively. As described above with respect to FIGS. 1-5, the modified parameters of the derived GAN 110 may include weights, input parameters, and/or other elements of the derived GAN 110.

In some example embodiments, the same desired light appearance (e.g., 50% dim level and/or cool CCT) indicated by the light appearance information 204 may apply to both luminaires 702, 902, and the same parameters of the trained GAN 106 may apply to the synthetic light appearances 802, 904 associated with the luminaires 702, 902, respectively. That is, the trained GAN modification module 202 may derive the derived GAN 110 from the trained GAN 106 based on the desired light appearance in the light appearance information 204 by changing value(s) of one or more parameters of the trained GAN 106 that are applicable to both synthetic light appearances 802, 904. Alternatively, the trained GAN modification module 202 may derive the derived GAN 110 from the trained GAN 106 by changing value(s) of one or more parameters of the trained GAN 106 applicable to the synthetic light appearance 802 and the luminaire 702 and by changing value(s) of other one or more parameters of the trained GAN 106 applicable to the synthetic light appearance 904 and the luminaire 902.

In some example embodiments, different desired light appearances may be indicated with respect to the luminaires 702, 902 by the light appearance information 204. For example, the light appearance information 204 may indicate 50% dim level with respect to the luminaire 702 and 20% dim level with respect to the luminaire 902. The trained GAN modification module 202 may derive the derived GAN 110 from the trained GAN 106 based on the desired light appearance applicable to the luminaire 702 and based on the desired light appearance applicable to the luminaire 902. To illustrate, the trained GAN modification module 202 may derive the derived GAN 110 by changing value(s) of one or more parameters of the trained GAN 106 applicable to the synthetic light appearance 802 and by changing value(s) of other one or more parameters of the trained GAN 106 applicable to the synthetic light appearance 904. For example, an input parameter (e.g., the input parameter 510 shown in FIG. 5) of an AdaIN layer (e.g., the AdaIN layer 508 in FIG. 5) of the generator of the trained GAN 106 may be applicable to the luminaire 702 and the synthetic light appearance 802 and another input parameter (e.g., the input parameter 512 shown in FIG. 5) of another layer (e.g., another AdaIN layer) of the generator of the trained GAN 106 may be applicable to the luminaire 902 and the synthetic light appearance 904.

In some example embodiments, the synthetic light appearances 802, 904 depend on the location of the luminaires 702, 902, respectively. For example, because the luminaire 902 is located at a corner between the wall 612 and the wall 614, a portion of the synthetic light associated with the luminaire 902 is shown on the wall 612 and another portion of the synthetic light associated with the luminaire 902 is shown the wall 614. In contrast, the synthetic light associated with the luminaire 702 is projected on the wall 614 but not on the wall 612 because of the distal location of the luminaire 702 away from the wall 612.

In some alternative embodiments, the luminaire 702 may be an existing luminaire that is in the user image 600 provided by the user without departing from the scope of this disclosure. For example, the luminaire 702 may be an existing luminaire in the room 602 and the luminaire 902 may be added to the room 602 based on the luminaire information 114 provided by the user, where the synthetic light appearance 802 associated with the luminaire 702 may be rendered by the derived GAN 110 based on the value(s) of one or more parameters of the derived GAN 110. As another example, the user image 600 may include another luminaire (e.g., an anti-stumble light luminaire) at another location in the room 602, and a ceiling mounted luminaire may be added to the user image 600 based on the luminaire information 114, where the other luminaire and the associated synthetic light appearance, the ceiling mounted luminaire and a corresponding synthetic light appearance may be rendered by the derived GAN 110, for example, in the synthetic image 900. In some alternative embodiments, the synthetic light appearances 802, 904 may have different shapes than shown without departing from the scope of this disclosure. In some alternative embodiments, the luminaire 702 and/or the luminaire 902 may be a different type of luminaire than shown without departing from the scope of this disclosure. In some alternative embodiments, the luminaire 702 and/or the luminaire 902 may be at different locations or spatial orientations than shown without departing from the scope of this disclosure. In some alternative embodiments, the synthetic images 800, 900 may include more luminaires than shown without departing from the scope of this disclosure. Although the lighting virtualization system 100 of FIG. 1 is described with respect to the room 602 in FIGS. 6-9, the lighting virtualization system 100 may be applicable to other areas including outdoor spaces.

FIGS. 10-13 illustrate images of a user space at different stages of lighting virtualization operations according to another example embodiment. FIG. 10 illustrates a user image 1000 of a room 1002. For example, the user image 1000 may correspond to the user image 112 shown in FIG. 1. For example, the room 1002 may be a recreation room that has a chair-table set 1004 and a sofa 1006 that are on a floor 1008. The room 1002 may have multiple walls and a ceiling structure 1010. In some alternative embodiments, the room 1002 may be a different type of room and may have other structures, objects and/or more or fewer objects than shown in FIG. 10.

Referring to FIGS. 1 and 10, in some example embodiments, a user may provide the user image 1000 to the image insertion module 102 as the user image 112, and the image insertion module 102 may insert a luminaire in the image 1000 and generate the input image 116 shown in FIG. 1. For example, an image and/or a description of the inserted luminaire may be provided in the luminaire information 114 that is provided to the image insertion module 102. The image 116 may show that luminaire in the room 1002 at a location indicated by the user. The GAN inversion module 104 may use the input image 116 that shows the room 1002 and the inserted luminaire to perform a GAN inversion operation on the trained GAN 106 and determine the input noise vector 118. The trained GAN 106 may use the input noise vector 118 to generate the synthetic image 120 that shows the room 1002 including the chair-table set 1004, the sofa 1006, and the luminaire inserted by the image insertion module 102.

In some example embodiments, the GAN inversion module 108 may use the synthetic image 120 to perform a GAN inversion operation on the derived GAN 110 and determine the input noise vector 122. The derived GAN 110 may use the input noise vector 122 to generate the synthetic image 124 that shows the room 1002 including the chair-table set 1004, the sofa 1006, and the inserted luminaire, and a synthetic light appearance associated with the inserted luminaire. For example, the synthetic image 124 may correspond to the synthetic image 1100 shown in FIG. 11.

Figure 11:
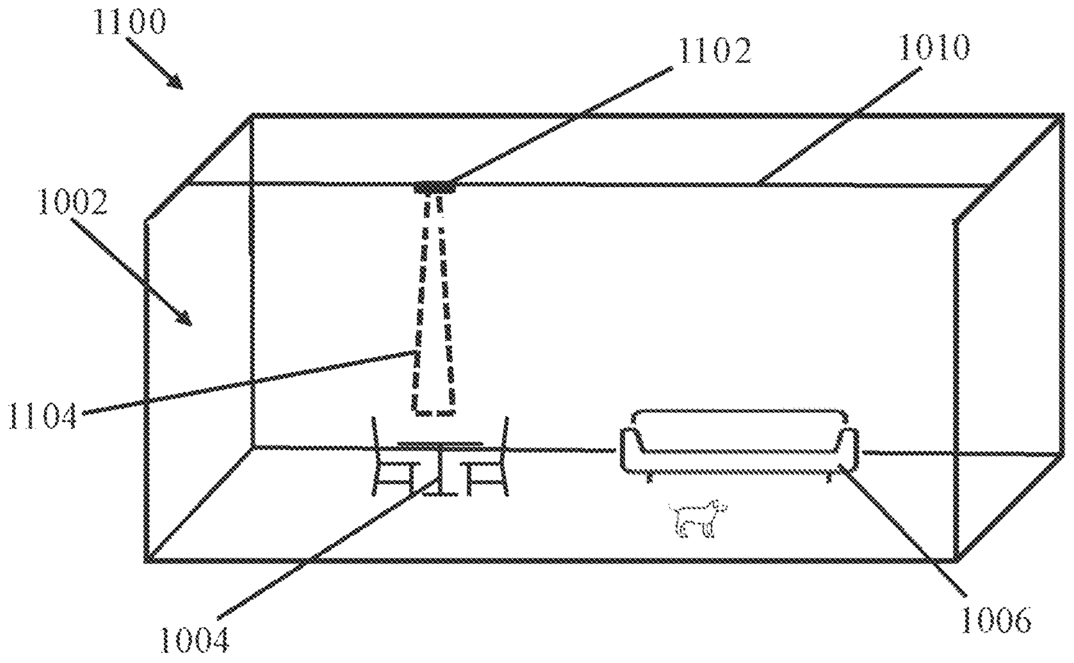

Referring to FIGS. 1, 2, 10, and 11, the synthetic image 1100 of FIG. 11 shows the room 1002, the chair-table set 1004, the sofa 1006, and a luminaire 1102 that is located at the ceiling structure 1010, where the luminaire 1102 is inserted in the user image 1000 of FIG. 10 by the image insertion module 102. The synthetic image 1100 also shows a synthetic light appearance 1104. The derived GAN 110 may have been derived from the trained GAN 106 based on the light appearance information 204. For example, the light appearance information 204 may indicate a narrow beam width as a desired light appearance, and the trained GAN modification module 202 may derive the derived GAN 110 by changing value(s) of one or more parameters of the trained GAN 106 such that the derived GAN 110 accordingly renders the synthetic light appearance 1104 including the narrow beam width as part of the synthetic image 1100. The synthetic light appearance 1104 may also include other light appearance elements such as one or more of a particular dim level (e.g., 90%), a warm CCT or a cool CCT, a particular light beam shape, a particular edge sharpness, a polarization, and a micro-shadow level that are indicated by the light appearance information 204.

In some alternative embodiments, a first trained GAN may have been trained using training images that show luminaires and lights that have narrow beam width (e.g., 30 degrees or less) and that exclude wide beam width lights. A second trained GAN may have been trained using training images that show luminaires and lights that have a wide beam width (e.g., 60 degrees or more) and that exclude narrow beam width lights. The first trained GAN may be selected as the trained GAN 106 shown in FIG. 1 based on the light appearance information 204 that indicates a narrow beam width as the desired light appearance. For example, if the light appearance information 204 indicates a 24-degree beam width as a desired light appearance, the first trained GAN may be selected as the trained GAN 106 in the lighting virtualization system 100 of FIG. 1, and the derived GAN 110 may be derived from the trained GAN 106 (i.e., from the first trained GAN) by changing value(s) of one or more parameters of the trained GAN 106 such that the derived GAN 110 renders the synthetic light appearance 1104 including a beam width that is approximately 24 degrees wide.

Figure 12:
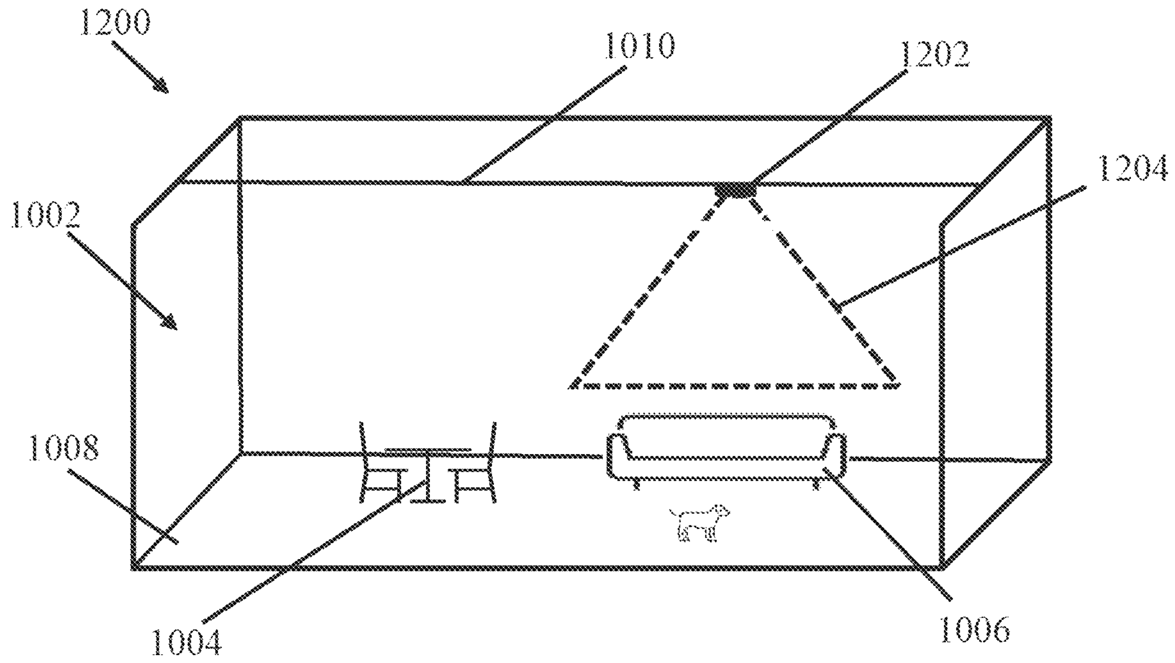

In some example embodiments, the lighting virtualization system 100 of FIG. 1 may generate the synthetic image 124 corresponding to the synthetic image 1200 shown in FIG. 12 in the manner described with respect to the synthetic image 1100. To illustrate, referring to FIGS. 1, 2, 10, and 12, the synthetic image 1200 of FIG. 12 may be generated by the derived GAN 110. The synthetic image 1200 shows the room 1002, the chair-table set 1004, the sofa 1006, and a luminaire 1202 that is located at the ceiling structure 1010. The luminaire 1202 may be inserted in the user image 1000 of FIG. 10 by the image insertion module 102 to generate the input image 116 shown in FIG. 1, and the synthetic image 120 may be generated based on the input image 116 as described above with respect to FIG. 1.

In some example embodiments, the synthetic image 1200 also shows a synthetic light appearance 1204 that is rendered by the derived GAN 110 as part of the synthetic image 1200 corresponding to the synthetic image 124 of FIG. 1. For example, the derived GAN 110 may have been derived from the trained GAN 106 based on the light appearance information 204 that indicates a wide beam width (e.g., 60 degrees) as a desired light appearance. To illustrate, the trained GAN modification module 202 may derive the derived GAN 110 by changing value(s) of one or more parameters of the trained GAN 106 such that the derived GAN 110 renders the synthetic light appearance 1204 including the wide beam width as part of the synthetic image 1200. The synthetic light appearance 1104 may also include other light appearance elements such as one or more of a particular dim level (e.g., 30%), a warm CCT or a cool CCT, a particular light beam shape, a particular edge sharpness, a polarization, and a micro-shadow level that are indicated by the light appearance information 204.

In some alternative embodiments, a first trained GAN may have been trained using training images that show luminaires and lights that have narrow beam width (e.g., 30 degrees or less) and that exclude wide beam width lights. A second trained GAN may have been trained using training images that show luminaires and lights that have a wide beam width (e.g., 60 degrees or more) and that exclude narrow beam width lights. The second trained GAN may be selected as the trained GAN 106 shown in FIG. 1 based on the light appearance information 204 that indicates a wide beam width as the desired light appearance. For example, if the light appearance information 204 indicates a 60-degree beam width as a desired light appearance, the second trained GAN may be selected as the trained GAN 106 in the lighting virtualization system 100 of FIG. 1, and the derived GAN 110 may be derived from the trained GAN 106 (i.e., from the second trained GAN) by changing value(s) of one or more parameters of the trained GAN 106 such that the derived GAN 110 renders the synthetic light appearance 1204 including a beam width that is approximately 60 degrees wide.

In some alternative embodiments, the synthetic light appearance 1104 may include a wide beam width instead of the narrow beam width shown in FIG. 11 without departing from the scope of this disclosure. In some alternative embodiments, the synthetic light appearance 1204 may include a narrow beam width instead of the wide beam width shown in FIG. 12 without departing from the scope of this disclosure. In some alternative embodiments, the synthetic light appearances 1104, 1204 may have different shapes than shown without departing from the scope of this disclosure. In some alternative embodiments, the luminaire 1102 and/or the luminaire 1202 may be different types of luminaires than shown without departing from the scope of this disclosure. In some alternative embodiments, the luminaire 1102 and/or the luminaire 1202 may be at different locations than shown without departing from the scope of this disclosure. In some example embodiments, the synthetic images 1100, 1200 may include more luminaires than shown without departing from the scope of this disclosure.

Figure 13:
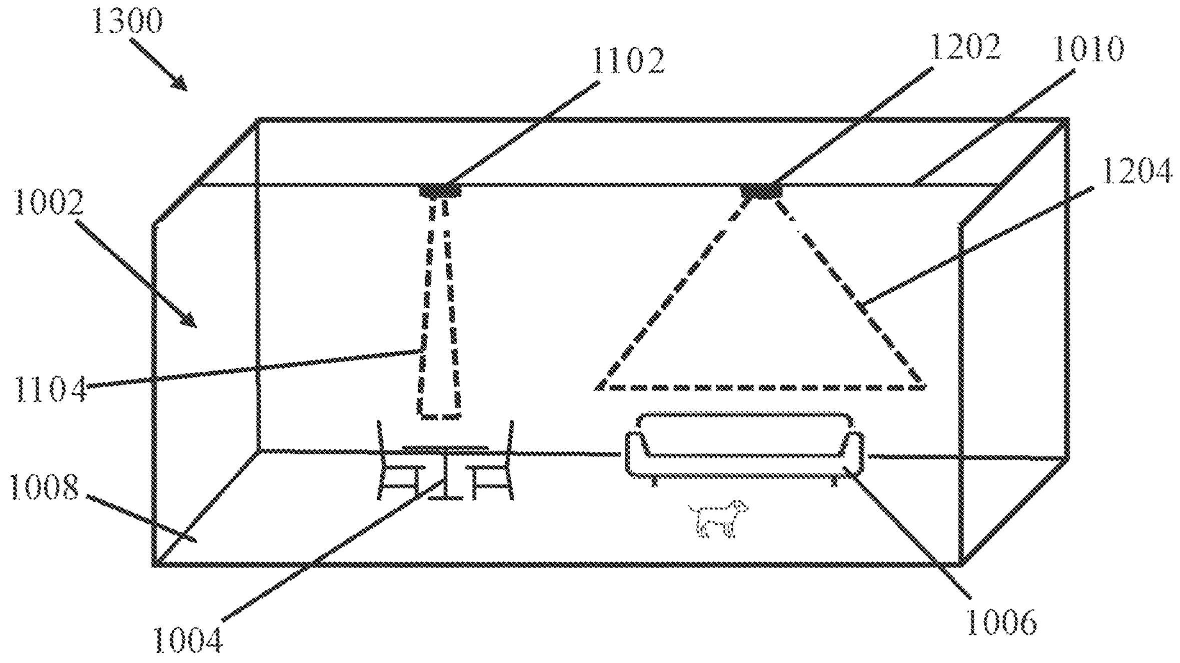

FIG. 13 illustrates an image 1300 that shows the room 1002 shown in FIG. 10 and the luminaires 1102, 1202 located in the room according to an example embodiment. Referring to FIGS. 1, 2, and 10-13, in some example embodiments, the image 1300 shows the synthetic light appearance 1104 associated with the luminaire 1102 and the synthetic light appearance 1204 associated with the luminaire 1202.

In some example embodiments, the image 1300 may correspond to the synthetic image 124 shown in FIG. 1. For example, the luminaires 1102, 1202 may be provided in the luminaire information 114 and inserted in the user image 1000 of FIG. 10, which corresponds to the user image 112 of FIG. 1, by the image insertion module 102 to generate the input image 116 shown in FIG. 1. The synthetic image 120 that includes the room 1002 and the luminaires 1102, 1104 may be generated by the trained GAN 106 based the input image 116. The trained GAN modification module 202 of FIG. 2 may derive the derived GAN 110 from the trained GAN 106 by changing value(s) of one or more parameters of the trained GAN 106 (e.g., one or more weights and/or input parameters of one or more layers of the generator of the trained GAN 106) based on the desired light appearance indicated by the light appearance information 204. To be clear, the one or more parameters of the trained GAN 106 that are changed to derive the derived GAN 110 have a precise causal relationship with beam widths in the image 1300. For example, the light appearance information 204 may indicate a narrow beam with respect to the luminaire 1102 and a wide beam with respect to the luminaire 1104. The derived GAN 110 may generate the image 1300 showing the room 1002, the chair-table set 1004, the sofa 1006, and the luminaires 1102, 1202. The image 1300 may also show the synthetic light appearance 1104 associated with the luminaire 1104 and the synthetic light appearance 1204 associated with the luminaire 1202.

In some alternative embodiments, the image 1300 may be a combination of a portion of the synthetic image 1100 and a portion of the synthetic image 1200. For example, after the synthetic images 1100, 1200 are generated as described above, a portion of the synthetic image 1200 that includes the luminaire 1202 and the synthetic light appearance 1204 may be extracted from the synthetic image 1200. The extracted portion of the synthetic image 1200 may replace a corresponding portion of the synthetic image 1100 resulting in the image 1300. For example, the extracted portion of the synthetic image 1200 may be identified based on a fixed extraction shape and size (e.g., a rectangle with X and Y dimensions in number of pixels with respect to the luminaire 1202) and based on a reference location in the image 1200. The extracted portion of the synthetic image 1200 may be identified based on which pixels change in brightness if we synthetically switch the luminaire from off state to on state. The extracted portion of the synthetic image 1200 may be inserted in the image 1100, for example, as a replacement for a corresponding portion of the synthetic image 1100.

In some alternative embodiments, the synthetic light appearance 1104 of FIG. 13 may include a wide beam width instead of the narrow beam width without departing from the scope of this disclosure. In some alternative embodiments, the synthetic light appearance 1204 may include a narrow beam width instead of the wide beam width shown in FIG. 13 without departing from the scope of this disclosure. In some alternative embodiments, the synthetic light appearances 1104, 1204 may have different shapes than shown in FIG. 13 without departing from the scope of this disclosure. In some alternative embodiments, the luminaire 1102 and/or the luminaire 1202 may be different types of luminaires than shown in FIG. 13 without departing from the scope of this disclosure. In some alternative embodiments, the luminaire 1102 and/or the luminaire 1202 may be at different locations than shown in FIG. 13 without departing from the scope of this disclosure. In some example embodiments, the image 1300 may include more luminaires than shown without departing from the scope of this disclosure. In some example embodiments, the luminaires 1102, 1202 may be the same type of luminaires or different types of luminaires without departing from the scope of this disclosure. Although the lighting virtualization system 100 of FIG. 1 is described with respect to the room 1002 in FIGS. 10-13, the lighting virtualization system 100 may be applicable to other areas including outdoor spaces.

Figure 14:
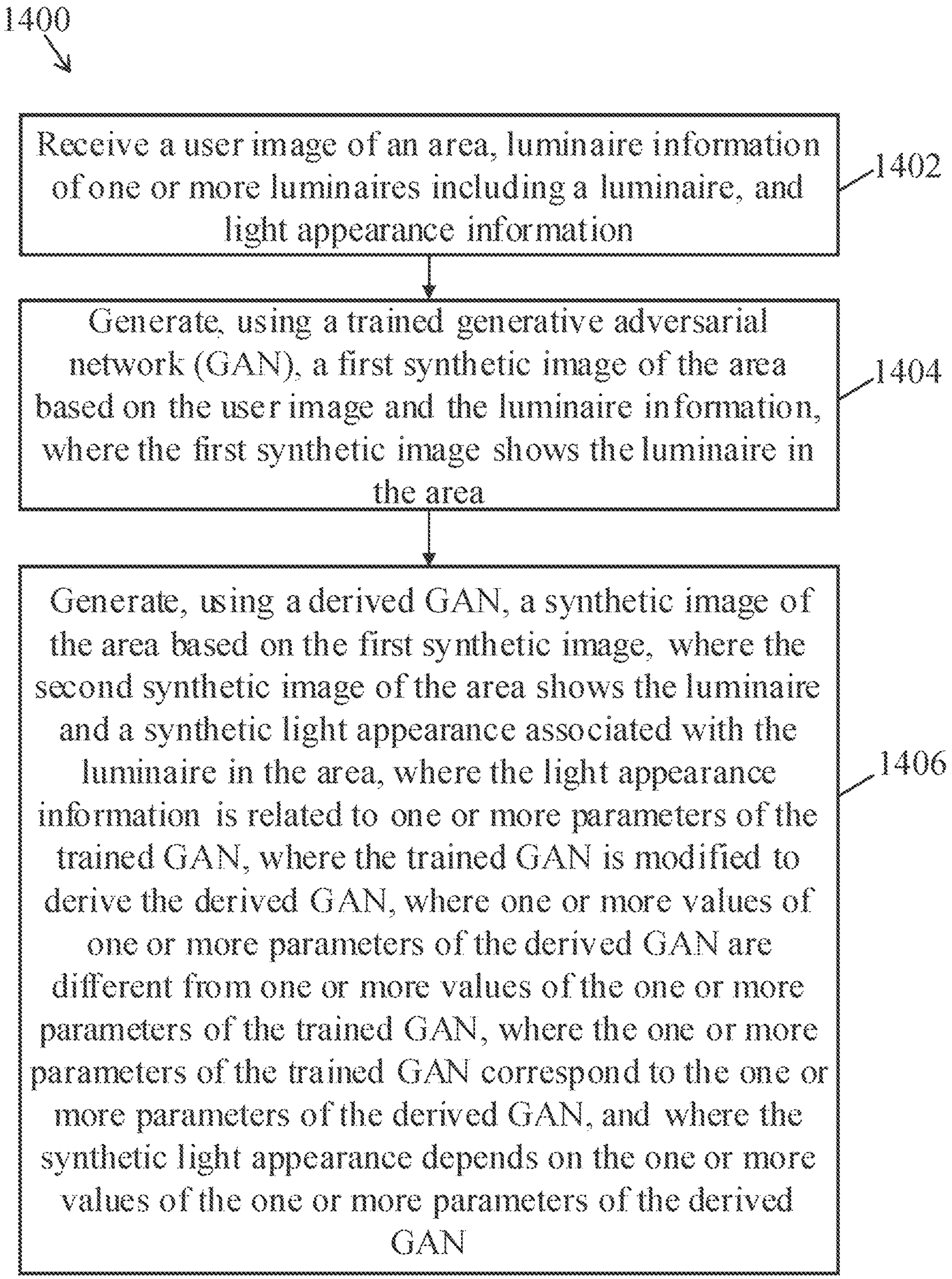
FIG. 14 illustrates a lighting virtualization method according to an example embodiment.

FIG. 14 illustrates a lighting virtualization method 1400 according to an example embodiment. Referring to FIGS. 1-14, in some example embodiments, the method 1400 may be implemented by a microprocessor of a user device and/or a server. For example, the system of FIG. 31 may be used to execute the method 1400. The method 1400 may include, at step 1402, receiving a user image 112 of an area, luminaire information 114 of one or more luminaires (e.g., the luminaire 702, the luminaire 902, the luminaire 1102, and/or the luminaire 1202), and light appearance information 204. For example, the user image 112 of FIG. 1 may correspond to the user image 600 of FIG. 6 showing the room 602. The user image 112 of FIG. 1 may also correspond to the user image 1000 of FIG. 10 showing the room 1002. A user device 3102 (e.g., a smartphone) and/or a server 3104 (e.g., a cloud server) of FIG. 31 may receive the user image 112, the luminaire information 114, and the light appearance information 204 that may each be provided by a user. For example, the server 3104 may receive the user image 112, the luminaire information 114, and the light appearance information 204 via the user device 3102.

In some example embodiments, the method 1400 includes, at step 1404, generating, using the trained GAN 106, a first synthetic image (e.g., the synthetic image 120) of the area (e.g., the room 602 or the room 1002) based on the user image (e.g., the user image 112, the user image 600, or the user image 1000) and the luminaire information 114, where the first synthetic image (e.g., the synthetic image 120) shows the luminaire in the area. For example, a user device (e.g., a smartphone; AR/VR headset) and/or a server (e.g., a cloud server) may perform the step 1404. The input image 116 of FIG. 1, which corresponds to the image 700 of FIG. 7, may be generated by the image insertion module 102 using the user image 112, which corresponds to the user image 600 of FIG. 6, and the luminaire information 114 of the luminaire 702. For example, the method 1400 may include determining the input noise vector 118 by performing a GAN inversion based the input image 116 of the area (e.g., the area 602) and the trained GAN 106, where the input image 116 shows the luminaire 702 in the area. The trained GAN 106 may generate the synthetic image 120 using the input noise vector 118. The use of the trained GAN 106 and the input noise vector 118 that is determined based on the input image 116 can result in the synthetic image 120 closely matching the input image 116.

In some example embodiments, the method 1400 includes, at step 1406, generating, using the derived GAN 110, a second synthetic image of the area based on the first synthetic image (e.g., the synthetic image 120). For example, the second synthetic image may be the synthetic image 124 corresponding to one of the images 800, 900, 1100, 1200, 1300 showing the room 602 or the room 1002. The user device 3102 and/or the server 3104 of FIG. 31 may perform the step 1406.

In some example embodiments, before the second synthetic image (e.g., the synthetic image 124) is generated, the first synthetic image (e.g., the synthetic image 120) may be presented to the user for approval, for example, via the display screen of a user device. The second synthetic image (e.g., the synthetic image 124) of the area may then be generated in response to receiving the approval of the first synthetic image of the area by the user. The second synthetic image of the area (e.g., the synthetic image 124 corresponding to each one of the images 800, 900, 1100, 1200, 1300) shows the luminaire (e.g., the luminaire 702, 902, 1102, 1202) and a synthetic light appearance (e.g., synthetic light appearances 802, 904, 1104, 1204) associated with the luminaire in the area (e.g., the room 602 or the room 1002).

As described above with respect to FIGS. 1 and 2, the light appearance information 204 is related to one or more parameters of the trained GAN 106, where the trained GAN 106 is modified to derive the derived GAN 110 and where one or more values of one or more parameters (e.g., weights W1-W9, input parameters 510, 512) of the derived GAN 110 are different from one or more values of the one or more parameters (e.g., weights W1-W9, input parameters 510, 512) of the trained GAN 106. The one or more parameters (e.g., weights W1-W9 and input parameters 510, 512) of the trained GAN 106 correspond to the one or more parameters (e.g., weights W1-W9 and input parameters 510, 512) of the derived GAN 110. That is, because the derived GAN 110 is derived from the trained GAN 106 by changing value(s) of the one or more parameters of the trained GAN 106, the derived GAN 110 also has the same parameters but with different values for the particular parameters that are modified. As described above, the synthetic light appearance (e.g., each one of the synthetic light appearances 802, 904, 1104, 1204 shown in FIGS. 8, 9, 11, and/or 12) depends on the one or more values of the one or more parameters (e.g., weights W1-W9 and input parameters 510, 512) of the derived GAN 110.

In some alternative embodiments, the method 1400 may include steps other than shown in FIG. 14 without departing from the scope of this disclosure. In some alternative embodiments, the steps of the method 1400 may be performed in a different order than shown without departing from the scope of this disclosure.

Figure 15:
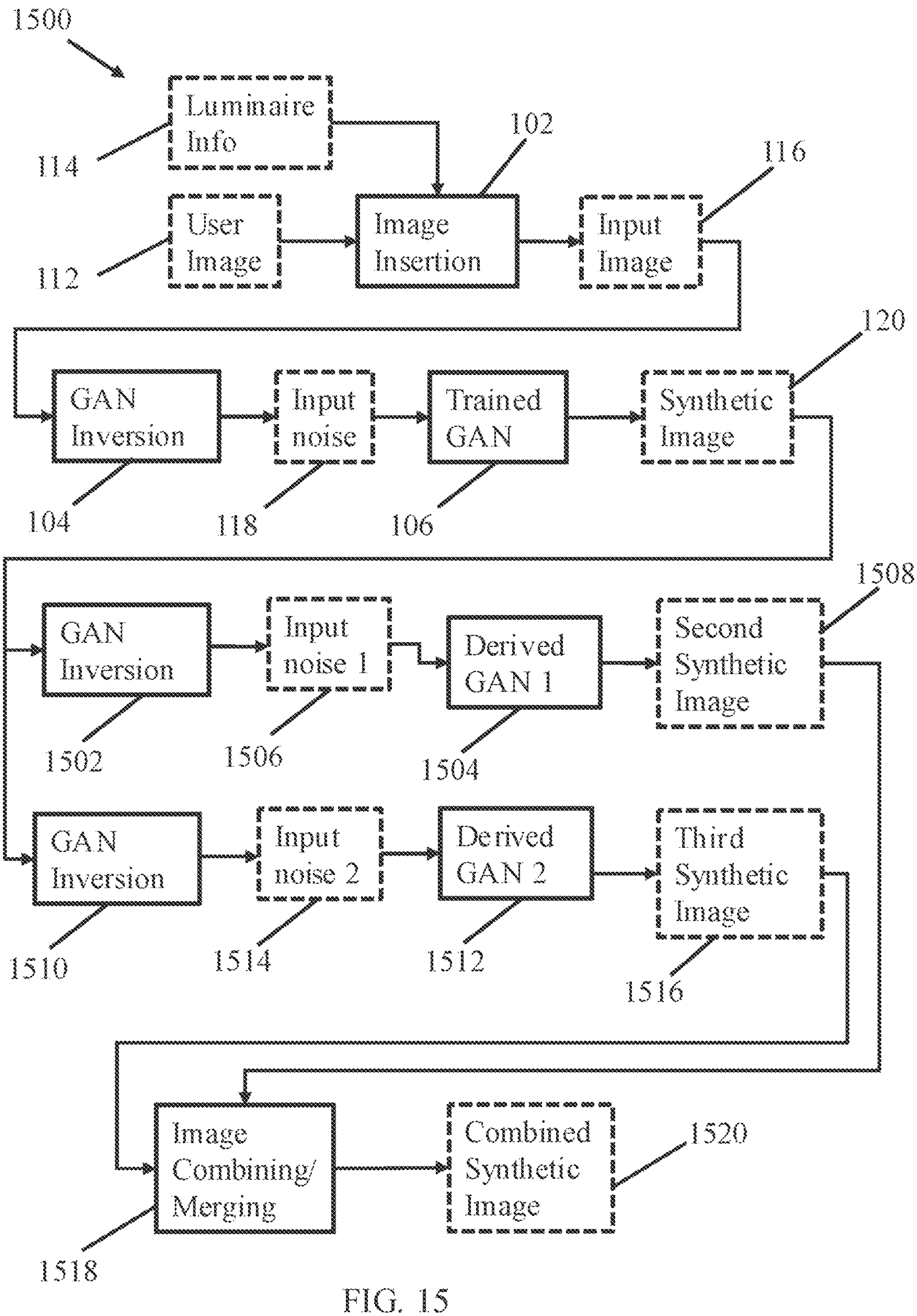
FIG. 15 illustrates a lighting virtualization system according to another example embodiment.

FIG. 15 illustrates a lighting virtualization system 1500 according to another example embodiment, and FIGS. 16-19 illustrate images of a user space (e.g., the room 1002 shown in FIG. 10) at different stages of operations of the lighting virtualization system of FIG. 15 according to an example embodiment. For example, the user device 3102 and/or the server 3104 of FIG. 31 may be used to execute the lighting virtualization system 1500. In FIG. 15, modules that are executed as part of the operation of the lighting virtualization system 1500 are shown in a respective solid box, and inputs and outputs of the modules are shown in a respective dotted box for clarity of illustration.

Figure 16:
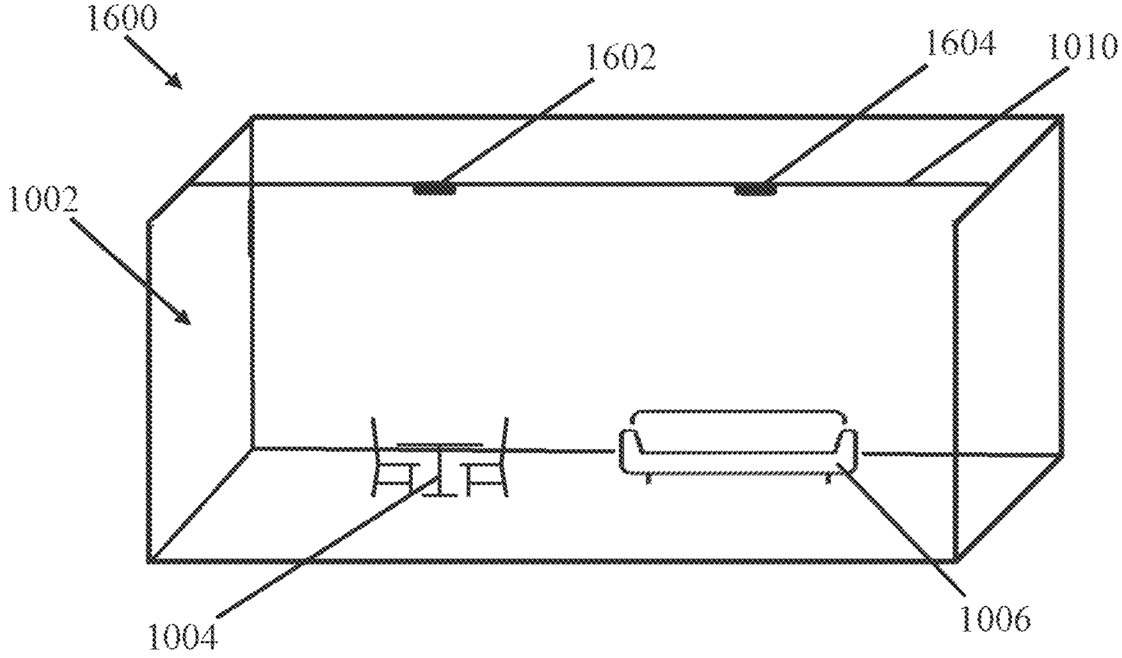
FIGS. 16-19 illustrate images of a user space at different stages of operations of the lighting virtualization system of FIG. 15 according to an example embodiment.

In some example embodiments, the lighting virtualization system 1500 includes the image insertion module 102, the GAN inversion module 104, and the trained GAN 106 described above with respect to FIG. 1. To illustrate, the image insertion module 102 may receive the user image 112 and the luminaire information 114 and may generate the input image 116. For example, FIG. 10 shows the user image 1000 that corresponds to the user image 112. FIG. 16 shows an input image 1600 that corresponds to the input image 116 and that is generated by the image insertion module 102 by inserting the luminaires 1602, 1604 in the room 1002 of the user image 1000 at locations indicated by the user. The luminaire information 114 may include images and/or descriptions of the luminaires 1602, 1604. The input image 1600 may include the chair-table set 1004 and the sofa 1006 that are in the user image 1000.

In some example embodiments, if the user approves the input image 116 corresponding to the input image 1600 of FIG. 16, the input image 116 may be provided to the GAN inversion module 104. Alternatively, the input image 116 may be provided to the GAN inversion module 104 without the approval of the input image 116 by the user.

In some example embodiments, the trained GAN 106 may be used to generate the synthetic image 120 based on the input image 116 (i.e., based on the input image 1600). To generate the synthetic image 120 by the trained GAN 106 such that the synthetic image 120 closely matches the input image 116 and thus closely represents the user image 112, the GAN inversion module 104 may determine from the input image 116 the input noise vector 118 that is provided to the trained GAN 106 in the manner described above with respect to FIG. 1. The input noise vector 118 is provided to the trained GAN 106 that uses the input noise vector 118 to generate the synthetic image 120 of the room 1002 including the luminaires 1602, 1604, the chair-table set 1004, and the sofa 1006 in the room 1002.

In some example embodiments, the synthetic image 120 may be provided to the user, for example, by displaying the synthetic image 120 on a display interface of a user device. For example, the synthetic image 120 may be provided to a user for approval of the synthetic image 120 before proceeding with other operations that use the synthetic image 120. If the synthetic image 120 is disapproved by the user, the synthetic image 120 may be regenerated starting back with the image insertion module 102, the GAN inversion module 104, or the trained GAN 106. If the user approves the synthetic image 120, the synthetic image 120 may be provided to the GAN inversion modules 1502, 1510. Alternatively, the synthetic image 120 may be provided to the GAN inversion modules 1502, 1510 without requesting and/or receiving the approval of the synthetic image 120 by the user.

In some example embodiments, the lighting virtualization system 1500 also includes GAN inversion modules 1502, 1510, derived GANs 1504, 1512. For example, the GAN inversion modules 1502, 1510 may correspond to the GAN inversion module 104 described above with respect to FIG. 1. For example, the GAN inversion module 1502 may determine from the synthetic image 120 an input noise vector 1506 that is provided to the derived GAN 1504. To illustrate, the GAN inversion module 1502 may to identify the input noise vector 1506 using the synthetic image 120 and the derived GAN 1504 by performing GAN inversion in the manner described above with respect to the GAN inversion module 108 and the derived GAN 110 of FIG. 1. The GAN inversion module 1510 may to identify the input noise vector 1514 using the synthetic image 120 and the derived GAN 1512 by performing GAN inversion in the manner described above with respect to the GAN inversion module 108 and the derived GAN 110 of FIG. 1. In some alternative embodiments, the GAN inversion module 1502 may be omitted or skipped, and, instead of the input noise vector 1506, the input noise 118 determined by the GAN inversion module 104 may be used as input noise vector to the derived GAN 1504. For example, in some example embodiments, the user may make changes to the synthetic image 120 before approving the synthetic image 120. If the user approves the synthetic image 120 without making changes, the input noise 118 generated based on the input image 116 may be used as input noise vector to the derived GAN 1502. In some example embodiments, instead of the input noise vector 1514, the input noise 118 may be used as input noise vector to the derived GAN 1510 if the user approves the synthetic image 120 without making changes.

Referring to FIGS. 1, 2, 10, 15, 16, and 17, in some example embodiments, the input noise vector 1506 is provided to the derived GAN 1504 that uses the input noise vector 1506 or the input noise vector 118 to generate the synthetic image 1508 of the room 1002 including the luminaires 1602, 1604, the chair-table set 1004, and the sofa 1006 in the room 1002. For example, the synthetic image 1508 may correspond to the synthetic image 1700 shown in FIG. 17. To illustrate, the synthetic image 1700 of the room 1002 shows the luminaires 1602, 1604, the chair-table set 1004, and the sofa 1006 as well as the synthetic light appearance 1704 associated with the luminaire 1602 and a synthetic light appearance 1702 associated with the luminaire 1604. The synthetic light appearances 1702, 1704 may be generated by the derived GAN 1504 based on a desired light appearance (e.g., narrow beam width/size of 24 degrees) with respect to the luminaire 1602 as indicated by the light appearance information 204 shown in FIG. 2. For example, the trained GAN modification module 202 of FIG. 2 may derive the derived GAN 1504 from the trained GAN 106 by changing value(s) of one or more parameters of the trained GAN 106 such that the derived GAN 110 can generate the synthetic image 1700 including the synthetic light appearances 1702, 1704 having a narrow beam width that closely matches, for example, a 24-degree light beam.

Referring to FIGS. 1, 2, 10, 15-17, and 18, in some example embodiments, the input noise vector 1514 is provided to the derived GAN 1512 that uses the input noise vector 1514 or the input noise vector 118 to generate a synthetic image 1516 (i.e., a third synthetic image 1516) of the room 1002 including the luminaires 1602, 1604, the chair-table set 1004, and the sofa 1006 in the room 1002. For example, the synthetic image 1516 may correspond to the synthetic image 1800 shown in FIG. 18. To illustrate, the synthetic image 1800 of the room 1002 shows the luminaires 1602, 1604, the chair-table set 1004, and the sofa 1006 as well as a synthetic light appearance 1802 associated with the luminaire 1602 and a synthetic light appearance 1804 associated with the luminaire 1604. The synthetic light appearances 1802, 1804 may be generated by the derived GAN 1512 based on a desired light appearance (e.g., wide beam width/size of 60 degrees) with respect to the luminaire 1604 as indicated by the light appearance information 204 shown in FIG. 2. For example, the trained GAN modification module 202 of FIG. 2 may derive the derived GAN 1512 from the trained GAN 106 by changing value(s) of one or more parameters of the trained GAN 106 such that the derived GAN 1512 can generate the synthetic image 1800 including the synthetic light appearances 1802, 1804 having a wide beam width that closely matches, for example, a 60-degree light beam.

Figure 17:
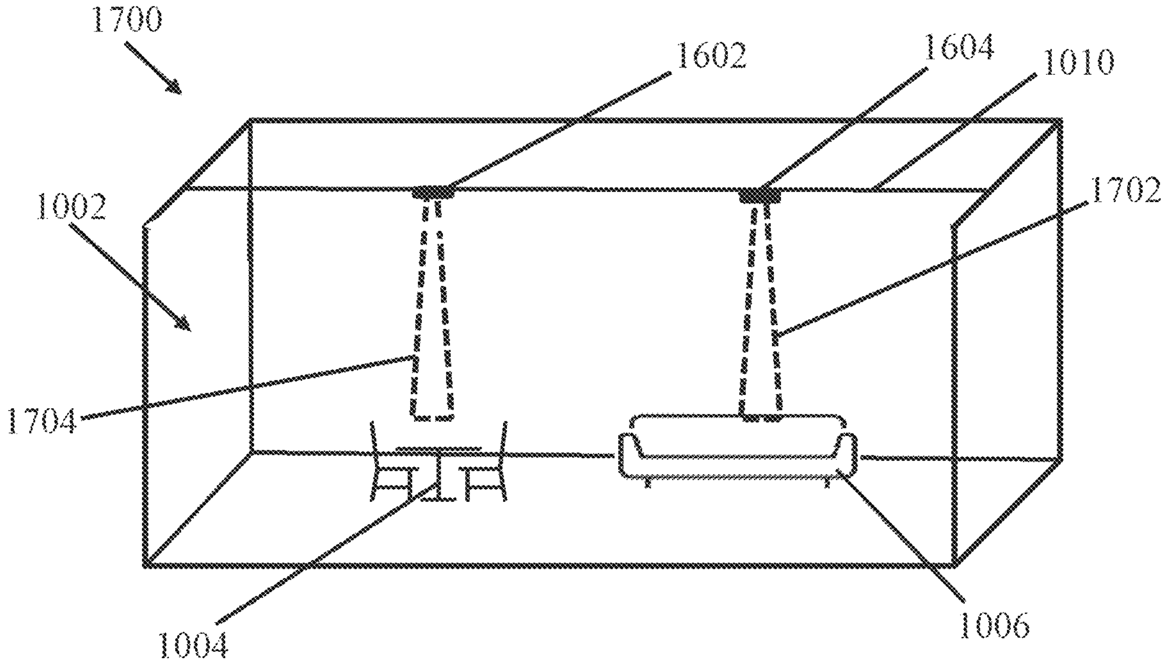
Figure 18:
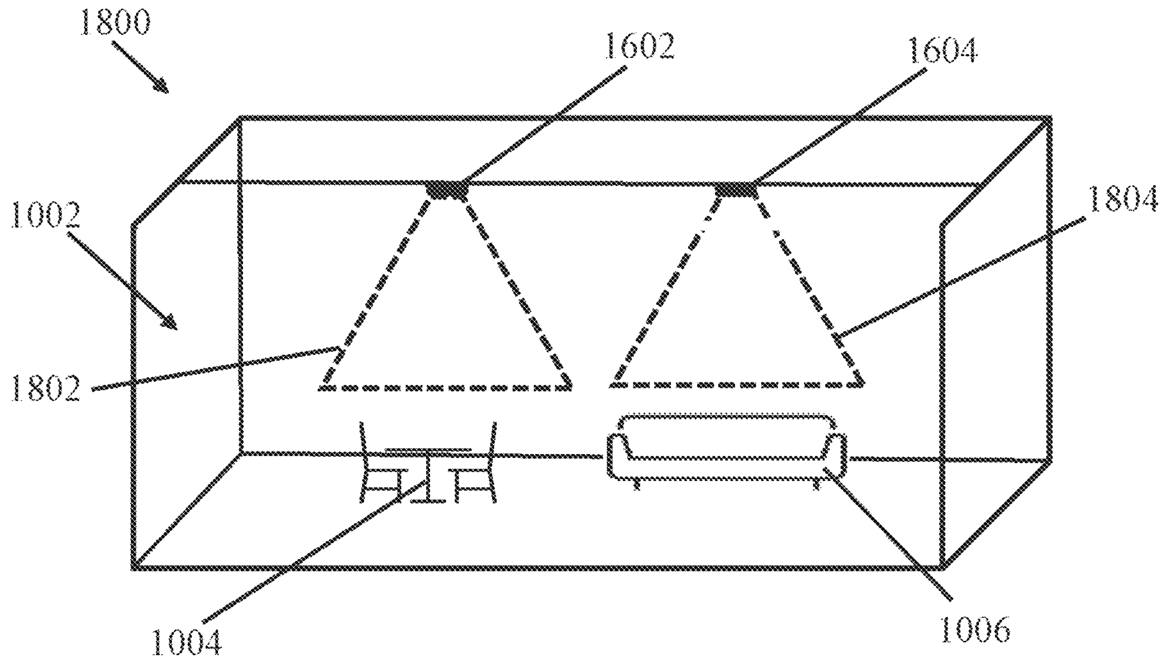
Figure 19:
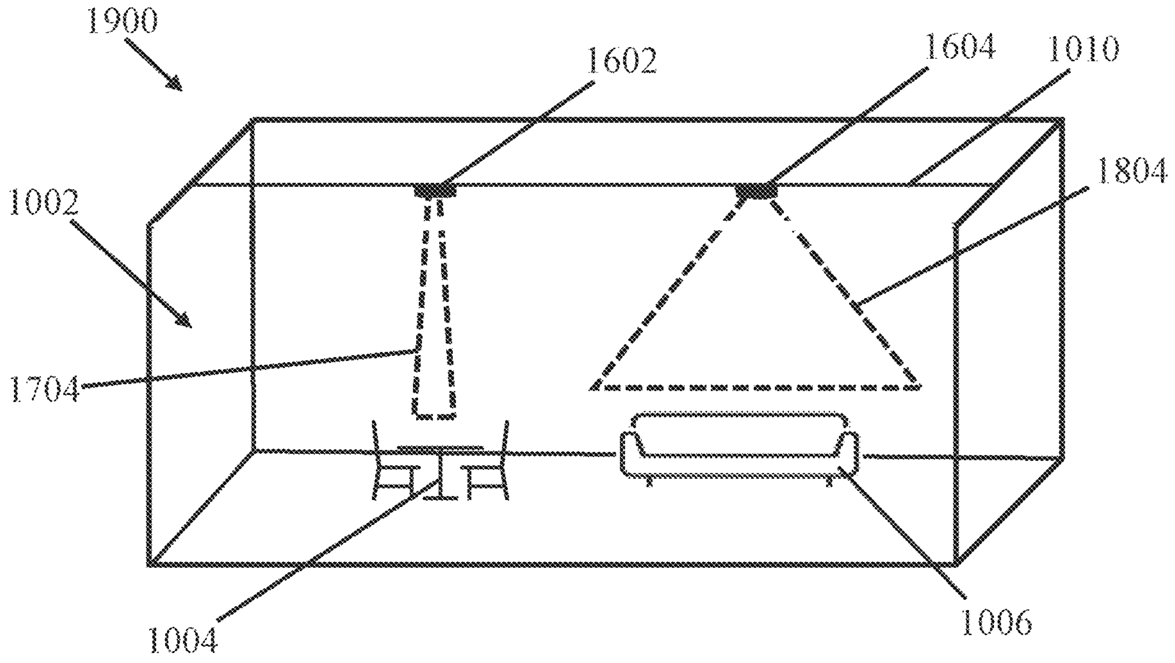

In some example embodiments, the lighting virtualization system 1500 further includes an image merging module 1518 as shown in FIG. 15. For example, the image merging module 1518 may generate the combined synthetic image 1520 by combining a portion of the synthetic image 1516 corresponding to the image 1800 with a portion of the synthetic image 1508 corresponding to the synthetic image 1700 shown in FIG. 17. For example, a portion of the synthetic image 1800 that includes the luminaire 1604 and the synthetic light appearance 1804 may be extracted from the synthetic image 1800 and replace a corresponding portion of the synthetic image 100, resulting in the image 1900 shown in FIG. 19. As shown in FIG. 19, the image 1900 includes the chair-table set 1004, the sofa 1006, and the luminaires 1602, 1604. The image 1900 also shows the synthetic light appearance 1704 associated with the luminaire 1602 as shown in FIG. 17 and the synthetic light appearance 1804 associated with the luminaire 1604 as shown in FIG. 18. The synthetic light appearance 1704 and the synthetic light appearance 1804 shown in FIG. 19 conform to the desired narrow beam width with respect to the luminaire 1602 and the desired wide beam width with respect to the luminaire 1604 indicated by the light appearance information 204 of FIG. 2 with respect to the lighting virtualization system 1500 of FIG. 15.

Although FIGS. 15-19 are described with respect to different beam widths, other light appearance elements such as, for example, intensity level and CCT may be implemented in the same manner without departing from the scope of this disclosure. In some alternative embodiments, one or more modules of the lighting virtualization system 1500 may be omitted or combined with other modules without departing from the scope of this disclosure. In some alternative embodiments, the lighting virtualization system 1500 may include additional and/or different modules than shown in FIG. 15 without departing from the scope of this disclosure. For example, a GAN inversion operation may be performed by mapping the user image 112 backward through the trained GAN 106, and the trained GAN 106 may be used to generate an initial synthetic image that closely matches the user image but that does not include an inserted luminaire. For example, the initial synthetic image may show a room that matches room shown in the user image. Subsequently, the initial synthetic image can be provided to the image insertion module 102 along with the luminaire information 114, and the image insertion module 102 may generate the input image 116 that shows the room in the initial synthetic image and one or more luminaires inserted in the room based on the luminaire information 114.

In some alternative embodiments, GAN inversion may be performed to determine an input noise vector in a different manner than described above without departing from the scope of this disclosure. In some alternative embodiments, the lighting virtualization system 1500 may include more than two derived GANs and may generate more than two synthetic images, where the synthetic images are processed to combine portions of the synthetic images as described above without departing from the scope of this disclosure. In some alternative embodiments, the room 1002 in the image 1000 and the images 1600-1900 may include more, fewer, and/or different objects than shown without departing from the scope of this disclosure. For example, the images 1600-1900 may include more than two luminaires. In some example embodiments, the luminaires 1602, 1604 may be the same type of luminaires or different types of luminaires without departing from the scope of this disclosure. Although the lighting virtualization system 1500 of FIG. 15 is described with respect to a room, the lighting virtualization system 1500 may be applicable to other areas including outdoor spaces.

Figure 20:
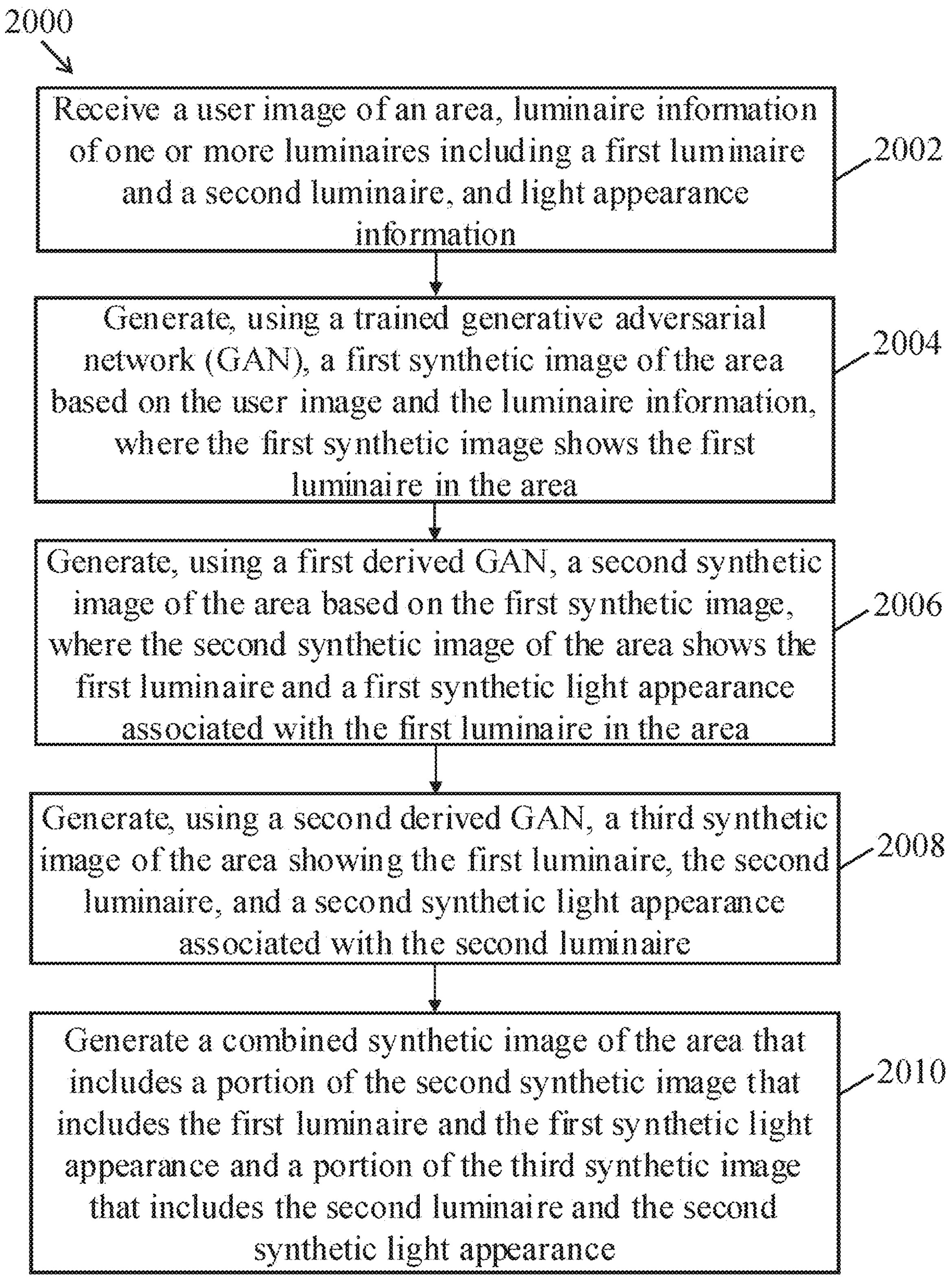
FIG. 20 illustrates a lighting virtualization method based on the lighting virtualization system of FIG. 15 according to another example embodiment.

FIG. 20 illustrates a lighting virtualization method 2000 according to an example embodiment. Referring to FIGS. 1, 2, 10, and 15-20, in some example embodiments, the method 2000 may be implemented by a microprocessor of a user device and/or a server. For example, the system of FIG. 31 may be used to execute the method 2000. The method 2000 may include, at step 2002, receiving a user image 112 of an area, luminaire information 114 of one or more luminaires (e.g., the luminaire 1602 and the luminaire 1604), and light appearance information 204. For example, the user image 112 of FIG. 15 may correspond to the user image 1000 of FIG. 10 showing the room 1002. A user device 3102 (e.g., a smartphone) and/or a server 3104 (e.g., a cloud server) of FIG. 31 may receive the user image 112, the luminaire information 114, and the light appearance information 204 that may each be provided by a user. For example, the server 3104 may receive the user image 112, the luminaire information 114, and the light appearance information 204 via the user device 3102. In some example embodiments, the step 2002 of the method 2000 may correspond to the step 1402 of the method 1400.

In some example embodiments, the method 2000 includes, at step 2004, generating, using the trained GAN 106, a first synthetic image (e.g., the synthetic image 120) of the area based on the user image 112 and the luminaire information 114, where the first synthetic image shows the first luminaire in the area. For example, the first synthetic image may be the synthetic image 120, and the user image 112 may correspond to the user image 1000 of FIG. 10. A user device (e.g., a smartphone) and/or a server (e.g., a cloud server) may perform the step 2004. In some example embodiments, the step 2004 of the method 2000 may correspond to the step 1404 of the method 1400.

In some example embodiments, the method 2000 includes, at step 2006, generating, using the derived GAN 110 or the derived GAN 1506, a second synthetic image 1508 of the area based on the first synthetic image (e.g., the synthetic image 120). For example, the second synthetic image 1508 may be correspond to the synthetic image 124 shown in FIG. 1 and the synthetic image 1700 of FIG. 17. The second synthetic image 1508 (e.g., corresponding to the synthetic image 1700) may show the first luminaire (e.g., the luminaire 1602) and a first synthetic light appearance (e.g., the synthetic light appearance 1704) associated with the first luminaire (e.g., the luminaire 1602) in the area (e.g., the room 1002). The user device 3102 and/or the server 3104 of FIG. 31 may perform the step 2006. The synthetic light appearance 1704 may closely match the desired light appearance indicated by the light appearance information 204 with respect to the first luminaire, i.e., the luminaire 1602. In some example embodiments, the step 2006 of the method 2000 may correspond to the step 1406 of the method 1400.

In some example embodiments, the method 2000 includes, at step 2008, generating, using the derived GAN 1512, a third synthetic image 1516 (e.g., the synthetic image of the area (e.g., the room 1002) based on the first synthetic image (e.g., the synthetic image 120). For example, the third synthetic image may be the synthetic image 1516 of FIG. 15 corresponding to the synthetic image 1800 of FIG. 18. The user device 3102 and/or the server 3104 of FIG. 31 may perform the step 2008. The third synthetic image (e.g., the synthetic image 1800) may show the first luminaire (e.g., the luminaire 1602), the second luminaire (e.g., the luminaire 1604), and a second synthetic light appearance (e.g., the synthetic light appearance 1804) associated with the second luminaire. The user device 3102 and/or the server 3104 of FIG. 31 may perform the step 2008.

In some example embodiments, the method 2000 includes, at step 2010, generating a combined synthetic image 1520 of the area (e.g., the room 1002) that includes a portion of the second synthetic image 1508 (which corresponds to the synthetic image 1700) that includes the first luminaire (e.g., the luminaire 1602) and the first synthetic light appearance (e.g., the synthetic light appearance 1704) and a portion of the third synthetic image 1516 (e.g., the synthetic image 1800) that includes the second luminaire (e.g., the luminaire 1604) and the second synthetic light appearance (e.g., the synthetic light appearance 1804). The synthetic light appearance 1804 may closely match the desired light appearance indicated by the light appearance information 204 with respect to the second luminaire, i.e., the luminaire 1604. The user device 3102 and/or the server 3104 of FIG. 31 may perform the step 2010.

By combining relevant portions of the synthetic image 1700 and the synthetic image 1800, the synthetic image 1900 that shows synthetic light appearances 1704, 1804 that closely match the desired light appearances indicated by the light appearance information 204.

In some alternative embodiments, the method 200 may include more or fewer steps than shown in FIG. 20 without departing from the scope of this disclosure. In some alternative embodiments, the steps of the method 2000 may be performed in a different order than shown without departing from the scope of this disclosure.

Figure 21:
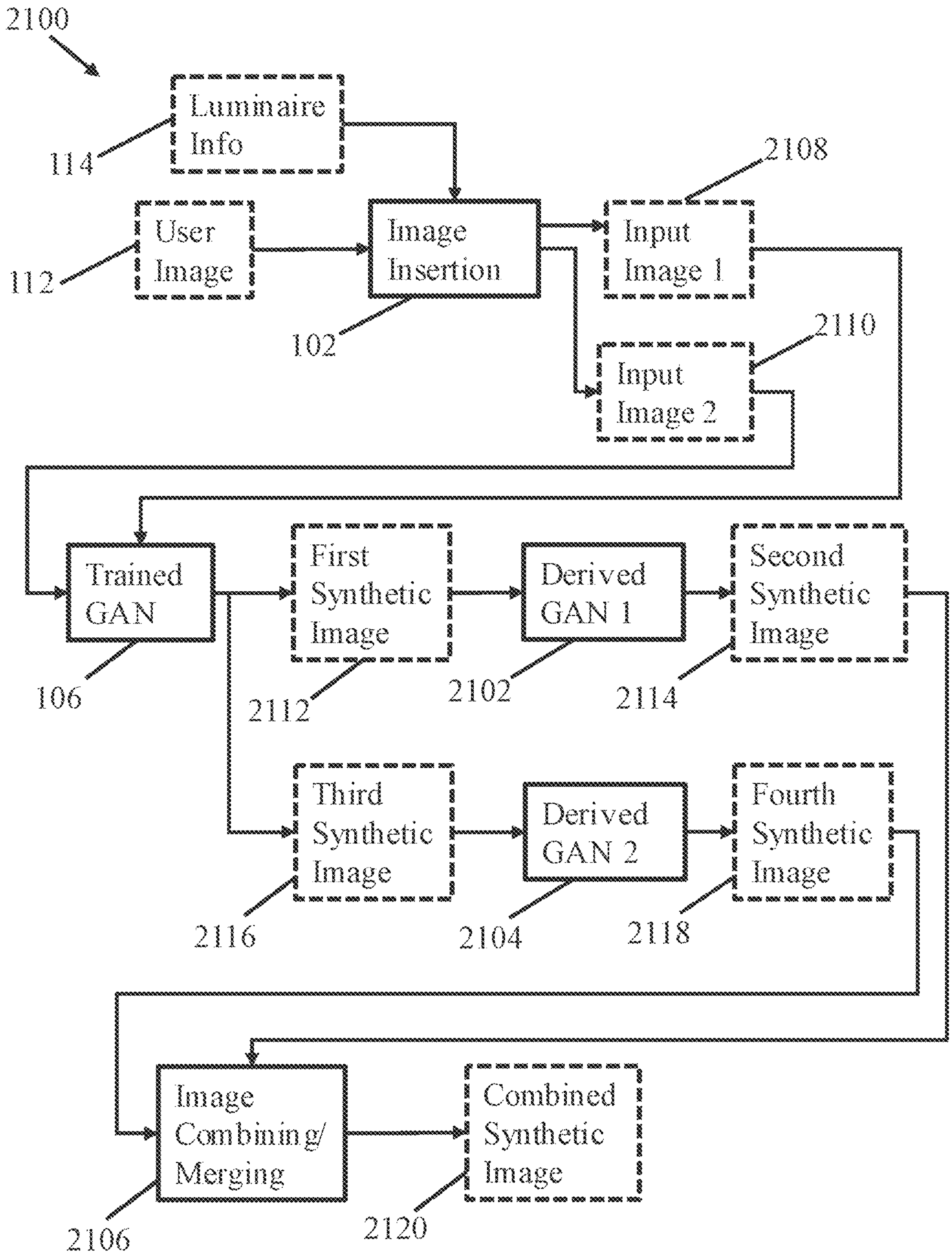
FIG. 21 illustrates a lighting virtualization system according to another example embodiment.

FIG. 21 illustrates a lighting virtualization system 2100 according to another example embodiment. The lighting virtualization system 2100 is described below with respect to FIGS. 6-8 and FIGS. 22-24 that illustrate images of the room 602 of FIG. 6 at different stages of operation of the lighting virtualization system 2100 of FIG. 21 according to an example embodiment. For example, the user device 3102 and/or the server 3104 of FIG. 31 may be used to execute the lighting virtualization system 2100. In FIG. 21, modules that are executed as part of the operation of the lighting virtualization system 2100 are shown in a respective solid box, and inputs and outputs of the modules are shown in a respective dotted box for clarity of illustration.

In some example embodiments, the lighting virtualization system 2100 includes the image insertion module 102 and the trained GAN 106 described above with respect to FIG. 1. The lighting virtualization system 2100 may also include a first derived GAN 2102, a second derived GAN 2104, an image merging module 2106. The image insertion module 102 may receive the user image 112 and the luminaire information 114 and may generate a first input image 2108. For example, FIG. 6 shows the user image 600 that corresponds to the user image 112, and FIG. 7 shows the image 700 that corresponds to the input image 2108 and that is generated by the image insertion module 102 by inserting a luminaire 702 in the user image 600 at locations indicated by the user. The user image 600 and the image 700 may each include the bed 604, the bedside table 606, and the sofa 608 that are in the room 602. The image 700 may also include the luminaire 702.

Figure 22:
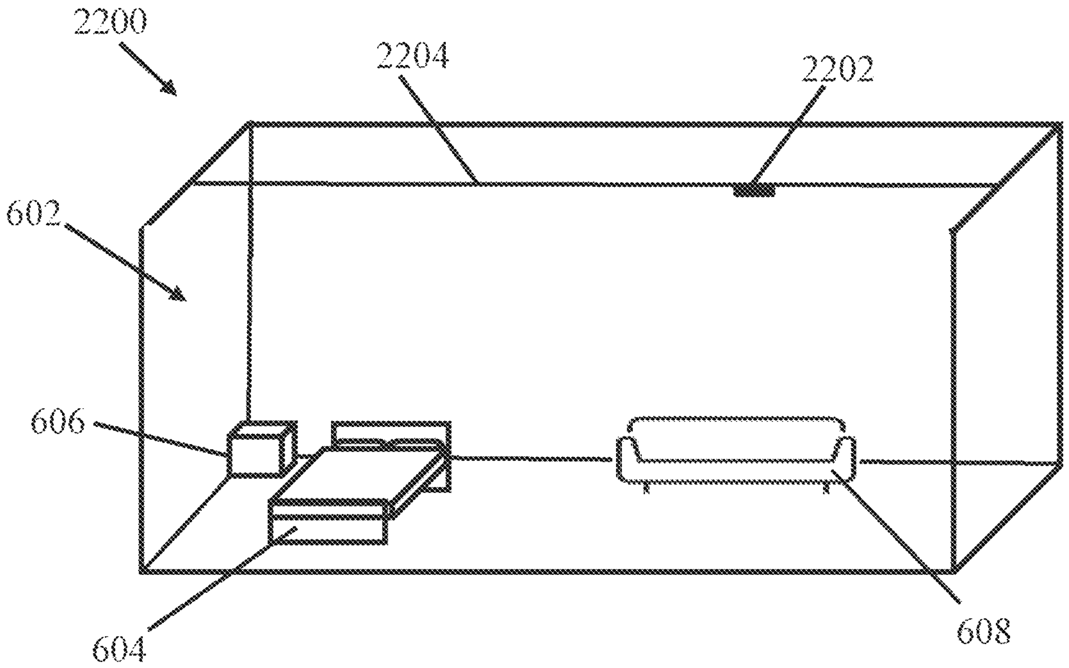
FIGS. 22-24 illustrate images of a user space at different stages of operations of the lighting virtualization system of FIG. 21 according to an example embodiment.

In some example embodiments, the image insertion module 102 may generate a second input image 2110 based on the user image 112 and the luminaire information 114. For example, the luminaire information 114 may indicate a second luminaire 2202 (shown in FIG. 22) as the luminaire to be inserted in the user image 112 to generate the second input image 2110. As shown in FIG. 22, the second luminaire 2202 may be a different type of luminaire from the luminaire 702.

In some example embodiments, the image insertion module 102 may insert the second luminaire 2202 in the user image 600 shown in FIG. 6 that corresponds to the user image 112. FIG. 22 shows the image 2200 that corresponds to the input image 2110 and that is generated by the image insertion module 102 by inserting the second luminaire 2202 in the user image 600 at locations (e.g., at a ceiling structure 2204) indicated by the user. The user image 600 and the image 2200 may each include the bed 604, the bedside table 606, and the sofa 608 in the room 602. The image 2200 may also include the second luminaire 2202.

In some example embodiments, the trained GAN 106 may be used to generate a first synthetic image 2112 based on the input image 2108 corresponding to the image 700. For example, the first synthetic image 2112 may correspond to the synthetic image 120 in FIG. 1. To generate the first synthetic image 2112 by the trained GAN 106 such that the synthetic image 2112 closely matches the input image 2108, a GAN inversion operation may be performed on the trained GAN 106 based on the input image 2108 to determine an input noise vector that is provided to the trained GAN 106 in the manner described above with respect to FIG. 1. The input noise vector is provided to the trained GAN 106 that uses the input noise vector to generate the second synthetic image 2112 of the room 602 including the luminaire 702, the bed 604, the bedside table 606, and the sofa 608 in the room 602.

To generate the third synthetic image 2116 by the trained GAN 106 such that the synthetic image 2116 closely matches the input image 2110, a GAN inversion operation may be performed on the trained GAN 106 based on the input image 2110 to determine an input noise vector that is provided to the trained GAN 106 in the manner described above with respect to FIG. 1. The input noise vector is provided to the trained GAN 106 that uses the input noise vector to generate the third synthetic image 2116 of the room 602 including the luminaire 2202, the bed 604, the bedside table 606, and the sofa 608 in the room 602.

In some example embodiments, the first derived GAN 2102, which may correspond to the derived GAN 110 of FIG. 1, may generate a second synthetic image 2114 based on the first synthetic image 2112. For example, the second synthetic image 2114 may correspond to the synthetic image 124 of FIG. 1 and the synthetic image 800 of FIG. 8. The derived GAN 2102 may use an input noise vector generated by performing GAN inversion based on first synthetic image 2112 in the manner described above with respect to the derived GAN 110 and FIG. 1. The derived GAN 2102 may be derived from the trained GAN 106 based on the light appearance information 204 of FIG. 2 by changing value(s) of one or more parameters of the trained GAN 106 such that the derived GAN 2102 generates the second synthetic image 2114 including a synthetic light appearance 802 of FIG. 8 that closely matches a desired light appearance indicated by the light appearance information 204 of FIG. 2 with respect to the luminaire 702.

In some example embodiments, a second derived GAN 2104 may generate a fourth synthetic image 2118 based on the third synthetic image 2116. For example, the fourth synthetic image 2118 may correspond to a synthetic image 2300 of FIG. 23. The second derived GAN 2104 may use an input noise vector generated by performing GAN inversion based on third synthetic image 2112 in the manner described above with respect to the derived GAN 110 and FIG. 1. The second derived GAN 2104 may be derived from the trained GAN 106 based on the light appearance information 204 of FIG. 2 by changing value(s) of one or more parameters of the trained GAN 106 such that the second derived GAN 2104 generates the fourth synthetic image 2118 including a second synthetic light appearance 2302 of FIG. 23 that closely matches a desired light appearance indicated by the light appearance information 204 of FIG. 2 with respect to the luminaire 2202.

Figure 24:
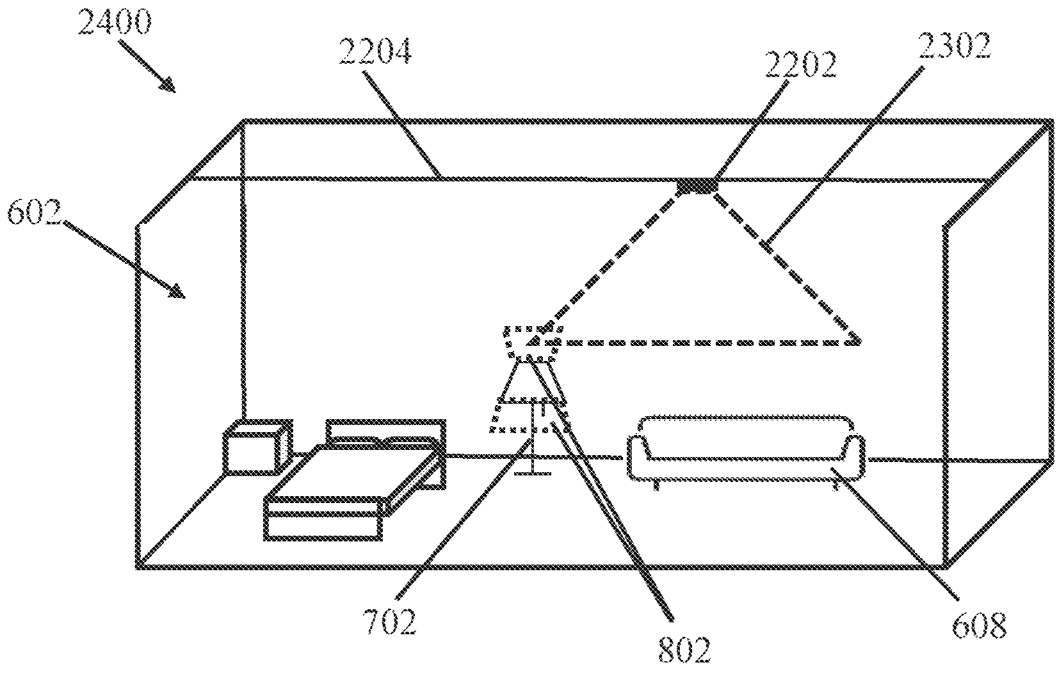

In some example embodiments, the image merging module 1518 may combine a portion of the synthetic image 800 of FIG. 8 and a portion of the synthetic image 2300 of FIG. 3 to generate a combined synthetic image 2120 corresponding to a combined synthetic image 2400 of FIG. 24. As can be seen in FIG. 24, the image merging module 1518 may combine the portions of the synthetic image 800 and the synthetic image 2300 such that the synthetic light appearance 802 and the synthetic light appearance 2302 overlap each other.

Although FIGS. 21-24 are described with respect to different beam widths/sizes, other light appearance elements such as, for example, intensity level and CCT may be implemented in the same manner without departing from the scope of this disclosure. In some alternative embodiments, one or more modules of the lighting virtualization system 2100 may be omitted or combined with other modules without departing from the scope of this disclosure. In some alternative embodiments, the lighting virtualization system 2100 may include additional and/or different modules than shown in FIG. 21 without departing from the scope of this disclosure.

In some alternative embodiments, the lighting virtualization system 2100 may include more than two derived GANs and may generate more than two synthetic images, where the synthetic images are processed to combine portions of the synthetic images as described above without departing from the scope of this disclosure. In some alternative embodiments, the room 602 shown in FIGS. 6-8 and 22-24 may include more, fewer, and/or different objects (e.g., luminaires) than shown without departing from the scope of this disclosure. In some example embodiments, the luminaires 702, 2202 may be the same or different types of luminaires without departing from the scope of this disclosure. Although the lighting virtualization system 2100 of FIG. 21 is described with respect to the room 602, the lighting virtualization system 2100 may be applicable to other areas including outdoor spaces.

Figure 25:
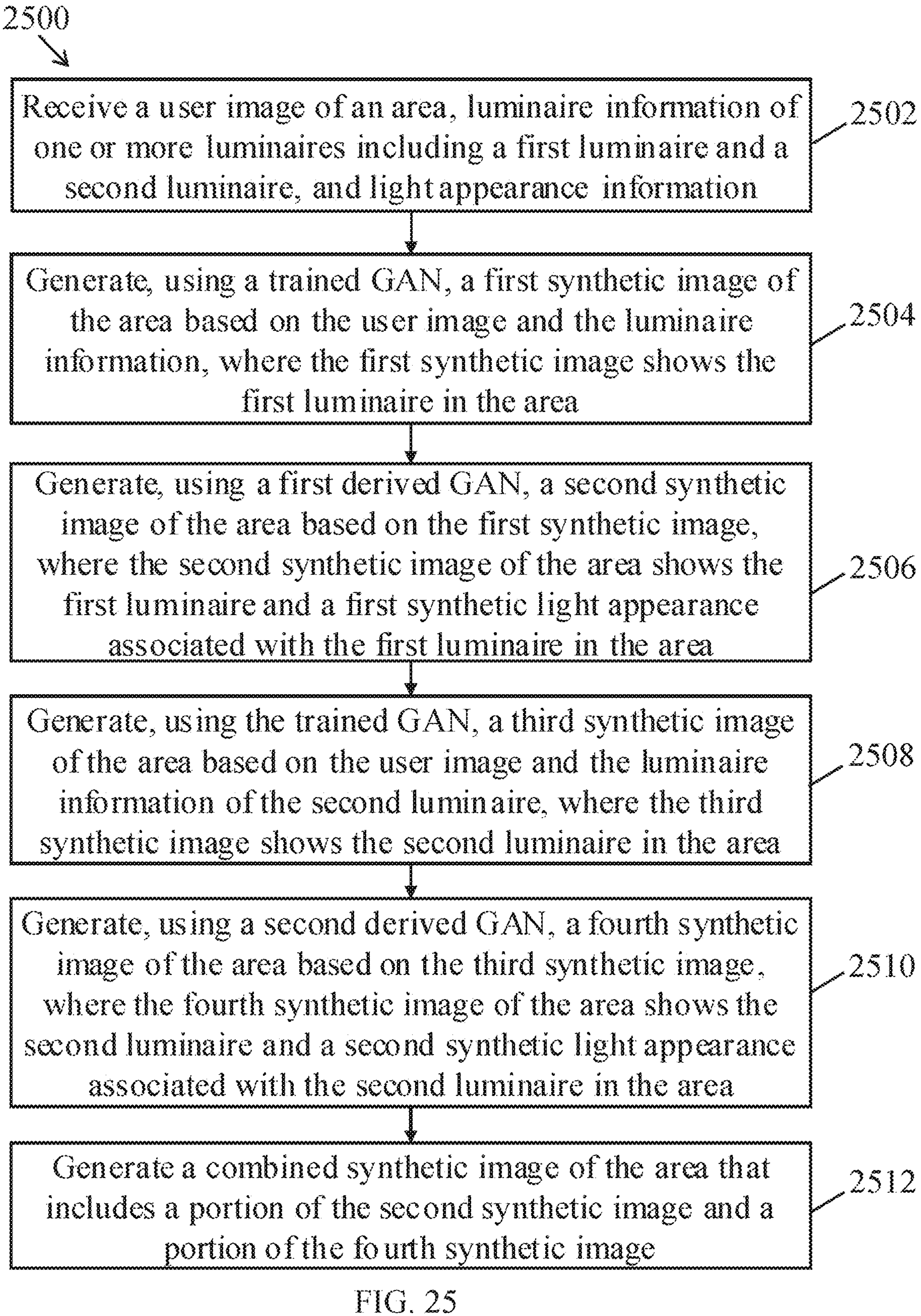
FIG. 25 illustrates a lighting virtualization method based on the lighting virtualization system 21 according to another example embodiment.

FIG. 25 illustrates a lighting virtualization method 2500 according to an example embodiment. Referring to FIGS. 1, 2, 6-8, and 21-25, in some example embodiments, the method 2500 may be implemented by a microprocessor of a user device and/or a server. For example, the system of FIG. 31 may be used to execute the method 2500. The method 2500 may include, at step 2502, receiving a user image 112 of an area (e.g., the room 602 of FIG. 6), luminaire information 114 of one or more luminaires (e.g., the luminaire 702 and the luminaire 2202), and light appearance information 204. For example, the user image 112 of FIG. 21 may correspond to the user image 600 of FIG. 6 showing the room 602. A user device 3102 (e.g., a smartphone) and/or a server 3104 (e.g., a cloud server) of FIG. 31 may receive the user image 112, the luminaire information 114, and the light appearance information 204 that may each be provided by a user. For example, the server 3104 may receive the user image 112, the luminaire information 114, and the light appearance information 204 via the user device 3102. In some example embodiments, the step 2502 of the method 2500 may correspond to the step 1402 of the method 1400 and the step 2002 of the method 2000.

In some example embodiments, the method 2500 includes, at step 2504, generating, using the trained GAN 106, a first synthetic image 2112 of the area based on the user image 112 and the luminaire information 114, where the first synthetic image 2112 shows the luminaire 702 in the area. For example, the first synthetic image 2112 may correspond to the synthetic image 120 shown in FIG. 1. A user device (e.g., a smartphone) and/or a server (e.g., a cloud server) may perform the step 2504. In some example embodiments, the step 2504 of the method 2500 may correspond to the step 1404 of the method 1400 and the step 2004 of the method 2000.

In some example embodiments, the method 2500 includes, at step 2506, generating, using the first derived GAN 2102 (which may correspond to the derived GAN 110 of FIG. 1), a second synthetic image 2114 of the area (e.g., the room 1002) based on the first synthetic image 2112. For example, the second synthetic image 2114 may correspond to the synthetic image 124 shown in FIG. 1 and the synthetic image 800 of FIG. 8. The second synthetic image 2114 may show the luminaire 702 and a first synthetic light appearance 802 associated with the luminaire 702 in the room 602. The synthetic light appearance 802 may closely match the desired light appearance indicated by the light appearance information 204 with respect to the luminaire 702. In some example embodiments, the step 2506 of the method 2500 may correspond to the step 1406 of the method 1400 and the step 2006 of the method 2000. The user device 3102 and/or the server 3104 of FIG. 31 may perform the step 2506.

In some example embodiments, the method 2500 includes, at step 2508, generating, using the trained GAN 106, a third synthetic image 2116 of the area (e.g., the room 602) based on the user image 112 and luminaire information of a second luminaire 2202, where the third synthetic image 2116 shows the second luminaire 2202 in the area. The luminaire information 204 (shown in FIG. 4) of the one or more luminaires includes the luminaire information of the second luminaire 2202. The luminaire 702 and the second luminaire 2202 may be different types of luminaires from each other. The user device 3102 and/or the server 3104 of FIG. 31 may perform the step 2508.

In some example embodiments, the method 2500 includes, at step 2510, generating, using the second derived GAN 2104, the fourth synthetic image 2118 of the area (e.g., the room 602) based on the third synthetic image 2116. For example, the fourth synthetic image 2118 may correspond to the synthetic image 2300. The fourth synthetic image 2118 of the area shows the second luminaire 2202 and the second synthetic light appearance 2302 associated with the second luminaire 2202 in the area. The light appearance information 204 is related to the one or more parameters of the trained GAN 106, where the trained GAN 106 is modified based on the second light appearance information 204 to derive the second derived GAN 2104. The trained GAN is modified based on the light appearance information 204 to derive the first derived GAN 2102, where one or more values of one or more parameters of the second derived GAN 2104 are different from the one or more values of the one or more parameters of the trained GAN 106 and where the one or more parameters of the trained GAN 106 correspond to the one or more parameters of the second derived GAN 2104. The second synthetic light appearance 2302 depends on the one or more values of the one or more parameters of the second derived GAN 2104. The user device 3102 and/or the server 3104 of FIG. 31 may perform the step 2510.

Figure 23:
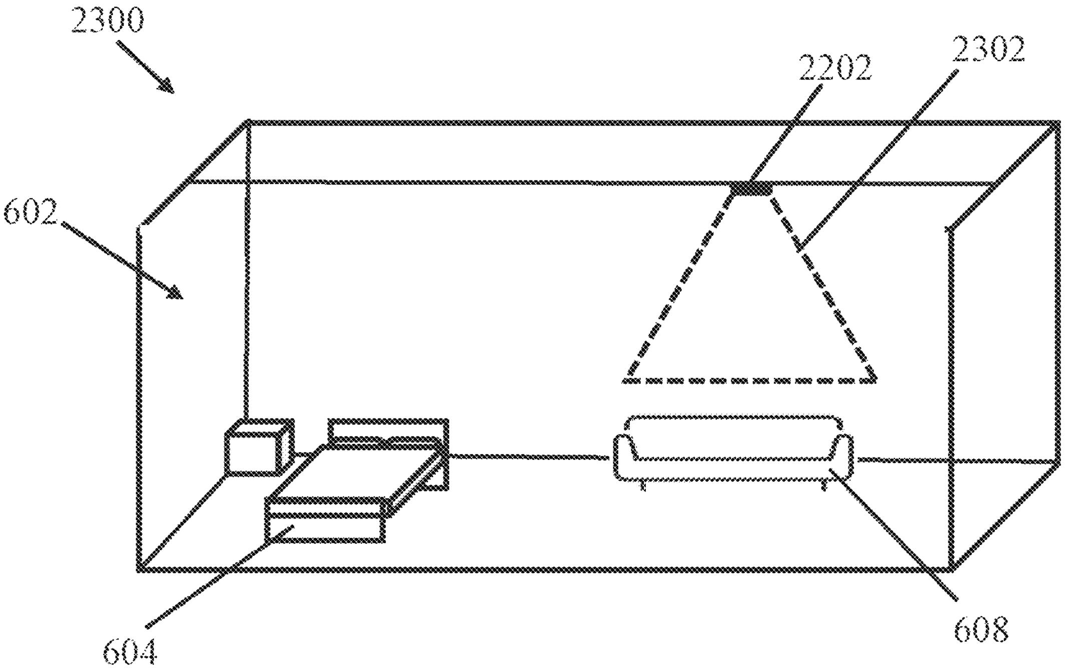

In some example embodiments, the method 2500 includes, at step 2512, generating the combined synthetic image 2120 of the area (e.g., the room 602) that includes a portion of the second synthetic image 2114 (which corresponds to the synthetic image 800 of FIG. 8) and a portion of the fourth synthetic image 2118 (which corresponds to the synthetic image 2300 of FIG. 23). For example, the portion of the synthetic image 800 includes the luminaire 702 and the synthetic light appearance 802, and the portion of the synthetic image 2300 includes the second luminaire 2202 and the second synthetic light appearance 2302. The user device 3102 and/or the server 3104 of FIG. 31 may perform the step 2512.

Figure 26:
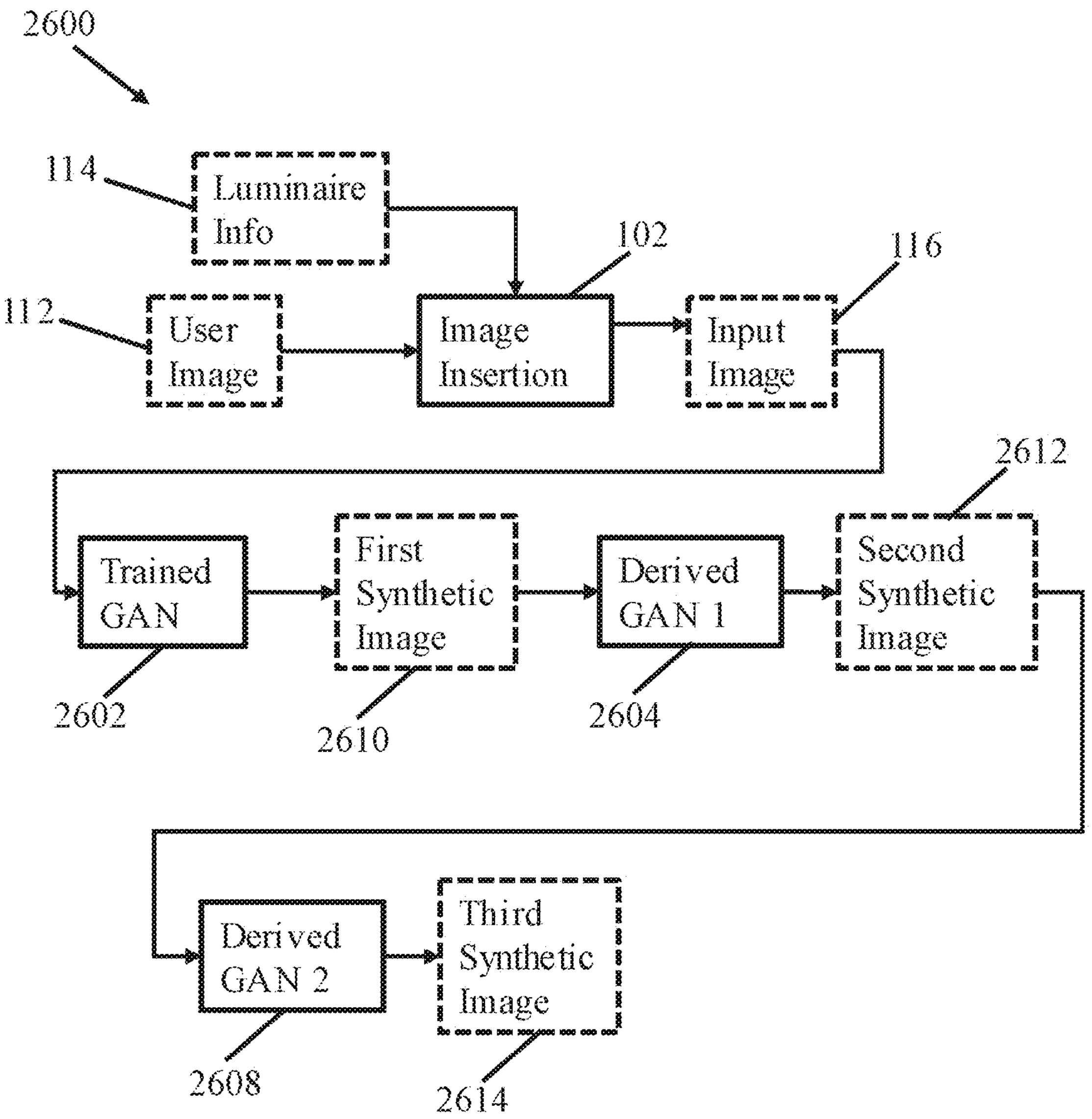
FIG. 26 illustrates a lighting virtualization system according to another example embodiment.

FIG. 26 illustrates a lighting virtualization system 2600 according to another example embodiment. In some example embodiments, the lighting virtualization system 2600 includes the image insertion module 102, a trained GAN 2602, a first derived GAN 2604, and a second derived GAN 2608. For example, the image insertion module 102, the trained GAN 2602, the first derived GAN 2604, and a second derived GAN 2608 may each be a software module that can be stored in a memory device and executed by a processor, such a microprocessor, of a user device and/or a server such as a local network server or a cloud server. A user device and/or a server shown in FIG. 31 may be used to execute the operations described herein with respect to the lighting virtualization system 2600 of FIG. 26. In FIG. 26, modules that are executed as part of the operation of the lighting virtualization system 2600 are shown in a respective solid box, and inputs and outputs of the modules are shown in a respective dotted box for clarity of illustration.

Figure 27:
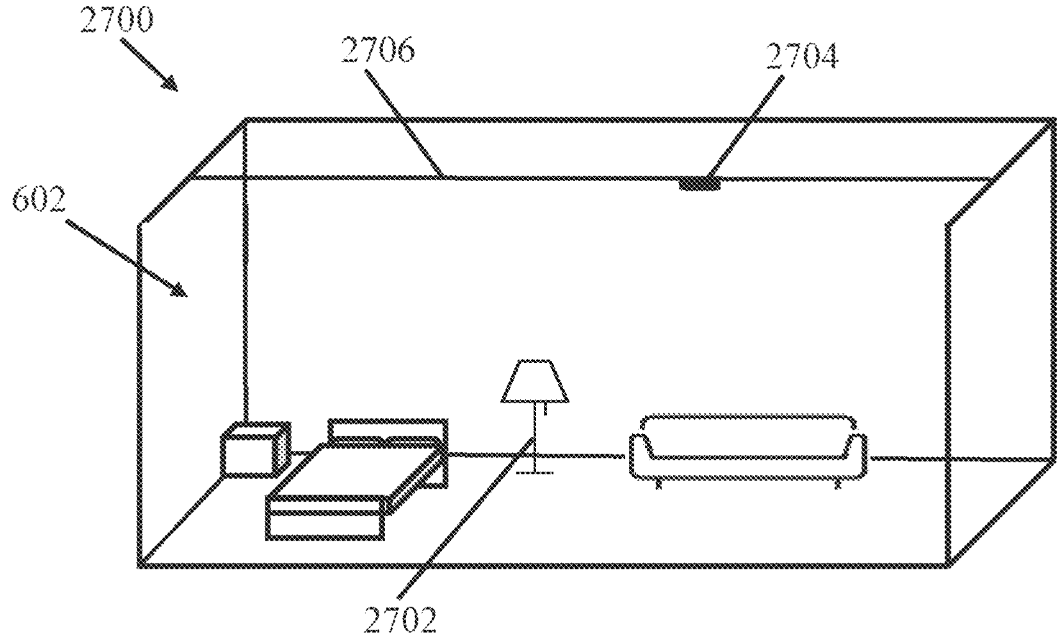
FIGS. 27-29 illustrate images of a user space at different stages of operations of the lighting virtualization system of FIG. 26 according to an example embodiment.

In some example embodiments, the image insertion module 102 may generate the input image 116 that corresponds to an image 2700 shown in FIG. 27 based on the user image 112 and the luminaire information 114. For example, the image insertion module 102 may insert luminaires 2702, 2704 in the user image 600 of FIG. 6 at location in the room 602 indicated by a user to generate the image 2700. To illustrate, the luminaire 2702, which a floor lamp luminaire, may be on the floor of the room 602 and the luminaire 2704, which may be a downlight luminaire, may be attached to a ceiling structure 2706 of the room 602.

In some example embodiments, the trained GAN 2602 of FIG. 26 may generate a first synthetic image 2610. For example, the trained GAN 2602 may use an input noise vector determined by performing GAN inversion based on the image 2700 to generate the first synthetic image 2610. The trained GAN 2602 may have been trained using training images that include some floor lamp luminaires (i.e., the same type of luminaires as the luminaire 2702) that are on and some floor lamp luminaires off. The training images used to train the trained GAN 2602 may not include downlight luminaires or may include downlight luminaires that always off.

In some example embodiments, the derived GAN 2604 may be derived from the trained GAN 2602 based on a desired light appearance indicated by the light appearance information 204 shown in FIG. 2. For example, values of one or more parameters of the trained GAN 2602 may be changed to derive the derived GAN 2604 such that the derived GAN 2604 generates a second synthetic image 2612 that includes a synthetic light appearance that closely matches the desired light appearance. The derived GAN 2604 may use an input noise vector determined by performing GAN inversion based on the first synthetic image 2610 to generate the second synthetic image 2612. The second synthetic image 2612 generated by the derived GAN 2604 may correspond to a synthetic image 2800 of FIG. 28, where the luminaire 2702 is associated with a synthetic light appearance 2802 in the room but the luminaire 2704 is not. Because the trained GAN 2602 from which the derived GAN 2604 is derived is trained using training images that do not include downlight luminaires or that do not include downlight luminaires that are on, the derived GAN 2604 may not generate a light appearance associated with the luminaire 2704.

Figure 28:
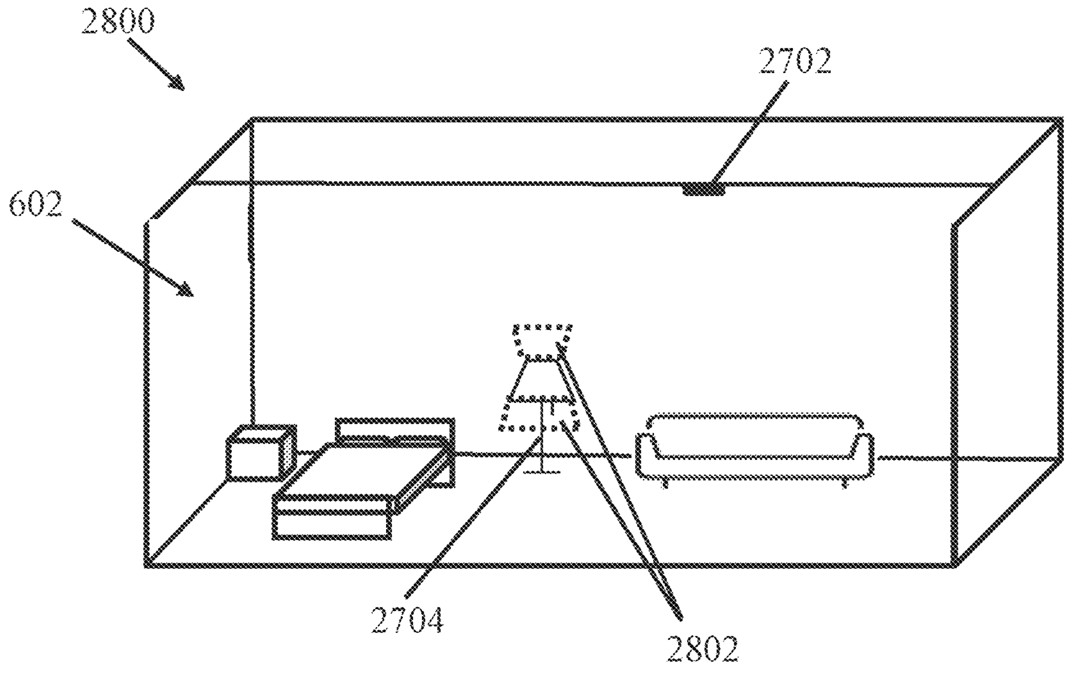
Figure 29:
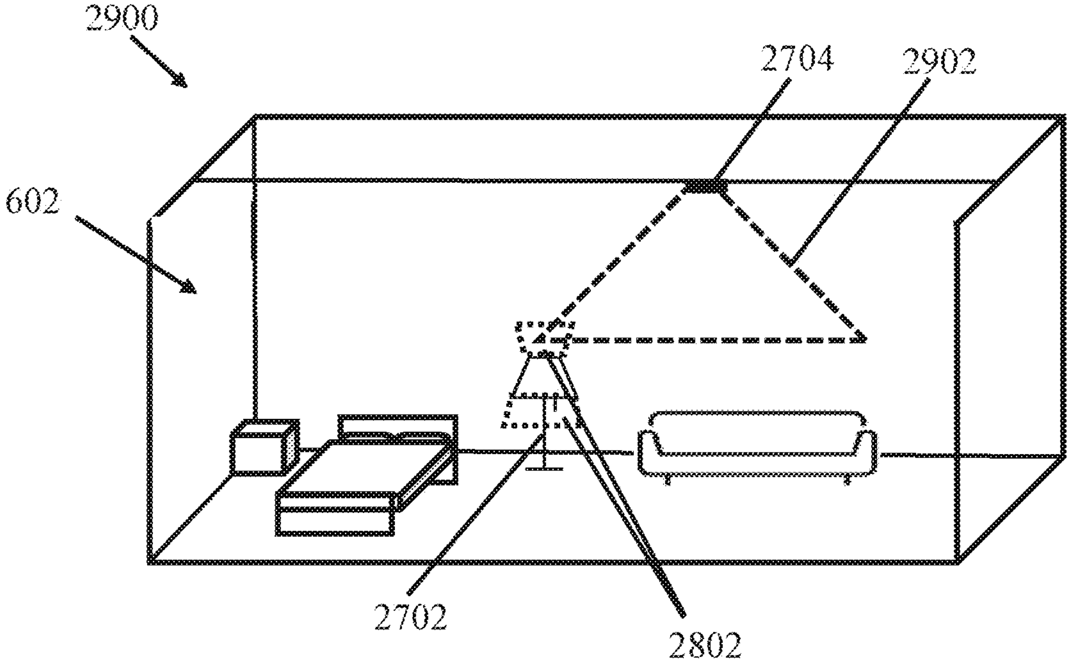

In some example embodiments, the second derived GAN 2608 of FIG. 26 may generate a third synthetic image 2614 based on the synthetic image 2800 of FIG. 28 that corresponds to the second synthetic image 2612. The third synthetic image 2614 may correspond to the synthetic image 2900 of FIG. 29. The second derived GAN 2608 may use an input noise vector determined by performing GAN inversion based on the image 2612 (i.e., the synthetic image 2800) to generate the third synthetic image 2614.

In some example embodiments, the second derived GAN 2608 may be derived from a trained GAN that have has been trained using training images that include some downlight luminaires (i.e., the same type of luminaires as the luminaire 2704) that are on and some downlight luminaires that are off. The training images used to train the trained GAN from which the derived GAN 2608 is derived may not include floor lamp luminaires or may include floor lamp luminaires that always off. Because the trained GAN from which the derived GAN 2608 is derived is trained using training images that do not include floor lamp luminaires or that do not include floor lamp luminaires that are on, the derived GAN 2608 may generate the third synthetic image 2614 (i.e., the synthetic image 2900) that leaves the luminaire 2702 and the associated synthetic light appearance 2802 unaltered in the area 602 and renders a synthetic light appearance 2902 that is associated with the luminaire 2704.

In some example embodiments, the image insertion module 102 may receive luminaire information 114 that includes, for example, an image of a luminaire. For example, the luminaire information may include an image of a luminaire in a page of a store catalog or in a picture taken by a person. Alternatively or in addition, the luminaire information may include a description of a luminaire such as the type of luminaire. For example, a user may describe a luminaire as one or more of a ceiling recessed luminaire, a pendant, a chandelier, a floor lamp, a troffer, spotlight, table shade lamp, a down light, etc. As another example, the user may provide a stock keeping unit ("SKU") number or another identifier, and the user device may retrieve an image of the luminaire from a database based on the SKU number or the other identifier.

In some example embodiments, the image insertion module 102 may insert the luminaire shown in or described by the luminaire information in the user image 112, for example, at a location in the user image 112 indicated by the user. For example, the user may provide coordinates or may use a cursor to indicate the location in the user image 112 for the insertion of the luminaire in the user image 112. The image insertion module 102 may insert the luminaire in the user image 112 at the indicated location and generate an input image 116 that shows, for example, the room in the user image 112 and the luminaire at the indicated location in the room. For example, the image insertion module 102 may display the input image 116 on a display screen of the user device. The image insertion module 102 or another module may request the user for approval of the input image 116 before providing the input image 116 for subsequent operations. If the user disapproves the input image 116, the object insertion operation may be repeated by the image insertion module 102 until the user approves the input image 116. If the user approves the input image 116, the input image 116 may be provided to the GAN inversion module 104. Alternatively, the input image 116 may be provided to the GAN inversion module 104 without the approval of the input image 116 by the user.

In some example embodiments, the luminaire information 114 may include an image of multiple luminaires (e.g., two luminaires) of the same or different type, multiple images of luminaires (e.g., two images that each show a single luminaire). For example, the image insertion module 102 may insert two luminaires in the user image 112 at respective locations indicated by the user such that the input image 116 shows, for example, the room shown in the user image 112 and the two inserted luminaires at the respective locations in the room.

In some example embodiments, the trained GAN 106 may be used to generate a synthetic image 120 based on the input image 116. To generate the synthetic image 120 by the trained GAN 106 such that the synthetic image 120 closely matches the input image 116 and thus closely represents the user image 112, the GAN inversion module 104 may determine from the input image 116 an input noise vector 118 that is provided to the trained GAN 106. To illustrate, using the input image 116, the GAN inversion module 104 may perform mapping of the input image 116 backward through the trained GAN 106 to identify the input noise vector 118 in a manner known by those of ordinary skill in the art. The input noise vector 118 may correspond to a latent space that can be used to provide a noise input at the input layer and/or another layer of a generator of the trained GAN 106.

In some example embodiments, the input noise vector 118 is provided to the trained GAN 106 that uses the input noise vector 118 to generate the synthetic image 120 of a space such as a room in the input image 116 and the user image 112 as well as one or more luminaires inserted in the room by the image insertion module 102. For example, the trained GAN 106 may have been trained using training images to generate synthetic images of rooms or other spaces that include structures (e.g., walls, a ceiling, pillars, and windows), objects (e.g., one or more types of luminaires, furniture, and appliances), and synthetic light appearances (e.g., light on or off, different light beam sizes and shapes, light intensity levels, colors, correlated color temperatures (CCTs), polarization, level of micro-shadows, light edge sharpness levels, and other light characteristics).

Although FIGS. 26-29 are described with respect to different beam widths/sizes, other light appearance elements such as, for example, intensity level and CCT may be implemented in the same manner without departing from the scope of this disclosure. In some alternative embodiments, one or more modules of the lighting virtualization system 2600 may be omitted or combined with other modules without departing from the scope of this disclosure. In some alternative embodiments, the lighting virtualization system 2600 may include additional and/or different modules than shown in FIG. 26 without departing from the scope of this disclosure.

In some alternative embodiments, the lighting virtualization system 2600 may include more than two derived GANs that are in series without departing from the scope of this disclosure. In some alternative embodiments, the room 602 shown in FIGS. 27-29 may include more, fewer, and/or different objects (e.g., luminaires) than shown without departing from the scope of this disclosure. In some example embodiments, the luminaires 2702, 2704 may be the same luminaires without departing from the scope of this disclosure. Although the lighting virtualization system 2600 of FIG. 26 is described with respect to the room 602, the lighting virtualization system 2600 may be applicable to other areas including outdoor spaces.

Figure 30:
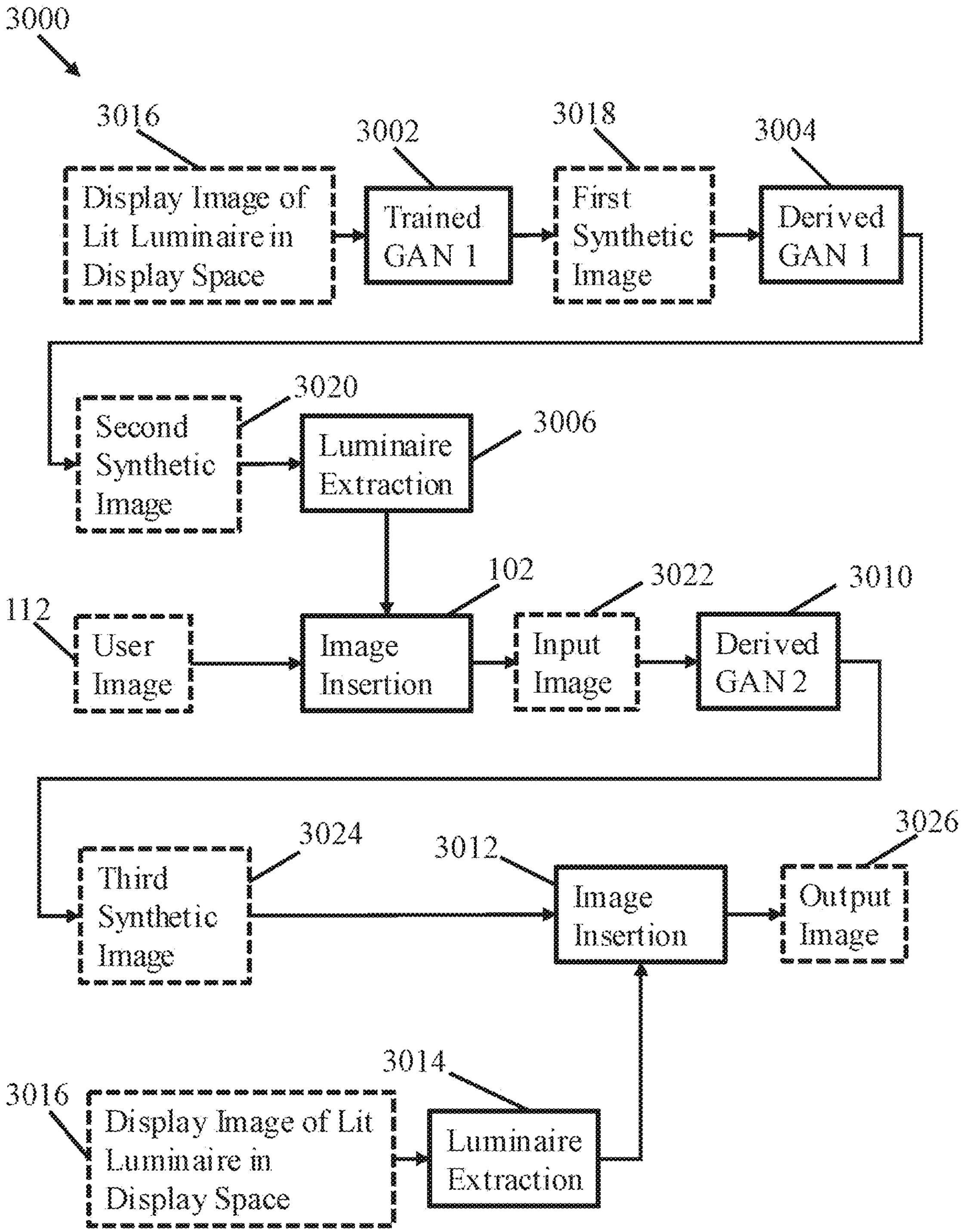
FIG. 30 illustrates a lighting virtualization system according to another example embodiment.

FIG. 30 illustrates a lighting virtualization system 3000 according to another example embodiment. In some example embodiments, the lighting virtualization system 3000 may overcome challenges related to using an image of a lit-up luminaire provided in the luminaire information 114, for example, FIG. 1 for insertion in the user image 112. In some example embodiments, the lighting virtualization system 3000 includes software modules including the image insertion module 102, a trained GAN 2602, a trained GAN 3002, a first derived GAN 3004, luminaire extraction modules 3006, 3014, a second derived GAN 3010, and a second image insertion module 3012. For example, the software modules of the lighting virtualization system 3000 can be stored in a memory device and executed by a processor, such a microprocessor, of a user device and/or a server such as a local network server or a cloud server. A user device and/or a server shown in FIG. 31 may be used to execute the operations described herein with respect to the lighting virtualization system 3000 of FIG. 30. In FIG. 30, modules that are executed as part of the operation of the lighting virtualization system 3000 are shown in a respective solid box, and inputs and outputs of the modules are shown in a respective dotted box for clarity of illustration.

In some example embodiments, the trained GAN 3002 may receive a display image 3016 that includes a luminaire (e.g., a lampshade of the luminaire) that is shown as on/lit. The trained GAN 3002 may correspond to the trained GAN 106 shown in FIG. 1. The display image 3016 may be a picture in a store catalog and may be, for example, a color image. The display image 3016 may also show the luminaire located in a store space.

In some example embodiments, the trained GAN 3002 may generate a first synthetic image 3018. For example, a GAN inversion operation may be performed on the trained GAN 3002 based on the display image 3016 to determine an input noise vector that is provided to the trained GAN 3002. The trained GAN 3002 may use the input noise vector to generate the first synthetic image 3018 that closely matches the display image 3016. For example, the first synthetic image 3018 includes the luminaire shown in the display image 3016.

In some example embodiments, the first derived GAN 3004 may generate a second synthetic image 3020 based on the first synthetic image 3018. For example, a GAN inversion operation may be performed on the first derived GAN 3004 based on the first synthetic image 3018 to determine an input noise vector that is provided to the first derived GAN 3004. The first derived GAN 3004 may use the input noise vector to generate the second synthetic image 3020 that closely matches the first synthetic image 3018 but shows now the luminaire as off/unlit. In some alternative embodiments, the trained GAN 3002 may be omitted, and the first derived GAN 3004 may generate the second synthetic image 3020 based on the display image 3016. The first derived GAN 3004 may be derived from the trained GAN 3002 by changing values(s) of one or more parameters of the trained GAN 3002 (e.g., an input parameter of an AdaIN layer of the generator of the trained GAN 3002) such that the synthetic light appearance in the second synthetic image 3020 shows the luminaire as off/unlit.

In some example embodiments, the luminaire extraction module 3006 may extract the luminaire from the second synthetic image 3020. For example, the luminaire extraction module 3006 may process the second synthetic image 3020 to identify and extract that luminaire that is shown as off/unlit. The image insertion module 102 may insert in the user image 112 the luminaire extracted from the second synthetic image 3020 and generate an input image 3022. For example, the user image 112 may correspond to the user images 600, 1000 shown in FIGS. 6 and 10, respectively. To illustrate, the user image 112 may show a user space such as a room (e.g., the room 602 of FIG. 6 or the room 1002 of FIG. 10) or another user space. The input image 3022 may show the luminaire inserted in the user space at a location indicated by the user.

In some example embodiments, the second derived GAN 3010 may generate a third synthetic image 3024 based on the input image 3022. For example, a GAN inversion operation may be performed on the second derived GAN 3010 based on the input image 3022 to determine an input noise vector that is provided to the second derived GAN 3010. The second derived GAN 3010 may use the input noise vector to generate the third synthetic image 3024 that closely matches the input image 3022 but shows the luminaire now as on/lit. That is, the third synthetic image 3024 shows the luminaire on/lit in the user space such as the room 602 of FIG. 6 or the room 1002 of FIG. 10. The second derived GAN 3010 may be derived from the trained GAN 3002 by changing values (s) of one or more parameters of the trained GAN 3002 such that the synthetic light appearance in the third synthetic image 3024 shows the luminaire (e.g., a lampshade of the luminaire) as lit and also other areas such as a wall as lit similar to, for example, the synthetic light appearance 802 shown in FIG. 8.

In some example embodiments, the luminaire extraction module 3014 may extract the luminaire from the display image 3016. As described above, the luminaire in the display image 3016 appears lit (e.g., the lampshade of the luminaire appears lit). For example, the luminaire extraction module 3014 may process the display image 3016 to identify and extract that luminaire. The image insertion module 3012 may insert in the third synthetic image 3024 the lit luminaire extracted from the third synthetic image 3024 and generate an output image 3026 that shows the lit luminaire from the display image 3016 in the user space that shows synthetic light appearance including light on a wall, etc. similar to the synthetic light appearance 802 of FIG. 8. As relighting the optical exit window of luminaire is a challenging task for a GAN, the approach of FIG. 30 ensures that by inserting the lit up luminaire from the display image, the appearance of the lit up luminaire will look very realistic.

In some alternative embodiments, one or more modules of the lighting virtualization system 3000 may be omitted or combined with other modules without departing from the scope of this disclosure. In some alternative embodiments, the lighting virtualization system 3000 may include additional and/or different modules than shown in FIG. 3000 without departing from the scope of this disclosure. Although the lighting virtualization system 3000 of FIG. 30 is described with respect to a room, the lighting virtualization system 3000 may be applicable to other areas including outdoor spaces.

Figure 31:
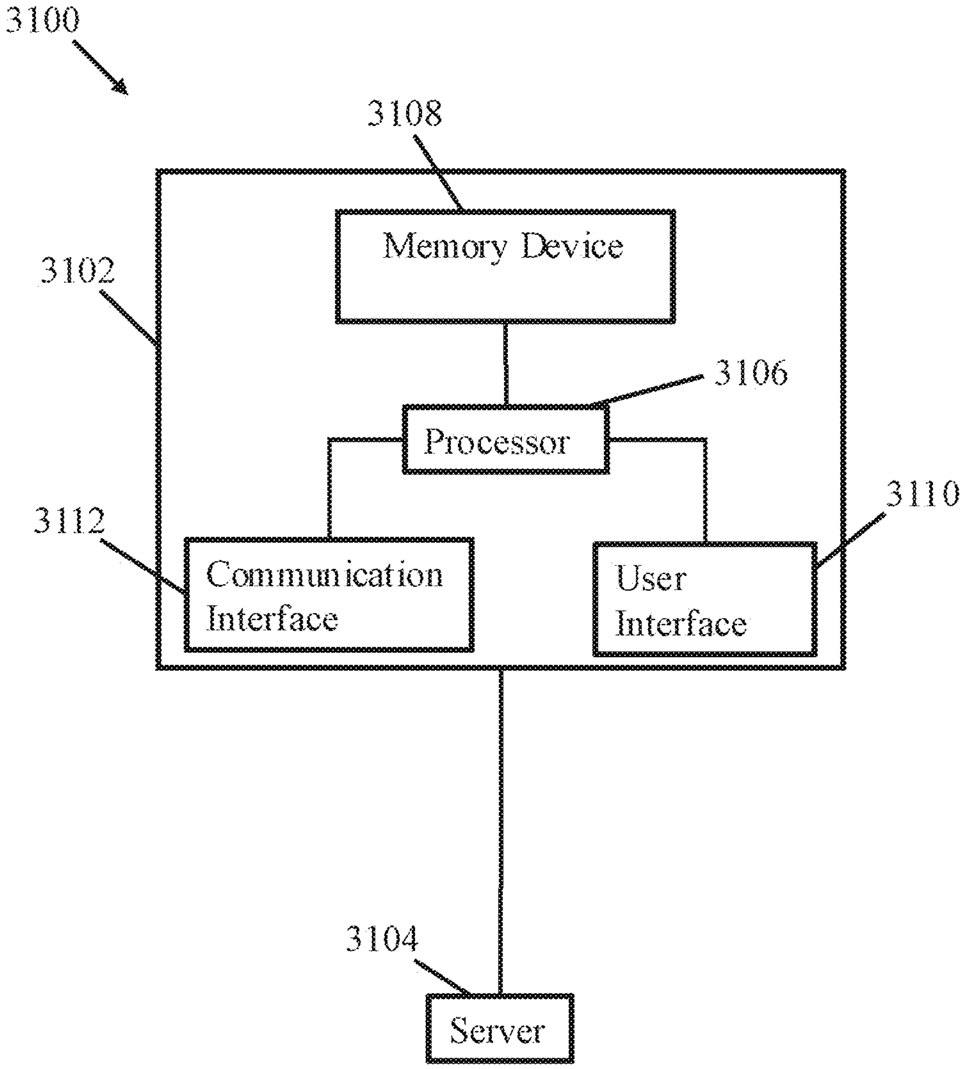
FIG. 31 illustrates a system for executing the lighting virtualization methods, systems, and elements of FIGS. 1-30 according to an example embodiment.

FIG. 31 illustrates a system 3100 for executing the lighting virtualization methods, systems, and operations described with respect to FIG. 1-30 according to an example embodiment. In some example embodiments, the system 3100 includes the user device 3102 and the server 3104. The user device 3102 may be a mobile phone, a tablet, a laptop, or another device that provides a user interface unit 3110 (e.g., a touch screen, a camera, etc.). The user device 3102 may include a processor 3106 that may, for example, include a microprocessor that can execute software code stored, for example, in a memory device 3108 (e.g., flash memory) of the user device 3102. For example, some of the software modules and/or steps described herein with respect to FIGS. 1-44 may be stored in the memory device 3108 and may be executed by the processor 3106. A user may use the user interface unit 3110 to provide inputs such as images, luminaire information 114, the light appearance information 204, commands, and other inputs that may be needed to use the user device 3102. The user device 3102 may use the user interface unit 3110 to display images and other information that are provided by a user and images that are generated by the user device 3102 and the server 3104 in the execution of the light visualization methods, systems, and other operations. For example, user images, input images, and synthetic images described herein may be displayed on the user interface unit 3110.

In some example embodiments, the user device 3102 may include a communication interface unit 3112 that may communicate, wirelessly and/or via a wired connection, for example, with the server 3104. For example, the server 3104 may be a local network server or a cloud server. The server 3104 may receive information such as images and/or other information from the user device 3102 and may process the information and execute some of the modules described above with respect to FIGS. 1-30.

In some alternative embodiments, the system 3100 may include more, fewer, or different components than shown in FIG. 31 without departing from the scope of this disclosure. In some alternative embodiments, the user device 3102 may include more, fewer, or different components than shown in FIG. 31 without departing from the scope of this disclosure.

Figure 32:
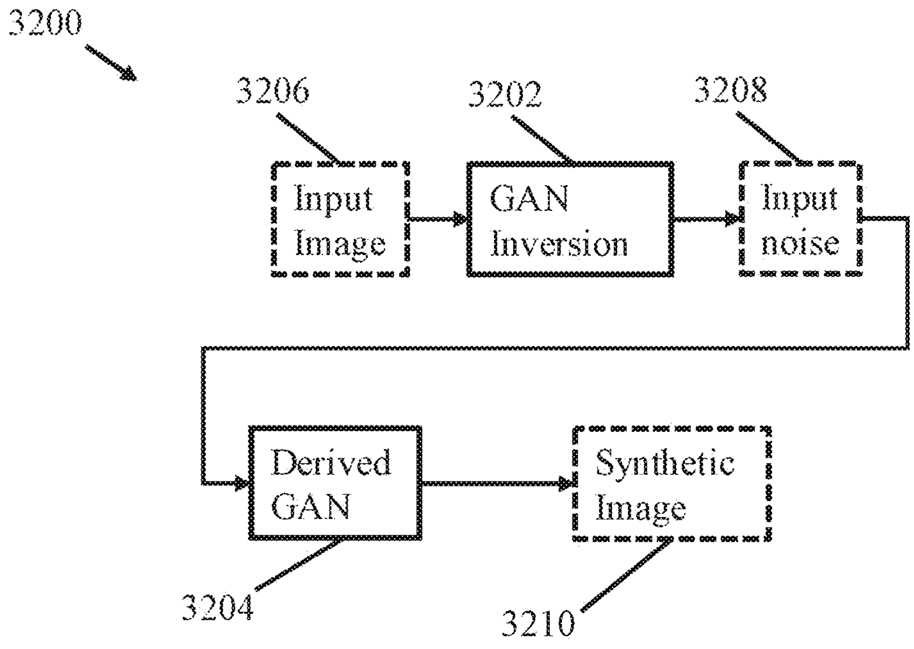
FIG. 32 illustrates a lighting virtualization system including a derived GAN that suppresses lighting artifacts in synthetic images according to an example embodiment.

FIG. 32 illustrates a lighting virtualization system 3200 including a derived GAN 3204 for suppressing lighting artifacts in synthetic images according to an example embodiment. In some example embodiments, synthetic images generated by a GAN, such as the trained GAN 106 and the derived GAN 110 of FIG. 1, may include lighting artifacts. In general, lighting artifacts in a synthetic image are undesirable. For example, a lighting artifact may cause a synthetic image to appear unrealistic. To illustrate, a GAN may generate a synthetic image of an input image, where the input image includes a light fixture. In some cases, the synthetic image may include a lighting artifact, where the light source of the light fixture in the generated synthetic image appears as a black hole. The lighting artifact in the synthetic image in such cases is the light source appearing as a black hole when displaying an unlit light source. As another example, a lighting artifact in a synthetic image generated by a GAN may be the synthetic image showing the lampshade of a light fixture as a black shade (rather than the actual color of the lampshade) to show an unlit light fixture. As yet another example, a lighting artifact may be another object (e.g., a regular picture frame) instead of or in addition to the light fixture appearing lit in the synthetic image as if the other object is itself a light fixture or a light source. As yet another example, a lighting artifact may be a light appearance of lit-up luminaire on two sides of a bed although the synthetic image includes a bedside luminaire on one side of the bed only.

As yet another example of a lighting artifact, only one bedside luminaire in a synthetic image may appear to be on (i.e., powered on) although the synthetic image includes two bedside luminaires and both bedside luminaires are expected to appear on. As yet another example, a lighting artifact in the synthetic image may be a bedside luminaire appearing switched on and a recessed luminaire appearing switched off although both luminaires are expected to appear switched on. As yet another example, a lighting artifact in the synthetic image may be a light appearing mid-air instead of on a wall, for example, because the GAN mistakenly 'thinks' a wall is present at this location within the room. As yet another example, a lighting artifact in the synthetic image may be that some light sources of a multi-light source luminaire (e.g., a multi-lamp luminaire) being on while other light sources of the multi-light source luminaires being off although all of the light sources of the multi-light source luminaire are expected to be either on or off in unison.

As yet another example, a lighting artifact in the synthetic image may be that some locations in the synthetic image do not match the lighting state of the light fixture, where, for example, an area may appear relatively dark although light from the light fixture should light up the area. In some cases, an area may appear relatively bright although the light fixture expected to light up the area is off. As yet another example, a lighting artifact in a synthetic image may be that a faint light appears at the light fixture although the light fixture is supposedly off.

In some example embodiments, the lighting virtualization system 3200 includes a GAN inversion module 3202 and the derived GAN 3204. For example, the GAN inversion module 3202 and the derived GAN 3202 may each be a software module that can be stored in a memory device and executed by a processor, such a microprocessor, of a user device and/or a server such as a local network server or a cloud server. To illustrate, the GAN inversion module 3202 and the derived GAN 3202 may be stored in the memory device 3108 and may be executed by the processor 3106 of the user device 3102. The user device 3102 and/or the server 3104 shown in FIG. 31 may be used to execute the GAN inversion module 3202 and the derived GAN 3204 as well as other modules and operations described herein with respect to the lighting virtualization system 3200 of FIG. 32. In FIG. 32, modules that are executed as part of the operation of the lighting virtualization system 3200 are shown in a respective solid box, and inputs and outputs of the modules are shown in a respective dotted box for clarity of illustration.

In some example embodiments, the derived GAN 3204 may be used to generate a synthetic image 3210 based on an input image 3206. The input image 3206 may be a user image that is provided by a user (e.g., a consumer), for example, using the user device 3102. For example, the input image 3206 may be a user image that shows a room, such as a kitchen, a bedroom, a living room, an entertainment room, a basement, etc. To illustrate, the input image 3206 may correspond to the user image 112 shown in FIG. 1. For example, the user image 112 may show a space (e.g., a bedroom) including structures (e.g., walls, a ceiling, etc.) and objects (e.g., a bed, a sofa, etc.). The user image 112 may also include one or more luminaires. Alternatively, the input image 3206 may correspond to the input image 116 of FIG. 1, where a luminaire is inserted in a space (e.g., a room) shown in the user image 112 as described above with respect to FIG. 1.

In some example embodiments, the input image 3206 may be obtained, for example, based on a user input describing an area such as a room. To illustrate, the input image 3206 may be obtained from a database of images or another image source based on a description provided by a user. For example, a user may indicate a type of room as well as structures and objects in the room, and the user device 3102 may obtain an image that closely matches the description provided by the user. To illustrate, the user may describe a bedroom that has a bed, two bedside tables, two bedside luminaires, and a dresser, and the user device 3102 may obtain, for example, an image 4500 shown in FIG. 45 as the input image 3206 that shows a room 4502 (e.g., a bedroom) that closely resembles the described bedroom. For example, the user device 3102 may obtain the image 4500 from a database of images.

As another example, a user may describe a kitchen with a spotlight luminaire that emits a narrow beam light, and the user device 3102 may obtain the input image 3206 that closely matches the description provided by the user. As yet another example, a user may describe a bedroom with a bedside luminaire that emits a warm white light, and the user device 3102 may obtain the input image 3206 that closely matches the description provided by the user. In some cases, the user may just ask for a type of room (e.g., asking for a synthetic image of a dining room), and the user device 3102 may obtain the input image 3206 that includes structures and objects, including one or more luminaires, that match the requested type of room.

In some example embodiments, the input image 3206 may be a synthetic image that is generated by a GAN such as, for example, the GAN 106 or the GAN 110 of FIG. 1. For example, the input image 3206 may correspond to the synthetic image 120 or the synthetic image 124 shown in FIG. 1.

Referring to FIGS. 1 and 32, as described above, the derived GAN 3204 of FIG. 32 may generate the synthetic image 3210 based on the input image 3206, where one or more lighting artifacts that may otherwise be included in the synthetic image 120 or the synthetic image 124 are suppressed from appearing in the synthetic image 3210. As used herein, suppressing of a lighting artifact in general refers to fully preventing the lighting artifact from appearing in a synthetic image or to mitigating or otherwise reducing the prominence or visual effect of the lighting artifact in the synthetic image.

In some example embodiments, the derived GAN 3204 may be derived from the trained GAN 106 described with respect to FIG. 1 by changing one or more values of one or more neural units of one or more layers of a generator of the trained GAN 106 and saving/storing the resulting modified trained GAN as the derived GAN 3204. As described above with respect to FIG. 1, the trained GAN 106 may have been trained using training images to generate synthetic images of rooms or other spaces that include structures (e.g., walls, doors, stairs, a ceiling, pillars, and windows), objects (e.g., one or more types of luminaires, furniture, and appliances), subjects (e.g., persons, pets) and synthetic light appearances (e.g., light on or off, different light beam sizes and shapes, light intensity levels, colors, correlated color temperatures (CCTs), polarization of light, level of micro-shadows, light edge sharpness levels, and other light characteristics).

Referring to FIGS. 1 and 32, in some example embodiments, the trained GAN 106 of FIG. 1 may be modified to derive the derived GAN 3204 of FIG. 32 by changing one or more weights of a layer (e.g., a convolutional layer) of a generator of the trained GAN 106 and/or by changing one or more input parameters of a layer (e.g., an AdaIN layer or an affine transformation layer that generates one or more outputs that are provided to the AdaIN layer) of the generator of the trained GAN 106. The particular weights and/or input parameters of the trained GAN 106 that are changed to derive the derived GAN 3204 may have a precise causal relationship with one or more lighting artifacts that can appear in a synthetic image generated by the trained GAN 106. To illustrate, the difference between the trained GAN 106 and the derived GAN 3204 may be in the values of corresponding weights and/or input parameters of the trained GAN 106 and the derived GAN 3204, where the trained GAN 106 and the derived GAN 3204 may otherwise be structurally the same. Weights, input parameters, and other elements of the trained GAN 106 that are modifiable (i.e., that have changeable values) and that have a precise causal relationship with one or more lighting artifacts that can appear in the synthetic image 120 generated by the trained GAN 106 may generally be referred to herein as parameters of the trained GAN 106, and corresponding weights, input parameters, and other elements of the derived GAN 3204 may generally be referred to herein as parameters of the derived GAN 3204.

Referring to FIGS. 1, 4A-5, and 32, in some example embodiments, the derived GAN 3204 may be derived from the trained GAN 106 by changing one or more values of one or more neural units of the generator of the trained GAN 106 such that one or more lighting artifacts are suppressed in synthetic image 3210 generated by the derived GAN 3204. Before deriving the derived GAN 3204 from the trained GAN 106 such that lighting artifacts are suppressed in the synthetic image 3210, neural units of the generator of the trained GAN 106 that are related to lighting artifacts need to be identified. Because a neural unit may be related to one lighting artifact but not to another lighting artifact, the specific causal relationship between one or more neural units and particular lighting artifact(s) may also need to be determined to selectively suppress the particular lighting artifact(s). For example, some neural units may have a causal relationship with a particular lighting artifact (e.g., a light source of a luminaire appearing as a black hole), and some other neural units may have a causal relationship with another particular lighting artifact (e.g., only one of two bedside luminaires being on when both luminaires should be on).

In general, one or more neural units of the trained GAN 106 that have a precise causal relationship with a particular lighting artifact may be identified in the same manner as described with respect to neural units and light appearances and FIGS. 4A-5. For example, one or more neural units of the trained GAN 106 that have a precise causal relationship with a particular lighting artifact may be identified through a trial-and-error process. Particular values of one or more parameters (e.g., weights W1-W9, input parameters 510, 512 shown in FIGS. 4C and 5) of the identified neural units of the generator of the trained GAN 106 that result in suppressed artifact(s) may be determined through an iterative process as described with respect to FIGS. 4A-5.

In some example embodiments, Frechet Inception Distance (FID), L1, weighted L1, L2, and/or weighted L2 may be used in a trial-and-error process to identify neural units of the trained GAN 106 that have precise causal relationship with lighting artifacts and particular values of parameters of the neural units based on comparisons of synthetic images generated during iterative changes of the values of parameters of neural units of the trained GAN 106. In some alternative embodiments, neural units of the trained GAN 106 that have precise causal relationship with lighting artifacts may be identified by iteratively exploring the gradient map of the generated synthetic images with respect to different neural units and then measuring how much those gradients overlap with the specific regions on the generated images. The particular values of parameters of identified the neural units may also be determined in the same manner.

In some example embodiments, neural units of the generator of the trained GAN 106 that have a causal relationship with lighting artifacts may be identified based on user feedback. For example, a user may be asked to provide feedback regarding the realism of a synthetic image after the synthetic image generated by the trained GAN 106 is displayed. The user may indicate a lighting artifact in the synthetic image, for example, by drawing a boundary around the lighting artifact or in another manner. Based on the user feedback, a mask (i.e., a pixel-based selection mask) may be applied on the region around the lighting artifact and values of different parameters of neural units of the trained GAN 106 that are suspected of having a causal relationship with the lighting artifact are changed until particular neural units and parameters are identified. Such feedback-based operations may be performed on a cluster of lighting artifacts that appear to be related or otherwise similar. In some alternative embodiments, the user feedback-based operation may be performed based on synthetic image generated by the derived GAN 110 without departing from the scope of this disclosure.

To illustrate, in some alternative embodiments, the derived GAN 3204 may be derived from another derived GAN, such as the derived GAN 110, instead of from the trained GAN 106 without departing from the scope of this disclosure. For example, neural units of the generator of the derived GAN 110 that are related to lighting artifacts in the synthetic image 124 of FIG. 1 may be identified and the value of the parameters of the identified neural units that suppress artifacts may be determined in the same manner as described above with respect to light appearances, the trained GAN 106, and FIGS. 4A-5.

In some cases, the one or more neural units of the derived GAN 110 that have a precise causal relationship with one or more lighting artifacts, for example, in the synthetic image 124 may also have a precise causal relationship with one or more desired light appearances in the synthetic image 124. As such, particular values of the parameters of the neural units of the derived GAN 3204 that result in a desired light appearance in the synthetic image 3210 while suppressing lighting artifacts may be determined, for example, through an iterative process as described with respect to identifying values of parameters of the derived GAN 110 with respect to light appearances, the derived GAN 110, and FIGS. 4A-5.

In some example embodiments, a lighting artifact that appears in a synthetic image generated by a GAN, such as the trained GAN 106 or the derived GAN 110 may be associated with a particular characteristic of an input image (e.g., the input image 3206) and/or a desired light appearance in the synthetic image. As such, in some cases, the derived GAN 3204 may be derived from the trained GAN 106 by analyzing an input image and/or a desired light appearance and changing value(s) of parameter(s) of relevant neural unit(s) of the trained GAN 106 without generating the synthetic image 120 for purpose of detecting lighting artifacts. The derived GAN 3204 may alternatively be derived from the derived GAN 110 by analyzing an input image and/or a desired light appearance and changing value (s) of parameter(s) of relevant neural unit(s) of the derived GAN 110 without generating the synthetic image 124 for purpose of detecting lighting artifacts. To illustrate, characteristics of an input image that may be associated with some lighting artifacts may include, for example, the type of room (e.g., bedroom or kitchen), the type of a light fixture (e.g., a spotlight luminaire or a wall wash luminaire), light appearances in the input image (e.g., whether a luminaire in the input image is on or off, light intensity, and whether a room itself in the input image appears lit), and/or daytime or nighttime shown in the input image. A desired lighting appearance that may be associated with some lighting artifacts may be a light appearance (e.g., light on, light off, cool CCT, warm CCT, particular intensity level, particular beam width etc.) that a user wants to appear in a synthetic image as indicated, for example, by a user input such as the lighting appearance information 204 described above with respect to FIG. 2.

For example, a particular lighting artifact associated with an input image and/or with a desired light appearance may appear in a synthetic image when a narrow beam (e.g., 20 degrees) is requested as a desired light appearance in the synthetic image and the input image 3206 includes a spotlight luminaire. To illustrate, when the input image 3206 includes a spotlight luminaire and when the lighting appearance information 204 indicates a desired light appearance including a 20-degree beamwidth light, neural unit(s) of the trained GAN 106 known have a causal relationship with a particular lighting artifact associated with such information may be changed to particular value(s) to derive the derived GAN 3204 such that the particular lighting artifact is suppressed in the synthetic image 3210.

As another example of a lighting artifact associated with an input image and/or a desired light appearance, a particular lighting artifact may appear in a synthetic image when an input image includes a luminaire and a warm white light is requested as a desired light appearance in the synthetic image, but the particular lighting artifact may not appear when the desired light appearance is a cool white light. As yet another example, a particular lighting artifact may appear in a synthetic image when an input image includes a table luminaire that is located in a kitchen, but the particular lighting artifact may not appear when the input image shows a table luminaire in a home office.

Figure 45:
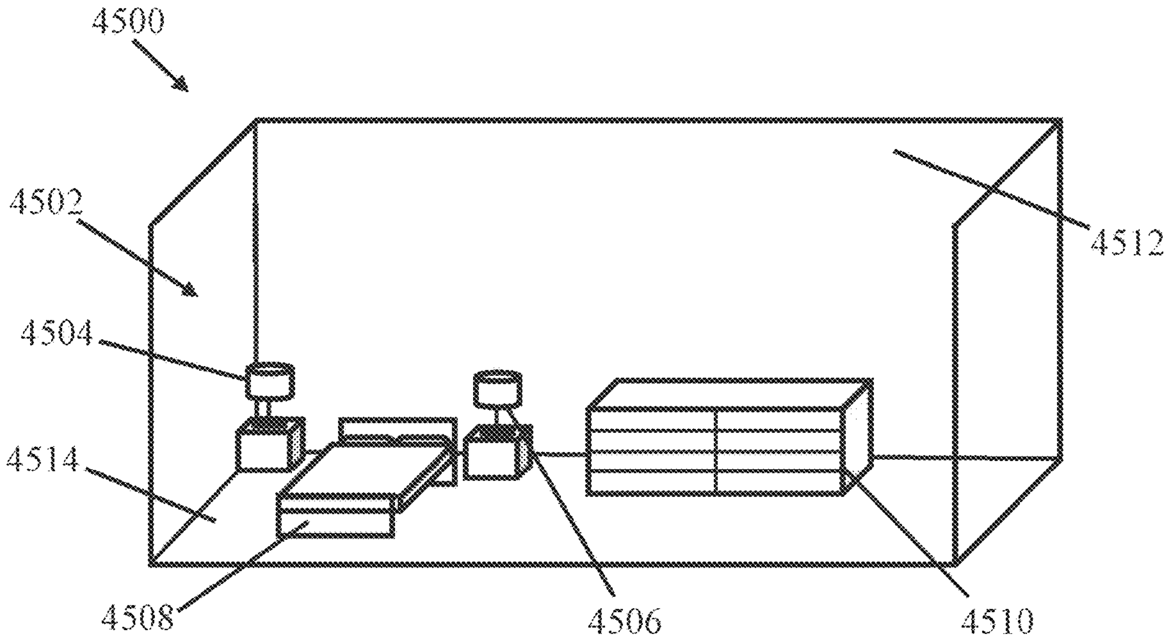
FIG. 45 illustrates an image that can be provided as an input image to the lighting virtualization system of FIG. 32 according to an example embodiment.
Figure 46:
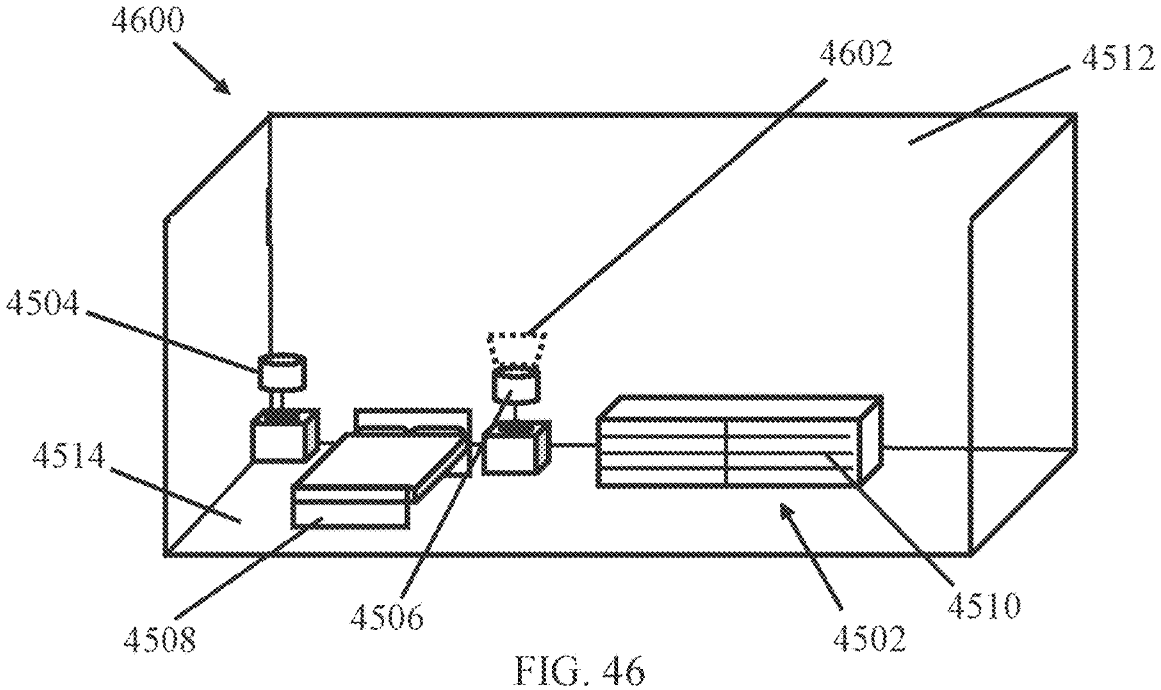
FIG. 46 illustrates an image that may a lighting artifact according to an example embodiment.

As yet another example of a lighting artifact associated with an input image and/or a desired light appearance, a particular lighting artifact may appear in a synthetic image when an input image shows a bedroom that has two bedside luminaires but may not appear when the input image shows a kitchen with two spotlight luminaires. To illustrate, FIG. 46 shows an image 4600 that may be a synthetic image generated based on the image 4500 (i.e., an input image) of FIG. 45 that shows a room 4502 (e.g., a bedroom) with two bedside luminaires 4504, 4506. In the image 4600, the lighting artifact is that only the bedside luminaire 4506 appears on although both luminaires 4504, 4506 are expected to be on. For example, the image 4600 may have been generated by the trained GAN 106 of FIG. 1 or by the derived GAN 110 of FIG. 1 that does not include changes to values of relevant parameters that result in suppressed lighting artifact.

In some example embodiments, to suppress lighting artifacts that are related to an input image and/or to a desired light appearance from appearing in the synthetic image 3210, the derived GAN 3204 may be derived from the trained GAN 106 based on the characteristics of the input image 3206 and/or the desired light appearance. To illustrate, based on the known causal association between particular neural unit(s) of the trained GAN 106 and a particular lighting artifact and based on the known association between the particular lighting artifact and particular characteristics of input images (and/or desired light appearances), the particular one or more neural unit(s) of the trained GAN 106 may be modified to derive the derived GAN 3204 in response to determining that the input image 3206 has the particular characteristics (and/or particular light appearances are desired). For example, when the input image 3206 shows a bedroom with two bedside luminaires, which may be a characteristic associated with the lighting artifact where only one of two bedside luminaires appears as on, the derived GAN 3204 may be derived from the trained GAN 106 by changing one or more values of one or more neural units of the trained GAN 106 that have been established as having a causal relationship with the particular lighting artifact. That is, the particular one or more neural units of the trained GAN 106 may be set to zero or to another value to derive the derived GAN 3204 that generates the synthetic image 3210 showing both bedside luminaires as on (i.e., as intended) based on the characteristics of the input image 3206 and/or the desired light appearance and without first generating a synthetic image to check for lighting artifacts. As described above, the derived GAN 3204 may be derived from another derived GAN, such as the derived GAN 110, without departing from the scope of this disclosure.

In some example embodiments, the input image 3206 may be a synthetic image and may be analyzed to detect the presence of one or more lighting artifacts. For example, the synthetic image 120 may be the input image 3206 and may be analyzed for the presence of one or more lighting artifacts, and the derived GAN 3204 may be derived from the trained GAN 106 based on the known (i.e., determined as described above) causal relationship between the detected lighting artifact(s) and particular neural unit(s) of the trained GAN 106. That is, in response to a detection of a particular lighting artifact, value(s) of parameter(s) of neural unit(s) of the trained GAN 106 may be modified based on the known causal relationship with the detected lighting artifact. As another example, the synthetic image 124 may be the input image 3206 and may be analyzed for the presence of one or more lighting artifacts, and the derived GAN 3204 may be derived from the derived GAN 110 based on the known (i.e., determined as described above) causal relationship between the detected lighting artifact(s) and particular neural unit(s) of the derived GAN 110. In general, the derived GAN 3204 may be derived based on the characteristics of the input image 3206 (including the presence of lighting artifacts) and/or based on desired light appearances as described above.

In some example embodiments, the derived GAN 3204 may generate the synthetic image 3210 based on the input image 3206 by determining an input noise vector 3208 from the input image 3206. To illustrate, the GAN inversion module 3202 may determine from the input image 3206 the input noise vector 3208 that is provided to the derived GAN 3204. The GAN inversion module 3202 may perform mapping of the input image 3206 backward through the derived GAN 3204 to identify the input noise vector 3208 in a manner known by those of ordinary skill in the art. The input noise vector 3208 may belong or otherwise correspond to a latent space that can be used to provide a noise input at the input layer and/or another layer of a generator of the derived GAN 3204.

Figure 47:
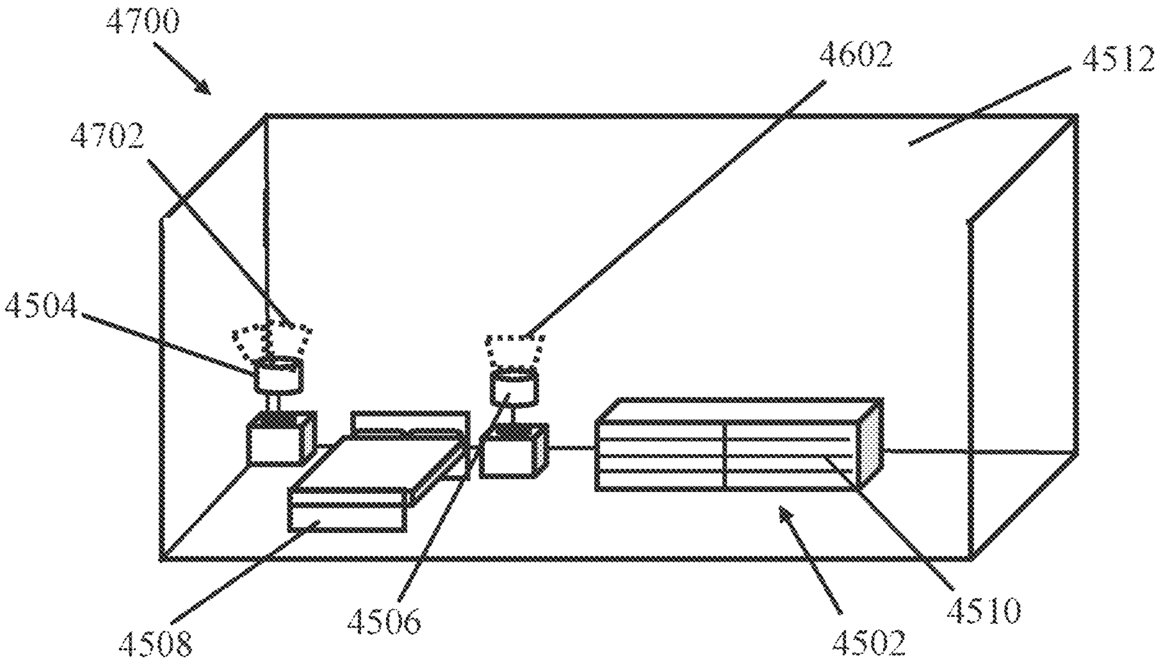
FIG. 47 illustrates a synthetic image with suppressed lighting artifacts and generated by the lighting virtualization system of FIG. 32 according to an example embodiment.

Using the input noise vector 3208 determined based on input image 3206, the derived GAN 3204 may generate the synthetic image 3210. For example, FIG. 45 illustrates the image 4500 that can be provided as the input image 3206 to the lighting virtualization system of FIG. 32 according to an example embodiment, and FIG. 47 illustrates a synthetic image 4700 with a suppressed lighting artifact and generated by the lighting virtualization system 3200 of FIG. 32 according to an example embodiment. Based on the image 4500, the derived GAN 3204 may generate the synthetic image 4700 of FIG. 47 as the synthetic image 3210, where a lighting artifact is suppressed. To illustrate, FIG. 46 illustrates an image 4600 that includes a lighting artifact according to an example embodiment. For example, the image 4600 may correspond to the synthetic image 120 or the synthetic image 124 of FIG. 1. The images 4500, 4600, 4700 each include a room 4502 (e.g., a bedroom) that includes a bed 4508, bedside luminaires 4504, 4506, and a dresser 4510. The room 4502 may include structures such as a wall 4512 and a floor 4514.

In FIG. 46, the lighting artifact is that a bedside luminaire 4504 appears as being off and a bedside luminaire 4506 appears on with an associated light appearance 4602 on the wall 4512 instead of, for example, both bedside luminaires 4504, 4506 being on. For example, the image 4600 in FIG. 46 may have been generated by a trained GAN 106, the derived GAN 110, or another GAN that does not have changed parameter values to suppress the lighting artifact. In the synthetic image 4700 of FIG. 47 that corresponds to the synthetic image 3210 of FIG. 32, the lighting artifact that is the image 4600 of FIG. 46 is suppressed, where the light appearance 4602 associated with the bedside luminaire 4506 and a light appearance 4702 associated with the bedside luminaire 4504 are rendered as expected.

By suppressing lighting artifacts, synthetic images with suppressed lighting artifacts may appear more realistic in contrast to synthetic images with unsuppressed lighting artifacts. By driving the derived GAN 3204 based on expected or detected lighting artifacts instead of based of all known lighting artifacts, other undesirable changes to synthetic images may be avoided. By deriving the derived GAN 3204 based on the input image 3206 that can be different types of images, the lighting virtualization system 3200 provides users with flexibility in generating synthetic image with suppressed lighting artifacts.

In some alternative embodiments, the lighting virtualization system 3200 may include other modules without departing from the scope of this disclosure.

Figure 33:
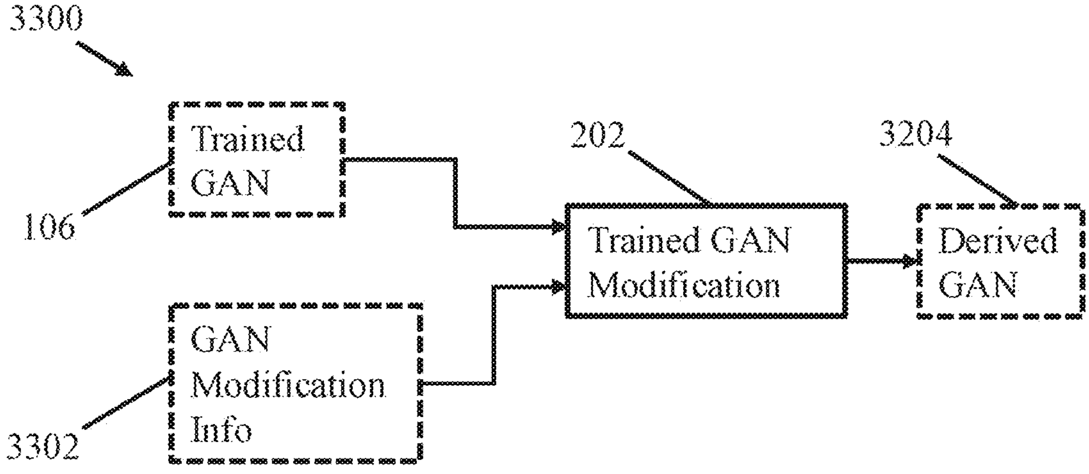
FIG. 33 illustrates a GAN modification system for deriving the derived GAN of FIG. 32 according to another example embodiment.

FIG. 33 illustrates the GAN modification system 3300 for deriving the derived GAN 3204 of FIG. 32 according to another example embodiment. Referring to FIGS. 1, 2, 32, and 33, in some example embodiments, the GAN modification system 3300 may include the GAN modification module 202 that modifies the trained GAN 106 based on GAN modification information 3302 to derive the derived GAN 3204. In general, the GAN modification module 202 may modify the trained GAN 106 to derive the derived GAN 3204 with respect to lighting artifacts in the same manner as the GAN modification module 202 is described with respect to FIG. 2 and the light appearances.

In some example embodiments, the GAN modification information 3302 may include the light appearance information 204 described above with respect to FIG. 2. Indeed, the GAN modification module 202 may derive the derived GAN 3204 from the trained GAN 106 or from the derived GAN 110 based on the light appearance information 204 by changing value(s) of one or more parameters of the trained GAN 106 or the derived GAN 110, respectively, that are related to light appearance and/or lighting artifacts. As described above with respect to FIG. 32, associations between desired light appearances and lighting artifacts in synthetic images may be determined, and the GAN modification module 202 may derive the derived GAN 3204 from the trained GAN 106 (or from derived GAN 110 or another GAN) based on the known association between a desired light appearance indicated by the light appearance information 204 and a lighting artifact such that the lighting artifact is suppressed in the synthetic image 3210 generated by the derived GAN 3204 of FIG. 32.

In some example embodiments, instead of or in addition to the light appearance information 204, the GAN modification information 3302 in FIG. 33 may include artifact information determined by analyzing the input image 3206, where the input image 3206 may be a synthetic image (e.g., the synthetic image 120 or the synthetic image 124 of FIG. 1). Alternatively, the artifact information may be determined based on the input image 3206, where a synthetic image (e.g., the synthetic image 120 or the synthetic image 124 of FIG. 1, a synthetic image 3404 of FIG. 34, or a synthetic image 3502 of FIG. 35) is generated based on the input image 3206 that is a non-synthetic image (e.g., the user image 112 of FIG. 1, the input image 116 of FIG. 1, etc.). Based on the artifact information that indicates one or more detected lighting artifacts in the input image 3206 or in a synthetic image generated based on the input image 3206, the GAN modification module 202 may derive the derived GAN 3204 from the trained GAN 106 based on the known causal relationships between particular neural units of the trained GAN 106 and the detected lighting artifact. In some alternative embodiments, the GAN modification module 202 may derive the derived GAN 3204 from derived GAN 110 or another GAN without departing from the scope of this disclosure.

In some example embodiments, instead of or in addition to the light appearance information 204 of FIG. 2 and/or artifact information, the GAN modification information 3302 may include other image information determined by analyzing the input image 3206. For example, the input image 3206 may be a user provided image (e.g., the user image 112 of FIG. 1), an image obtained based on a user input (e.g., a description), or a synthetic image. The image information that is included in the GAN modification information 3302 may include the type of room shown in the input image 3206, the type of luminaire in the input image 3206, the number of luminaires in the input image 3206, locations of objects including luminaires, windows, doors, mirrors etc. For example, image information 3704 that is determined using an object detection module 3702 shown in FIG. 37 may be included in the GAN modification information 3302 that is provided to the GAN modification module 202 of FIG. 33. Alternatively or in addition, the image information may be user provided information. The GAN modification module 202 may derive the derived GAN 3204 from the trained GAN 106 based on the known causal relationships between particular neural unit(s) of the trained GAN 106 and a lighting artifact that is associated with the image information as described above with respect to FIG. 32. In some alternative embodiments, the GAN modification module 202 may derive the derived GAN 3204 from the derived GAN 110 or another GAN without departing from the scope of this disclosure.

In some example embodiments, instead of or in addition to the light appearance information 204 of FIG. 2, artifact information, and/or image information described above, the GAN modification information 3302 may include luminaire information, such as the luminaire information 114 (shown in FIG. 1), that may be provided by a user. For example, the luminaire information 114 may include information (e.g., a description or an image) that indicates a particular luminaire that the user wants inserted in the user image 112 as described above with respect to FIG. 1. Because some lighting artifacts in a synthetic image may be associated with particular types of luminaires in an input image, the GAN modification module 202 may derive the derived GAN 3204 from the trained GAN 106 based on the known causal relationships between particular neural unit(s) of the trained GAN 106 and the lighting artifact that is associated with the particular luminaire indicated by the luminaire information. In some alternative embodiments, the GAN modification module 202 may derive the derived GAN 3204 from the derived GAN 110 or another GAN without departing from the scope of this disclosure.

Figure 34:
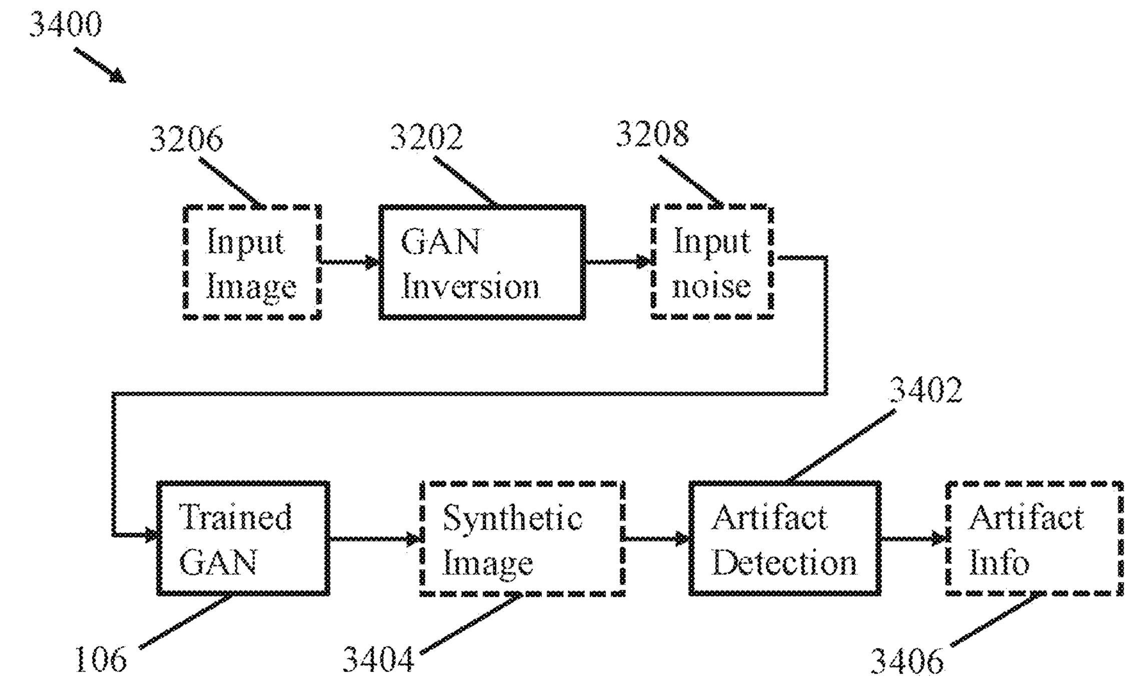
FIG. 34 illustrates an artifact detection system that detects lighting artifacts in a synthetic image based on an input image according to an example embodiment.

FIG. 34 illustrates an artifact detection system 3400 that detects lighting artifacts in a synthetic image 3404 based on the input image 3206 according to an example embodiment. Referring to FIGS. 32 and 34, in some example embodiments, the artifact detection system 3400 may include the GAN inversion module 3202, the trained GAN 106, and an artifact detection module 3402. The user device 3102 and/or the server 3104 shown in FIG. 31 may be used to execute the GAN inversion module 3202, the trained GAN 106, and the artifact detection module 3402 as well as other modules and operations described herein with respect to the artifact detection system 3400. In FIG. 34, modules that are executed as part of the operation of the artifact detection system 3400 are shown in a respective solid box, and inputs and outputs of the modules are shown in a respective dotted box for clarity of illustration.

Referring to FIGS. 32, 34, 45, and 46, in some example embodiments, the GAN inversion module 3202 may determine the input noise vector 3208 from the input image 3206 based on the trained GAN 106 in the same manner as described with respect to FIG. 32. Using the input noise vector 3208, the trained GAN 106 may generate the synthetic image 3404. For example, the synthetic image 3404 in FIG. 34 may correspond to the image 4600 in FIG. 46, where the synthetic image 3404 includes a lighting artifact that a bedside luminaire 4504 is off and a bedside luminaire 4506 is on instead of both bedside luminaires 4504, 4506 being on. For example, the image 4600 of FIG. 46 may have been generated based on the image 4500 of FIG. 45 corresponding to the input image 3206. In contrast to the synthetic image 120 in FIG. 1 that is generated based on the input image 116 that includes an inserted luminaire, the synthetic image 3404 in FIG. 34 is generated based on the input image 3206 that may not include an inserted luminaire. For example, the image 4500 of FIG. 45 corresponding to the input image 3206 may be a user provided image of a user's room that includes the bedside luminaires 4504, 4506. In some alternative embodiments, the input image 3206 may include an inserted luminaire and may correspond to the input image 116 of FIG. 1.

In some example embodiments, the artifact detection module 3402 may detect one or more lighting artifacts in the synthetic image 3404, for example, using semantic segmentation and/or other methods such as classification or using, for example, object detection and/or classification. To illustrate, considering the image 4600 of FIG. 46 as the synthetic image 3404, semantic segmentation and/or classification may be performed on the image 4600 to determine whether a lampshade of the bedside luminaire 4504 and a lampshade of the bedside luminaire 4506 both appear lit. If one of the two lampshades appears lit while the other one of the two appears unlit, the artifact detection module 3402 may output artifact information 3406 indicating the particular detected lighting artifact. As another example, semantic segmentation and/or classification may be performed to determine whether the bedside luminaires 4504, 4506 in FIG. 46 appear on and whether other structures (e.g., a wall 4512 and a floor 4514) and/or objects (e.g., a bed 4508 and/or a dresser 4510) appear lit up. If the bedside luminaires 4504, 4506 appear on but one or more of the other objects do not appear lit up, the artifact detection module 3402 may output the artifact information 3406 indicating the particular detected lighting artifact (e.g., a failure to render far-field light effect while the near-field light effect is rendered well). As another example, semantic segmentation and/or classification may be performed to determine whether the bedside luminaires 4504, 4506 appear off and whether other structures (e.g., a wall 4512 and a floor 4514) and/or objects (e.g., a bed 4508 and/or a dresser 4510) appear lit up. If the bedside luminaires 4504, 4506 appear off but one or more of the other objects do not appear lit up, the artifact detection module 3402 may output the artifact information 3406 indicating the particular detected lighting artifact (e.g., a failure to turn off the far-field light effect).

In some example embodiments, the artifact detection module 3402 may perform image classification to infer whether a class of lighting artifacts is in the synthetic image 3404. For example, the artifact detection module 3402 may include a convolutional neural network, such as ResNet50 or AlexNet, that is trained to classify lighting artifacts. Based on the classification, the artifact detection module 3402 may output the artifact information 3406 indicating the particular detected lighting artifact.

In some example embodiments, the artifact detection module 3402 may present the synthetic image 3404 to a user, for example, via the user interface 3110 of the user device 3102 of FIG. 31 for the user to provide feedback related to lighting artifact(s) that may be in the synthetic image 3404. For example, the user may provide a basic approval or disapproval, text-based feedback, an indication of the location of a lighting artifact in the synthetic image 3404, or a selection from choices of possible lighting artifact classes presented to the user by the artifact detection module 3402. If the user provides a basic disapproval, the artifact detection module 3402 may perform other operations, such semantic segmentation and/or classification, to identify lighting artifact(s) in the synthetic image 3404 and output the artifact information 3406 indicating the particular detected lighting artifact. If the user provides feedback indicates particular lighting artifact(s) in the synthetic image 3404 that are of a type already known to the artifact detection module 3402, the artifact detection module 3402 may output the artifact information 3406 indicating the particular detected lighting artifact. If the artifact detection module 3402 determines that a lighting artifact indicated by user feedback is previously unknown to the artifact detection module 3402, the artifact detection module 3402 may indicate so and an iterative process of identifying relevant neural units of the trained GAN 106 may be performed in the manner described above with respect to FIG. 32 and FIGS. 4A-5.

In some alternative embodiments, the artifact detection system 3400 may include other modules without departing from the scope of this disclosure. In some alternative embodiments, the artifact detection system 3400 may detect lighting artifacts using other methods than described herein without departing from the scope of this disclosure. In some alternative embodiments, the artifact detection system 3400 may include a combination of multiple methods to detect lighting artifacts and output the artifact information 3406 without departing from the scope of this disclosure.

Figure 35:
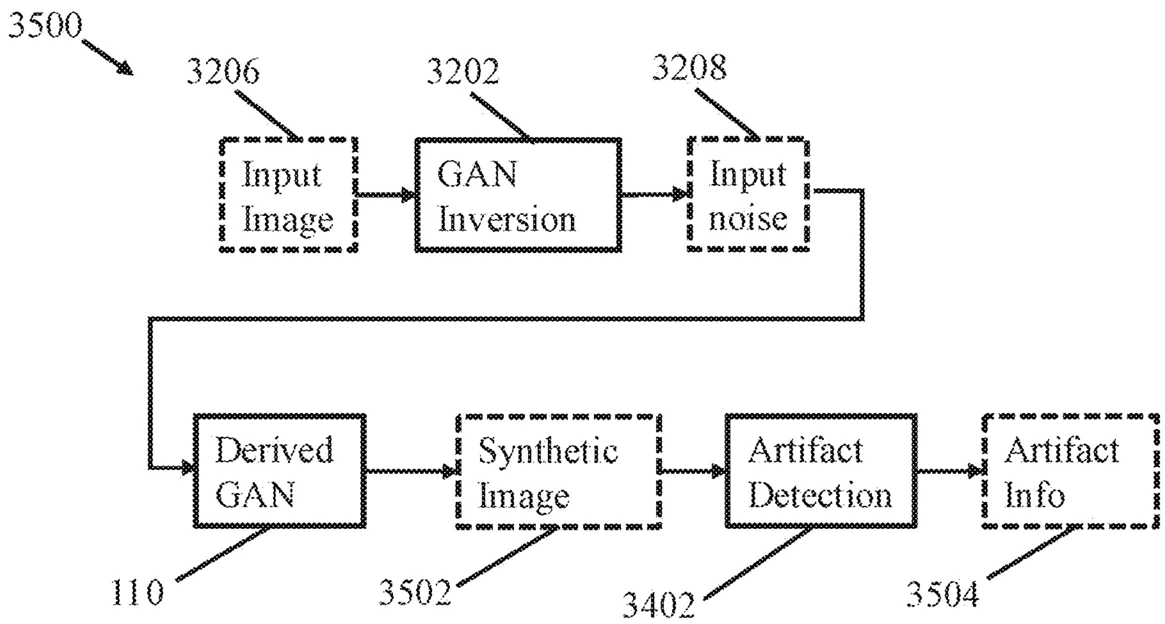
FIG. 35 illustrates an artifact detection system that detects lighting artifacts in a synthetic image based on an input image according to another example embodiment.

FIG. 35 illustrates an artifact detection system 3500 that detects lighting artifacts in a synthetic image 3502 based on the input image 3206 according to another example embodiment. Referring to FIGS. 32, 34, and 35, in some example embodiments, the artifact detection system 3500 may include the GAN inversion module 3202, the derived GAN 110, and the artifact detection module 3402. The user device 3102 and/or the server 3104 shown in FIG. 31 may be used to execute the GAN inversion module 3202, the derived GAN 110, and the artifact detection module 3402 as well as other modules and operations described herein with respect to the artifact detection system 3500. In FIG. 35, modules that are executed as part of the operation of the artifact detection system 3500 are shown in a respective solid box, and inputs and outputs of the modules are shown in a respective dotted box for clarity of illustration. In general, the artifact detection system 3500 operates in the same manner as the artifact detection system 3400 of FIG. 34. In contrast to the artifact detection system 3400, the artifact detection system 3500 includes the derived GAN 110 that generates the synthetic image 3502 instead of the trained GAN 106 that generates the synthetic image 3404.

In some example embodiments, in the artifact detection system 3500, the artifact detection module 3402 may output artifact information 3504 by detecting lighting artifacts in the synthetic image 3502. In contrast to the synthetic image 124 in FIG. 1 that is generated by the derived GAN 110, the synthetic image 3502 in FIG. 35 is generated based on the input image 3206 that may not include an inserted luminaire. In contrast to the synthetic image 3404 of FIG. 34, the synthetic image 3502 may include light appearance(s) that may have been rendered based on desired light appearance(s) indicated by the light appearance information 204 and used to derive the derived GAN 110 as described above with respect to FIG. 2.

Referring to FIGS. 32, 34, 35, 45, and 46, in some example embodiments, the artifact detection module 3402 may detect one or more lighting artifacts in the synthetic image 3502, for example, using semantic segmentation and/or other methods such as classification. To illustrate, considering the image 4600 of FIG. 46 as the synthetic image 3502, semantic segmentation may be performed on the image 4600 to determine whether the lampshade of the bedside luminaire 4504 and the lampshade of the bedside luminaire 4506 both appear lit. For example, if the lampshade of the bedside luminaire 4506 appears unlit in FIG. 46 but a light appearance 4602 appears on a wall 4512 of the room 4502, the artifact detection module 3402 may output the artifact information 3504 indicating the particular detected lighting artifact (e.g., a failure to turn off far-field light effect). Alternatively, if the lampshade of the bedside luminaire 4504 appears lit in FIG. 46 but no corresponding light appearance is rendered on the wall 4512 or on another structure or object in the room 4502, the artifact information 3504 may indicate the particular detected lighting artifact (e.g., a failure to render far-field light effect).

In some example embodiments, the artifact detection module 3402 may perform semantic segmentation on the synthetic image 3502 to detect a lighting artifact where a light appearance is rendered in mid-air. For example, considering the image 4600 of FIG. 46 as the synthetic image 3502, the artifact detection module 3402 may perform semantic segmentation and other operations such as classification to determine whether the lampshade of the bedside luminaire 4506 appears lit, identify structures, such as the wall 4512, and detect whether a light appearance that is not on the wall 4512 or on other structures is rendered in the image 4600 as if the light appearance is on the wall 4512 or on other structures. Upon the detection of such a lighting artifact, the artifact detection module 3402 may output the artifact information 3504 indicating the particular lighting artifact (e.g., a ghost wall light effect).

In some example embodiments, object detection may be performed on the input image 3206 to detect a multi-light source luminaire (e.g., a multi-lamp luminaire). For example, semantic segmentation and classification may be performed to determine whether the input image 3206 includes a multi-light source luminaire and the number of light sources of the multi-light source luminaire. After the derived GAN 110 generates the synthetic image 3502 based on a desired light appearance that all of the light sources are off, for example, as indicated by the light appearance information 204 of FIG. 2, the artifact detection module 3402 may perform semantic segmentation and/or classification to determine the number of light sources of the multi-light source luminaire that are on despite the desired light appearance. If one or more of the light sources appear on in the synthetic image 3502, the artifact detection module 3402 may output the artifact information 3504 indicating the particular lighting artifact (e.g., a failure to turn off all light sources light effect).

In some alternative embodiments, the artifact detection system 3500 may include other modules without departing from the scope of this disclosure. In some alternative embodiments, the artifact detection system 3500 may detect lighting artifacts using other methods than described herein without departing from the scope of this disclosure. In some alternative embodiments, the artifact detection system 3500 may a combination of different methods to detect lighting artifacts and output the artifact information 3504 without departing from the scope of this disclosure.

Figure 36:
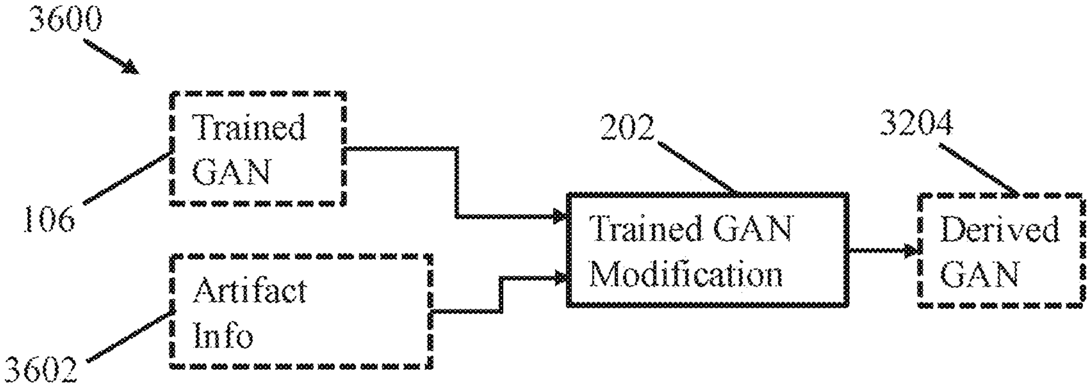
FIG. 36 illustrates a GAN modification system for deriving the derived GAN of FIG. 32 based on artifact information according to an example embodiment.

FIG. 36 illustrates a GAN modification system 3600 for deriving the derived GAN 3202 of FIG. 32 based on artifact information 3602 according to an example embodiment. In some example embodiments, the GAN modification system 3600 includes the GAN modification module 202 that modifies the trained GAN 106 to derive the derived GAN 3204 based on the artifact information 3602. In general, the GAN modification system 3600 corresponds to the GAN modification system 3300 of FIG. 33 where the artifact information 3602 of the GAN modification system 3600 corresponds to the GAN modification information 3302 of FIG. 33. In FIG. 36, the artifact information 3602 may include the artifact information 3406 provided by the artifact detection system 3400 of FIG. 34 or the artifact information 3504 provided by the artifact detection system 3500 of FIG. 35.

Referring to FIGS. 32 and 36, in some example embodiments, based on the artifact information 3602 that indicates one or more detected lighting artifacts in the input image 3206 or in a synthetic image generated based on the input image 3206, the GAN modification module 202 may derive the derived GAN 3204 from the trained GAN 106. To illustrate, as described above with respect to FIG. 32, causal relationships between particular neural units of the trained GAN 106 and lighting artifacts in synthetic images generated by the trained GAN 106 may be determined. Based on detected lighting artifact(s) and the known causal relationships between neural units and lighting artifacts, the GAN modification module 202 may derive the derived GAN 3204 from the trained GAN 106 by modifying relevant neural unit(s) of the trained GAN 106 that have a causal relationship with the detected lighting artifact(s) by changing value(s) of parameter(s) of the neural unit(s) such that the detected lighting artifact(s) is/are suppressed in the synthetic image 3210 or another synthetic image generated by the derived GAN 3204.

In some alternative embodiments, the GAN modification module 202 may derive the derived GAN 3204 from the derived GAN 110 described above with respect to FIG. 1. To illustrate, causal relationships between particular neural units of derived GAN 110 and lighting artifacts in synthetic images generated by the derived GAN 110 may be determined in the same manner as described above with respect to the trained GAN 106. Based on the known causal relationships and detected lighting artifact(s), the GAN modification module 202 may derive the derived GAN 3204 from the derived GAN 110 by modifying relevant neural unit(s) of the derived GAN 110 that have a causal relationship with the detected lighting artifact(s) by changing value(s) of parameter(s) of the neural unit(s) such that the detected lighting artifact(s) is/are suppressed in the synthetic image 3210 or another synthetic image generated by the derived GAN 3204.

In some alternative embodiments, the GAN modification module 202 may derive the derived GAN 3204 from a GAN other than the trained GAN 106 and derived GAN 110 without departing from the scope of this disclosure.

Figure 37:
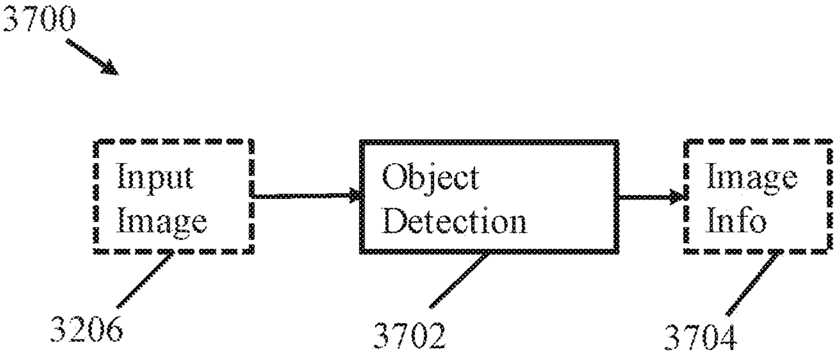
FIG. 37 illustrates an object detection system that generates image information according to an example embodiment.

FIG. 37 illustrates an object detection system 3700 that generates image information 3704 according to an example embodiment. The object detection system 3700 may include the object detection module 3702 that analyzes the input image 3206 and outputs image information 3704. The image information 3704 may indicate characteristics of the input image 3206 such as the type of room shown in the input image 3206, the type of luminaire, the number of luminaires, locations of objects including luminaires, etc. To illustrate, the object detection module 3702 may use semantic segmentation, object classification (e.g., using a convolutional neural network classifier), and/or other methods to detect and classify objects, the type of room, location of objects, etc. in the input image 3206. The object detection module 3702 may also use other information, such as Light Detection and Ranging (Lidar) data, that may be embedded in the input image 3206 or otherwise provided separately to the object detection module 3702 in analyzing the image and providing the image information 3704. The object detection module 3702 may also use other information such as from a Neural Radiance Field (NeRF)-based AI solution. The image information 3704 may be provided to the GAN modification system 3300 of FIG. 33 or to the GAN modification system 3800 of FIG. 38.

In some example embodiments, the object detection module 3702 may include a machine learning code for detecting odd-shaped ceiling luminaires that are not prevalent in a database of training images used in the training of the trained GAN 106, for example, shown in FIG. 34. Referring to FIGS. 34 and 37, because a lighting artifact is likely to be rendered in the synthetic image 3404 generated based on the input image 3206 that includes an odd-shaped ceiling luminaire, the image information 3704 provided by the object detection module 3702 may indicate the presence of an odd-shaped ceiling luminaire upon the detection of an odd-shaped ceiling luminaire. For example, the image information 3704 indicating the detection of an odd-shaped ceiling luminaire may be provided to the artifact detection module 3402 of FIG. 34 that performs artifact detection based on the high likelihood of the presence of a lighting artifact in the synthetic image 3404 of FIG. 34 because of the odd-shaped ceiling luminaire in the input image 3206. The image information 3704 indicating the detection of an odd-shaped ceiling luminaire may be provided to the artifact detection module 3402 in FIG. 35, and the artifact detection module 3402 in FIG. 35 may perform artifact detection in the synthetic image 3502 of FIG. 35 based on the high likelihood of the presence of a lighting artifact in the synthetic image 3502 of FIG. 35 because of the odd-shaped ceiling luminaire in the input image 3206.

Figure 38:
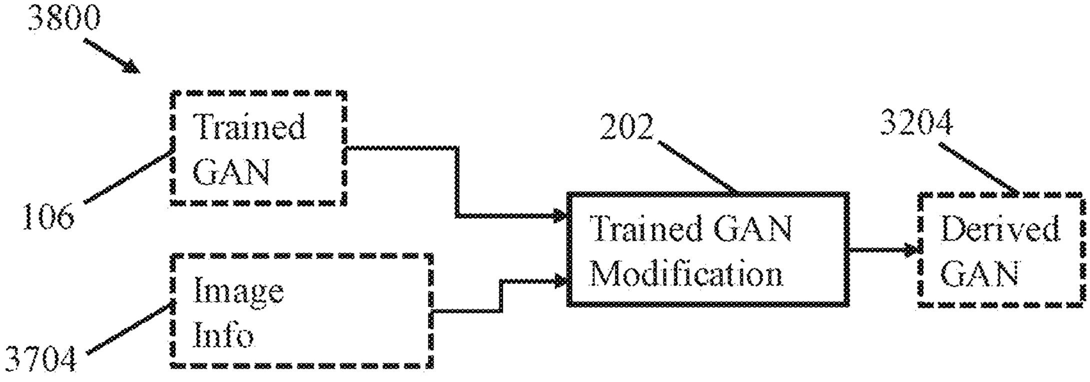
FIG. 38 illustrates a GAN modification system for deriving the derived GAN of FIG. 32 based on image information from the object detection system of FIG. 37 according to an example embodiment.

FIG. 38 illustrates a GAN modification system 3800 for deriving the derived GAN 3204 of FIG. 32 based on the image information 3704 from the object detection system 3700 of FIG. 37 according to an example embodiment. In some example embodiments, the GAN modification system 3800 includes the GAN modification module 202 that modifies the trained GAN 106 to derive the derived GAN 3204 based on the image information 3704. In general, the GAN modification system 3800 corresponds to the GAN modification system 3300 of FIG. 33 where the image information 3704 of the GAN modification system 3800 corresponds to the GAN modification information 3302 of FIG. 33.

Referring to FIGS. 32, 37, and 38, in some example embodiments, based on the image information 3704 that indicates characteristics of the input image 3206, the GAN modification module 202 may derive the derived GAN 3204 from the trained GAN 106. To illustrate, as described above with respect to FIG. 32, causal relationships between particular neural units of the trained GAN 106 and lighting artifacts in synthetic images generated by the trained GAN 106 may be determined. Based on known associations between characteristics of images and lighting artifacts and based on the known causal relationships between neural units and lighting artifacts, the GAN modification module 202 may derive the derived GAN 3204 from the trained GAN 106 by modifying relevant neural unit(s) of the trained GAN 106 that have a causal relationship with the lighting artifact(s) associated with characteristics of the input image 3206 as indicated by the image information 3704. The GAN modification module 202 may derive the derived GAN 3204 from the trained GAN 106 by changing value(s) of parameter(s) of the neural unit(s) of the trained GAN 106 such that lighting artifact(s) that are associated with characteristics of the input image 3206 (as indicated by the image information 3704) is/are suppressed in the synthetic image 3210 or another synthetic image generated by the derived GAN 3204.

In some cases, by deriving the derived GAN 3204 from the trained GAN 106 based on the image information 3704, lighting artifacts may be suppressed in the synthetic image 3210 without first generating another synthetic image to detect lighting artifacts and subsequently deriving the derived GAN 3204 based on the detected lighting artifacts.

In some alternative embodiments, the GAN modification module 202 may derive the derived GAN 3204 from the derived GAN 110 without departing from the scope of this disclosure. In some alternative embodiments, the GAN modification module 202 may derive the derived GAN 3204 from a GAN other than the trained GAN 106 and derived GAN 110 without departing from the scope of this disclosure.

Figure 39:
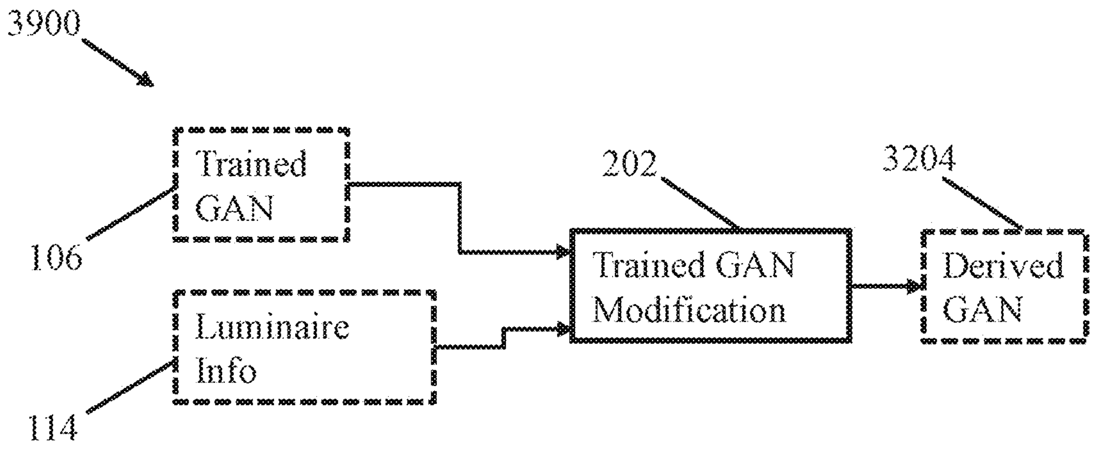
FIG. 39 illustrates a GAN modification system for deriving the derived GAN of FIG. 32 based on luminaire information according to an example embodiment.

FIG. 39 illustrates a GAN modification system 3900 for deriving the derived GAN 3204 of FIG. 32 based on the luminaire information 114 according to an example embodiment. In some example embodiments, the GAN modification system 3900 includes the GAN modification module 202 that modifies the trained GAN 106 to derive the derived GAN 3204 based on the luminaire information 114. In general, the GAN modification system 3900 corresponds to the GAN modification system 3300 of FIG. 33 where the luminaire information 114 of the GAN modification system 3900 corresponds to the GAN modification information 3302 of FIG. 33.

In some example embodiments, the luminaire information 114 may include information (e.g., a description or an image) that indicates a particular luminaire that the user wants inserted in a user image (e.g., the user image 112 of FIG. 1) as described above with respect to FIG. 1. For example, the input image 3206 in FIG. 32 may correspond to the input image 116 of FIG. 1 resulting from an insertion of a luminaire in the user image 112 based on the luminaire information 114. Because some lighting artifacts in a synthetic image may be associated with particular types of luminaires in the input image 3206, the GAN modification module 202 may derive the derived GAN 3204 by modifying the trained GAN 106 based on the known causal relationships between particular neural unit(s) of the trained GAN 106 and the lighting artifact(s) associated with the particular type of luminaire indicated by the luminaire information 114. The GAN modification module 202 may derive the derived GAN 3204 from the trained GAN 106 by changing value(s) of parameter(s) of the neural unit(s) of the trained GAN 106 such that lighting artifact(s) that are associated with the particular type of luminaire indicated by the luminaire information 114 is/are suppressed in the synthetic image 3210 or another synthetic image generated by the derived GAN 3204.

In some cases, by deriving the derived GAN 3204 from the trained GAN 106 based on the luminaire information 114, lighting artifacts may be suppressed in the synthetic image 3210 without first generating another synthetic image (e.g., the synthetic image 120 of FIG. 1) to detect lighting artifacts and subsequently deriving the derived GAN 3204 based on the detected lighting artifacts.

In some alternative embodiments, the GAN modification module 202 may derive the derived GAN 3204 from the derived GAN 110 without departing from the scope of this disclosure. In some alternative embodiments, the GAN modification module 202 may derive the derived GAN 3204 from a GAN other than the trained GAN 106 and derived GAN 110 without departing from the scope of this disclosure.

Figure 40:
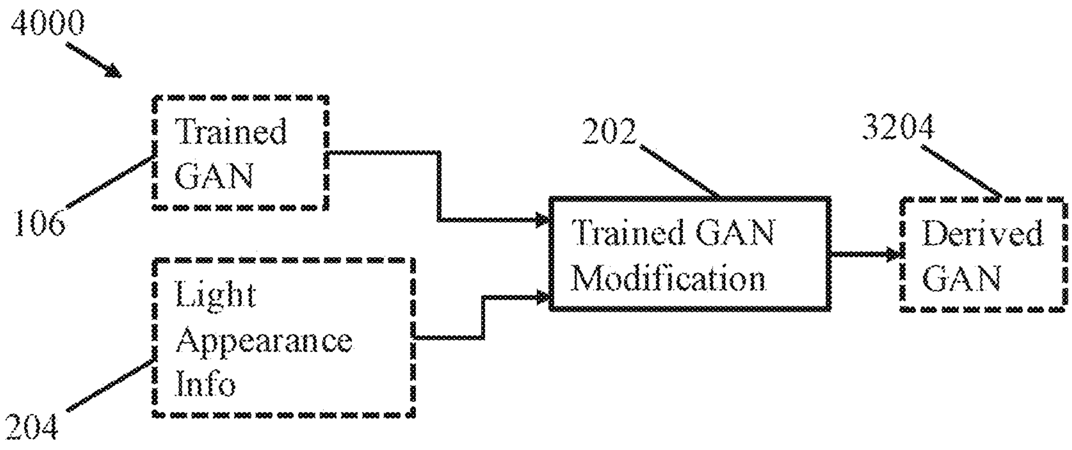
FIG. 40 illustrates a GAN modification system for deriving the derived GAN of FIG. 32 based on light appearance information according to an example embodiment.

FIG. 40 illustrates a GAN modification system 4000 for deriving the derived GAN 3204 of FIG. 32 based on the light appearance information 204 according to an example embodiment. In some example embodiments, the GAN modification system 4000 includes the GAN modification module 202 that modifies the trained GAN 106 to derive the derived GAN 3204 based on the light appearance information 204. In general, the GAN modification system 4000 corresponds to the GAN modification system 3300 of FIG. 33 where the light appearance information 204 of the GAN modification system 4000 corresponds to the GAN modification information 3302 of FIG. 33.

As described above with respect to FIG. 32, associations between desired light appearances and lighting artifacts in synthetic images may be determined, and the GAN modification module 202 may derive the derived GAN 3204 from the trained GAN 106 based on the known association between a desired light appearance indicated by the light appearance information 204 and a lighting artifact such that the lighting artifact is suppressed in the synthetic image 3210 generated by the derived GAN 3204.

In some example embodiments, the GAN modification module 202 may derive the derived GAN 3204 from the trained GAN 106 based on a desired light appearance indicated by the light appearance information 204 such that the synthetic image 3210 includes the desired light appearance as described with respect to the GAN modification system 200 of FIG. 2 in addition to suppressing lighting artifacts associated with the desired light appearance. For example, the GAN modification module 202 may change value(s) of parameter(s) of one or more neural unit of the trained GAN 106 with respect to rendering the desired light appearance in the synthetic image 3210 and may change value(s) of parameter(s) of other one or more neural unit of the trained GAN 106 with respect to suppressing the lighting artifact associated with the desired light appearance. As another example, the GAN modification module 202 may change value(s) of parameter(s) of one or more neural unit of the trained GAN 106 with respect to both rendering the desired light appearance in the synthetic image 3210 and suppressing the lighting artifact associated with the desired light appearance.

In some alternative embodiments, the GAN modification module 202 may derive the derived GAN 3204 from the derived GAN 110 without departing from the scope of this disclosure. In some alternative embodiments, the GAN modification module 202 may derive the derived GAN 3204 from a GAN other than the trained GAN 106 and derived GAN 110 without departing from the scope of this disclosure.

Figure 41:
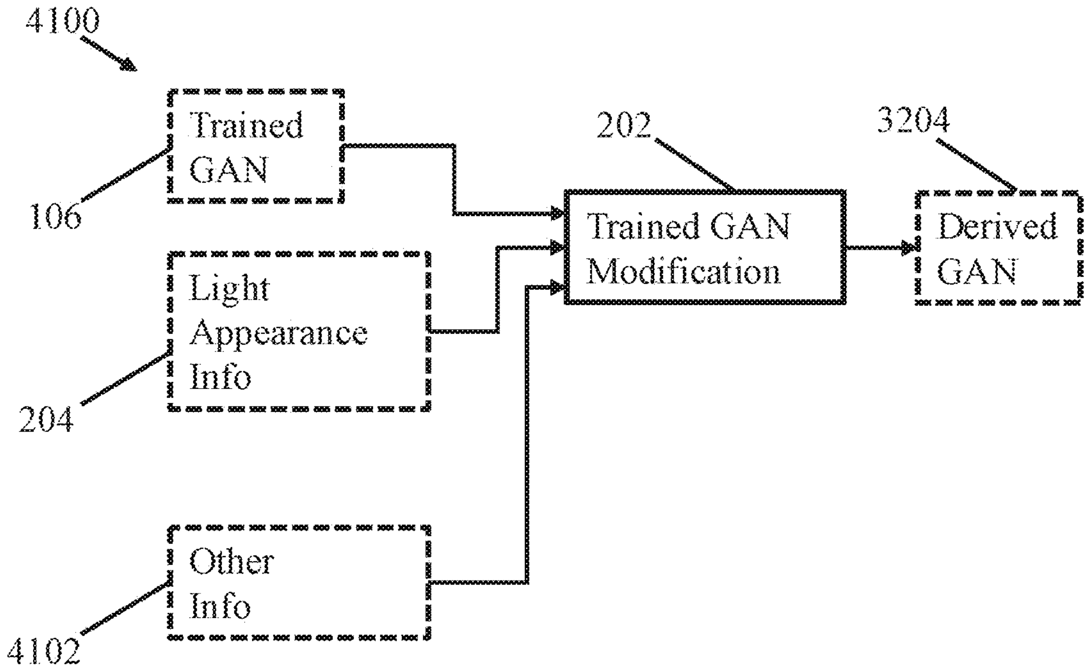
FIG. 41 illustrates a GAN modification system for deriving the derived GAN of FIG. 32 based on light appearance information and other information according to an example embodiment.

FIG. 41 illustrates a GAN modification system 4100 for deriving the derived GAN 3204 of FIG. 32 based on light appearance information 204 and other information 4102 according to an example embodiment. In general, the GAN modification system 4100 corresponds to the GAN modification system 3300 of FIG. 33 where the light appearance information 204 and the other information 4102 of the GAN modification system 4100 correspond to the GAN modification information 3302 of FIG. 33.

In some example embodiments, the other information 4102 may be the luminaire information 114 described with respect to FIG. 39, and the GAN modification system 4100 may modify the trained GAN 106 to derive the derived GAN 3204 based on the light appearance information 204 as described with respect to the GAN modification system 4000 of FIG. 40 and based on the luminaire information 114 as described with respect to the GAN modification system 3900 of FIG. 39. If the desired light appearance (e.g., a narrow beam) indicated by the light appearance information 204 and the type of luminaire (e.g., a spotlight luminaire) indicated by the luminaire information 114 together are associated with a known lighting artifact in synthetic images, for example, determined during testing, the GAN modification system 4100 may derive the derived GAN 3204 by modifying one or more neural units of the trained GAN 106 that have a causal relationship with the particular lighting artifact.

In some example embodiments, the other information 4102 may be the image information 3704 described with respect to FIGS. 37 and 38, and the GAN modification system 4100 may modify the trained GAN 106 to derive the derived GAN 3204 based on the light appearance information 204 as described with respect to the GAN modification system 4000 of FIG. 40 and based on the image information 3704 as described with respect to the GAN modification system 3800 of FIG. 38.

In some alternative embodiments, the other information 4102 may include information other than the luminaire information 114 and the image information 3704 without departing from the scope of this disclosure. In some alternative embodiments, the GAN modification module 202 may derive the derived GAN 3204 from the derived GAN 110 without departing from the scope of this disclosure. In some alternative embodiments, the GAN modification module 202 may derive the derived GAN 3204 from a GAN other than the trained GAN 106 and derived GAN 110 without departing from the scope of this disclosure.

Figure 42:
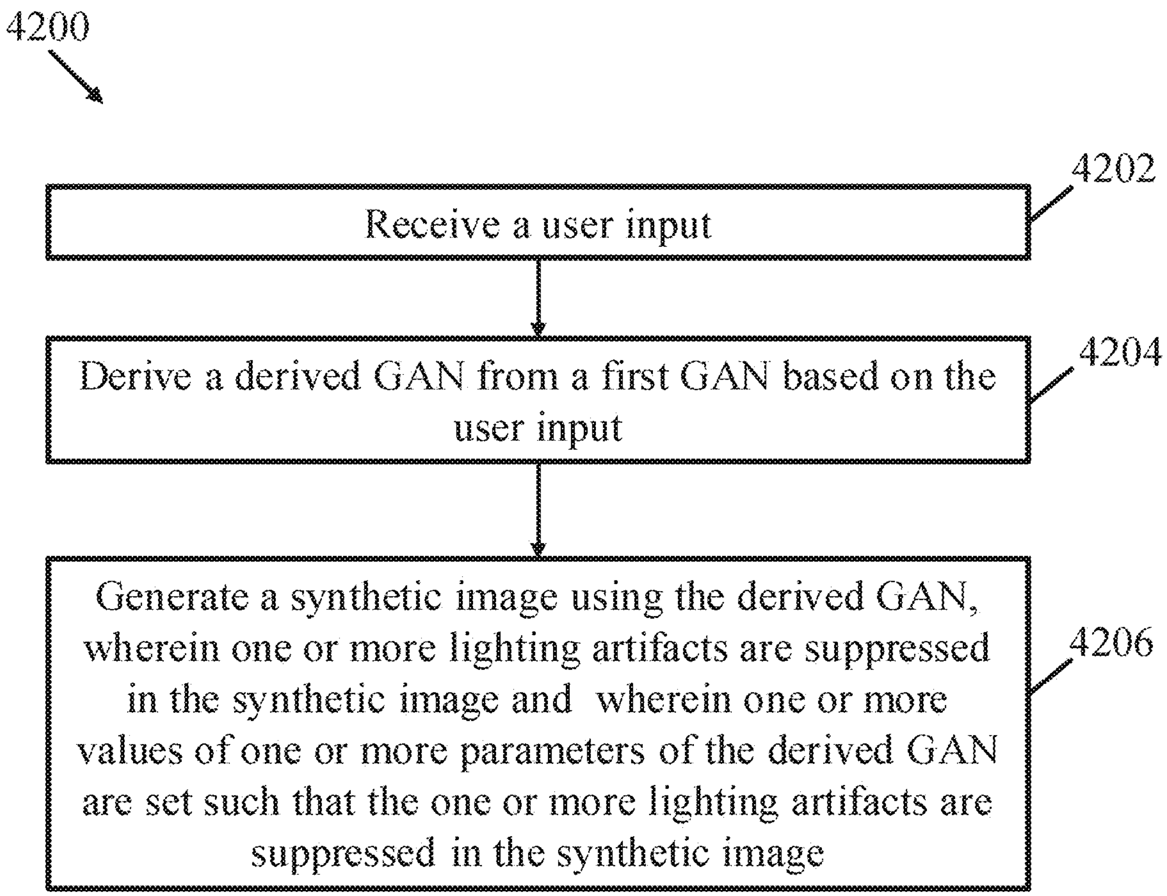
FIG. 42 illustrates a lighting artifact suppressing lighting virtualization method according to an example embodiment.

FIG. 42 illustrates a lighting artifact suppressing lighting virtualization method 4200 according to an example embodiment. Referring to FIGS. 32-42, in some example embodiments, the method 4200 includes, at step 4202, receiving user input. The user input may include an image. For example, the user device 3102 may receive the user input. The user input may include a user image such as the user image 112 described above with respect to FIG. 1 or an edited image such as the input image 116 of FIG. 1. In some cases, the user input may include the input image 3206 described above with respect to FIG. 32. In some cases, the user input may include a synthetic image such as, for example, the synthetic image 120 of FIG. 1, the synthetic image 124 of FIG. 1, the synthetic image 3404 of FIG. 34, or the synthetic image 3502 of FIG. 35. The user input may include an image of an indoor space (e.g., a kitchen, a dining room, a bedroom, a bathroom, a hall, a hallway, a factory, etc.) or an outdoor space (e.g., a parking lot, s sports arena, etc.).

In some example embodiments, instead of an image, the user input may include a description of a space such as a room, and an image may be retrieved based on the description, for example, a database on images. For example, the description may be a detailed description that indicates, for example, a type of room, structures (e.g., walls, windows, etc.) and/or objects (e.g., furniture, luminaires, etc.) in the room, type(s) of luminaire, light appearance, lighting condition (e.g., daytime, nighttime, brightness, automatic window shade positions, etc.). A description with respect to one or more luminaires may be the luminaire information 114 described above with respect to FIGS. 1 and 39, and a description with respect to light appearance may be the light appearance information 204 described above with respect to FIGS. 2 and 40. Alternatively, the description may be a general description such as a request for a type of room (e.g., a kitchen, a bedroom, a reading room, etc.) or a reference to a published image (e.g., a celebrity's house). The user device 3102 may retrieve an image based on the description provided by a user.

In some example embodiments, at step 4204, the method 4200 may include deriving derived GAN 3204 from a first GAN based on the user input. For example, the first GAN may be the trained GAN 106, the derived GAN 110, or another GAN as described above, for example, with respect to FIG. 32-41. The user device 3102 or the server 3104 of FIG. 31 may derive the derived GAN 3204 from the trained GAN 106, from the derived GAN 110, or from another GAN.

In some example embodiments, at step 4206, the method 4200 may include generating a synthetic image 3210 using the derived GAN 3204, where one or more lighting artifacts are suppressed in the synthetic image 3210. One or more values of one or more parameters of the derived GAN 3204 are set such that the one or more lighting artifacts are suppressed in the synthetic image 3210 as described above with respect to FIG. 32. As used in this description, suppress, suppressed, or suppressing as used in herein with respect to a lighting artifact in general refers to fully preventing the lighting artifact from appearing in a synthetic image or to mitigating or otherwise reducing the prominence or visual effect of the lighting artifact in the synthetic image.

In some example embodiments, the method 4200 may include deriving multiple derived GANs including the derived GAN 3204, where the multiple derived GANs have different values of parameters of the derived GANs from each other. As such, the multiple derived GANs may generate synthetic images that vary from each other. The different synthetic images may be presented to the user for the user to select the "best" synthetic image.

In some example embodiments, the method 4200 may include other steps without departing from the scope of this disclosure.

Figure 43:
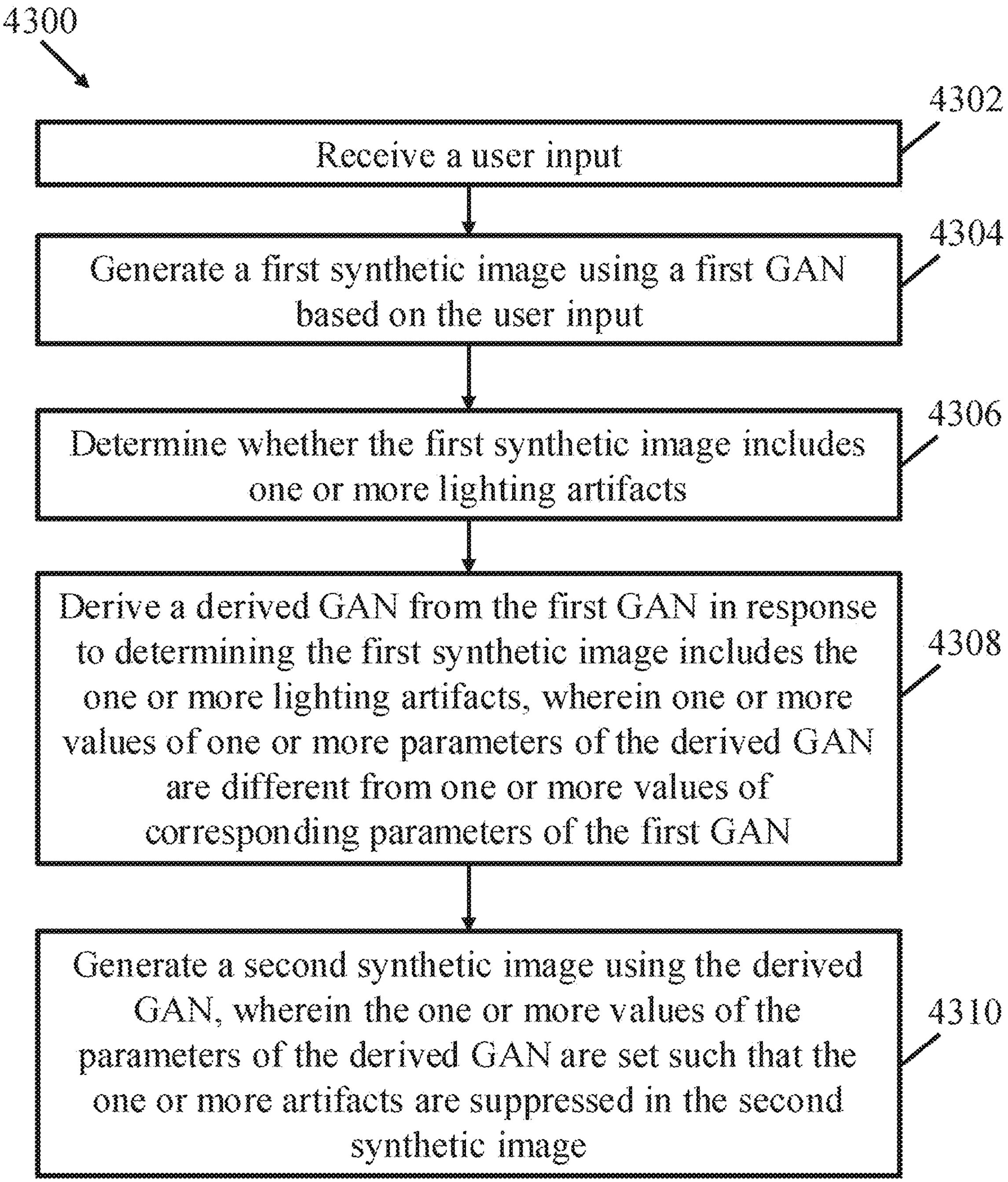
FIG. 43 illustrates a lighting artifact suppressing lighting virtualization method that is based on lighting artifact detection according to an example embodiment.

FIG. 43 illustrates a lighting artifact suppressing lighting virtualization method 4300 that is based on lighting artifact detection according to an example embodiment. The user device 3102 or the server 3104 of FIG. 31 may execute the method 4400. Referring to FIGS. 32-41 and 43, in some example embodiments, the method 4300 includes, at step 4302, receiving user input. The user input may include an image. To illustrate, the user device 3102 may receive the user input. The user input may include a user image. For example, the user input may include the user image 112 described above with respect to FIG. 1 or an edited image such as the input image 116 of FIG. 1. In some cases, the user input may include a description as described above, for example, with respect to FIG. 42. In some cases, the user input may include the input image 3206 described above with respect to FIG. 32. The user input may include an image of an indoor space (e.g., a kitchen, a dining room, a bedroom, a bathroom, a hall, a hallway, a factory, etc.) or an outdoor space (e.g., a parking lot, s sports arena, etc.).

In some example embodiments, instead of an image, the user input may include a description of a space such as a room, and an image may be retrieved based on the description, for example, a database on images. For example, the description may be a detailed description that indicates, for example, a type of room, structures (e.g., walls, windows, etc.) and/or objects (e.g., furniture, luminaires, etc.) in the room, type(s) of luminaire, light appearance, lighting condition (e.g., daytime, nighttime, brightness, etc.). A description with respect to one or more luminaires may be the luminaire information 114 described above with respect to FIGS. 1 and 39, and a description with respect to light appearance may be the light appearance information 204 described above with respect to FIGS. 2 and 40. Alternatively, the description may be a general description such as a request for a type of room (e.g., a kitchen, a bedroom, a reading room, etc.) or a reference to a published image (e.g., a celebrity's house). The user device 3102 may retrieve an image based on the description provided by a user.

In some example embodiments, at step 4304, the method 4300 may include generating a first synthetic image using a first GAN based on the user input. For example, the first GAN may be the trained GAN 106 and the first synthetic image may be the synthetic image 3404 shown in FIG. 34. As another example, the first GAN may be the derived GAN 110 and the first synthetic image may be the synthetic image 3502 shown in FIG. 35.

In some example embodiments, at step 4306, the method 4300 may include determining whether the first synthetic image includes one or more lighting artifacts. To illustrate, at step 4304, upon determining that the user input includes an image with a multi-light source luminaire, for example, by performing object detection, the derived GAN 110 may generate the synthetic image 3502 shown in FIG. 35, where the derived GAN 110 is configured to render a light appearance in the synthetic image 3502 with all light sources of the multi-light source luminaire being off (or on). At step 4306, a determination is made whether all light sources of the multi-light source luminaire are off (or on) in the synthetic image 3502 as expected. One or more of the light sources of the multi-light source luminaire as rendered in the synthetic image 3502 being on (or off) is detected as a lighting artifact. For example, the user device 3102 or the server 3104 of FIG. 31 may execute the artifact detection module 3402 to detect lighting artifact(s) in the synthetic image 3404 as described with respect to FIG. 34 or in the synthetic image 3502 as described with respect to FIG. 35. The artifact information 3406 or the artifact information 3504 may be produced from the execution of the artifact detection module 3402 as described with respect to FIGS. 34 and 35. The user device 3102 or the server 3104 of FIG. 31 may determine whether the first synthetic image includes one or more lighting artifacts.

In some example embodiments, at step 4308, the method 4300 may include deriving the derived GAN 3204 from the first GAN in response to determining the first synthetic image includes the one or more lighting artifacts, where one or more values of one or more parameters of the derived GAN 3204 are different from one or more values of corresponding parameters of the first GAN. For example, the derived GAN 3204 may be derived by executing the GAN modification system 3600 of FIG. 36. The user device 3102 or the server 3104 of FIG. 31 may derive the derived GAN 3204 from the trained GAN 106, from the derived GAN 110, or from another GAN. At step 4310, the method 4300 may include generating a second synthetic image using the second derived GAN 3204. One or more values of the parameters of the derived GAN 3204 are set such that the one or more artifacts are suppressed in the second synthetic image, for example, in contrast to the one or more lighting artifacts in the first synthetic image.

In some example embodiments, the method 4300 may include deriving multiple derived GANs including the derived GAN 3204, where the multiple derived GANs have different values of parameters of the derived GANs from each other. As such, the multiple derived GANs may generate synthetic images that vary from each other. The different synthetic images may be presented to the user for the user to select the "best" synthetic image.

In some example embodiments, the method 4300 may correspond to the method 4200 with the addition of the steps 4304, 4306. In some example embodiments, the method 4300 may include other steps without departing from the scope of this disclosure.

Figure 44:
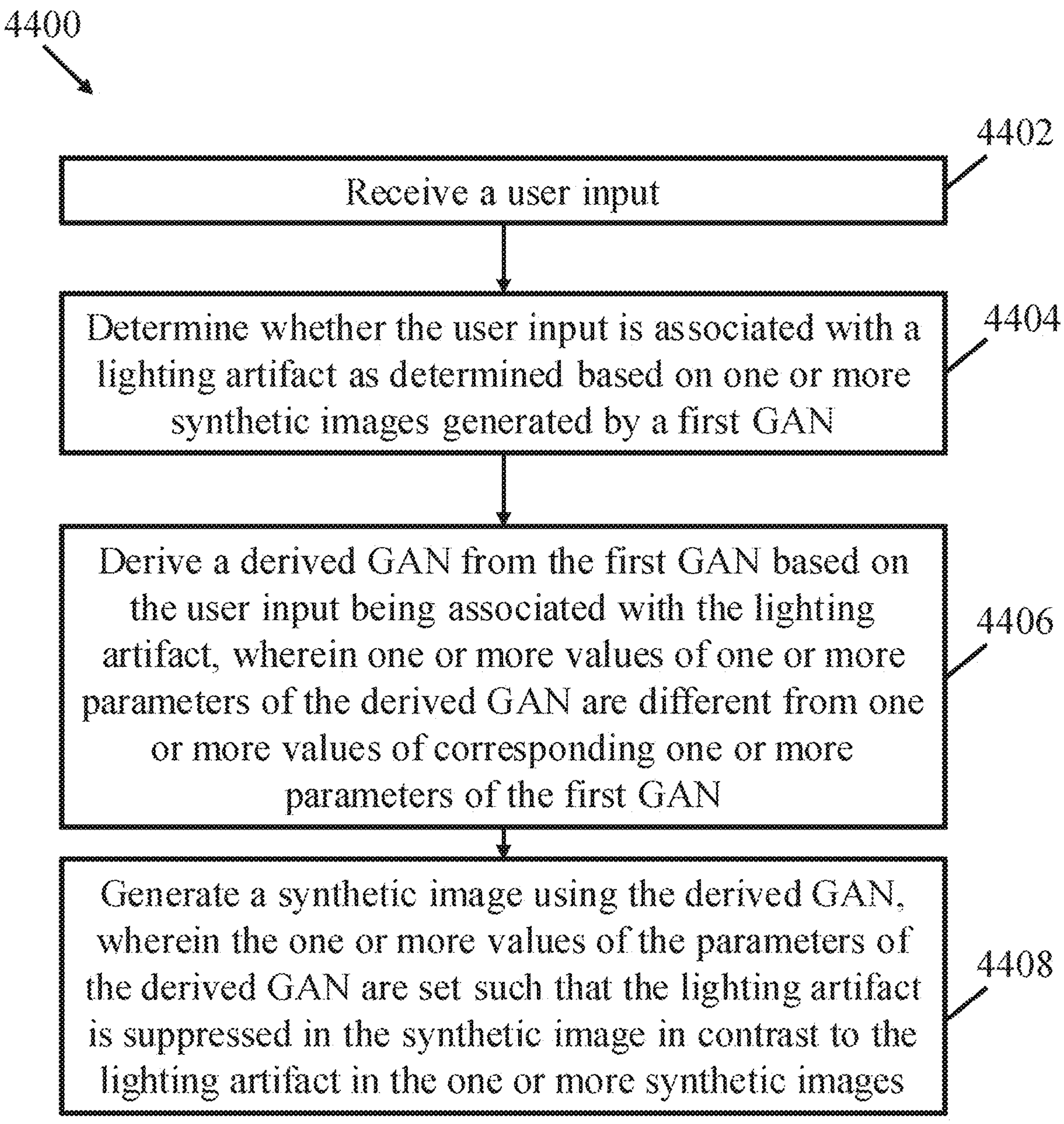
FIG. 44 illustrates a lighting artifact suppressing lighting virtualization method that is based on user input according to an example embodiment.

FIG. 44 illustrates a lighting artifact suppressing lighting virtualization method 4400 that is based on user input according to an example embodiment. The user device 3102 or the server 3104 of FIG. 31 may execute the method 4400. In general, the method 4400 determines, based on a user input, whether a lighting artifact is likely to appear in a synthetic image. Referring to FIGS. 32-41 and 44, in some example embodiments, the method 4400 includes, at step 4402, receiving user input. To illustrate, the user device 3102 may receive the user input. The user input may include an image, such as the input image 3206 described above with respect to FIG. 32. Alternatively, instead of an image, the user input may include a description of a space such as a room, and an image may be retrieved based on the description, for example, a database on images. The user input may also include the luminaire information 114 described above with respect to FIGS. 1 and 39 and/or the light appearance information 204 described above with respect to FIGS. 2 and 40. Alternatively, the description may be a general description such as a request for a type of room (e.g., a kitchen, a bedroom, a reading room, etc.) or a reference to a published image (e.g., a celebrity's house). The user device 3102 may retrieve an image based on the description provided by a user.

In some example embodiments, at step 4404, the method 4400 may include determining whether the user input is associated with a lighting artifact as determined based on one or more synthetic images generated by a first GAN. For example, in a testing environment, observation may have been made that a particular lighting artifact appears in synthetic images generated, for example, by the trained GAN 106 or the derived GAN 110, whenever an input image includes a particular light fixture, a particular light fixture in a particular type of room (e.g., a table luminaire in a kitchen), or a particular light fixture along with a particular desired light appearance. To illustrate, the object detection system 3700 of FIG. 37 may generate the image information 3704 about, for example, the input image 3206, and the desired light appearance may be available from the light appearance information 204.

In some example embodiments, at step 4406, the method 4400 may include deriving the derived GAN 3204 from the first GAN based on the user input being associated with the lighting artifact. For example, the first GAN may be the trained GAN 106 or the derived GAN 110. One or more values of the parameters of the derived GAN 3204 are different from one or more values of corresponding one or more parameters of the first GAN. For example, the derived GAN 3204 may be derived by executing the GAN modification system 3800 of FIG. 38 or the GAN modification system 4100 of FIG. 41. The user device 3102 or the server 3104 of FIG. 31 may derive the derived GAN 3204 from the trained GAN 106, from the derived GAN 110, or from another GAN.

At step 4408, the method 4400 may include generating the synthetic image 3210 using the derived GAN 3204, where the one or more values of the parameters of the derived GAN 3204 are set such that the lighting artifact is suppressed in the synthetic image 3210, for example, in contrast to the lighting artifact in the one or more synthetic images.

In some example embodiments, the method 4400 may include deriving multiple derived GANs including the derived GAN 3204, where the multiple derived GANs have different values of parameters of the derived GANs from each other. As such, the multiple derived GANs may generate synthetic images that vary from each other. The different synthetic images may be presented to the user for the user to select the "best" synthetic image. The user's selection may be stored as ground-truth label of the optimal trade-off between displaying the light effect and minimizing the lighting artifacts and then be used for fine-tuning the GAN for future inferences.

In some example embodiments, the method 4400 may correspond to the method 4200 with the addition of step 4404 and step 4406 corresponding to step 4204. In some example embodiments, the method 4400 may include other steps without departing from the scope of this disclosure.

Although FIGS. 32-47 are described with respect to one or more GANs, in some alternative embodiments, the system, modules, and methods of FIGS. 32-47 may be based on other AI models (e.g., variational autoencoder models) and other generative models instead of or in addition to GAN models without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the scope of the following claims, the scope of which are to be accorded the broadest interpretation so as to encompass modifications and equivalent structures.

What is claimed is:

1. A computer implemented lighting appearance virtualization method, comprising:

receiving a user image of an area, luminaire information of one or more luminaires including a luminaire, and light appearance information;

generating, using a trained generative adversarial network (GAN), a first synthetic image of the area based on the user image and the luminaire information, wherein the first synthetic image shows the luminaire in the area; and generating, using a derived GAN, a second synthetic image of the area based on the first synthetic image, wherein the second synthetic image of the area shows the luminaire and a synthetic light appearance associated with the luminaire in the area, wherein the light appearance information is related to one or more parameters of the trained GAN, wherein the trained GAN is modified to derive the derived GAN, wherein one or more values of one or more parameters of the derived GAN are different from one or more values of the one or more parameters of the trained GAN, wherein the one or more parameters of the trained GAN correspond to the one or more parameters of the derived GAN, and wherein the synthetic light appearance depends on the one or more values of the one or more parameters of the derived GAN, wherein the trained GAN is selected from multiple trained GANs based on the light appearance information, wherein the trained GAN is a first trained GAN of the multiple trained GANs that is trained using first training images that include a first light appearance and that exclude a second light appearance and wherein a second trained GAN of the multiple trained GANs is trained using second training images that include the second light appearance and that exclude the first light appearance.

2. The computer implemented lighting appearance virtualization method of claim 1, wherein the second synthetic image of the area is generated in response to receiving an approval of the first synthetic image of the area from a user.

3. The computer implemented lighting appearance virtualization method of claim 1, wherein the one or more values of the one or more parameters of the trained GAN are modified based on the light appearance information to derive the derived GAN from the trained GAN such that the synthetic light appearance corresponds to a desired light appearance indicated by the light appearance information.

4. The computer implemented lighting appearance virtualization method of claim 3, wherein the light appearance information indicates at least one of a light brightness level, a correlated color temperature, a color, a beam size, a polarization, a beam shape, a micro-shadow level, and an edge sharpness level.

5. The computer implemented lighting appearance virtualization method of claim 1, wherein one or more lighting artifacts are suppressed in the second synthetic image.

6. The computer implemented lighting appearance virtualization method of claim 1, wherein the first light appearance and the second light appearance indicate different ranges of beam sizes and/or beam shapes from each other.

7. The computer implemented lighting appearance virtualization method of claim 1, wherein the one or more values of the one or more parameters of the derived GAN are set such that the synthetic light appearance shows a brightness level that is higher than the trained GAN is configured to generate in the first synthetic image of the area.

8. The computer implemented lighting appearance virtualization method of claim 1, further comprising determining an input noise vector by performing a GAN inversion based on an input image of the area and the trained GAN, wherein the input image shows the luminaire in the area, wherein the input image of the area is generated from the user image of the area and the luminaire information of the luminaire, and wherein the first synthetic image is generated using the input noise vector as an input of the trained GAN.

9. The computer implemented lighting appearance virtualization method of claim 1, wherein the one or more parameters of the derived GAN include one or more weights of a neural unit of a convolutional layer of the derived GAN.

10. The computer implemented lighting appearance virtualization method of claim 1, wherein the one or more parameters of the derived GAN include one or more input parameters provided to one or more adaptive instance normalization (AdaIN) layers of the derived GAN or to one or more affine transformation layers of the derived GAN, wherein the one or more AdaIN layers each have an output that is provided to a respective convolutional layer of the derived GAN.

11. The computer implemented lighting appearance virtualization method of claim 1, further comprising:

generating, using a second derived GAN, a third synthetic image of the area showing the luminaire, the second luminaire, and a second synthetic light appearance, wherein the trained GAN is modified based on the light appearance information to derive the second derived GAN, wherein one or more values of one or more parameters of the second derived GAN are different from the one or more values of the one or more parameters of the trained GAN and from the one or more values of the one or more parameters of the derived GAN, wherein the one or more parameters of the trained GAN correspond to the one or more parameters of the second derived GAN, wherein the second synthetic light appearance depends on the one or more values of the one or more parameters of the second derived GAN, wherein the trained GAN is modified based on the light appearance information to derive the derived GAN, and wherein the first synthetic image of the area and the second synthetic image of the area each include the second luminaire in the area; and generating a combined synthetic image of the area that includes a portion of the second synthetic image that includes the luminaire and the synthetic light appearance and a portion of the third synthetic image that includes second luminaire and the second synthetic light appearance.

12. The computer implemented lighting appearance virtualization method of claim 1, further comprising:

generating, using the trained GAN, a third synthetic image of the area based on the user image and luminaire information of a second luminaire, wherein the third synthetic image shows the second luminaire in the area, wherein the luminaire information of the one or more luminaires includes the luminaire information of the second luminaire, and wherein the luminaire and the second luminaire are different types of luminaires from each other;

generating, using a second derived GAN, a fourth synthetic image of the area based on the third synthetic image, wherein the fourth synthetic image of the area shows the second luminaire and a second synthetic light appearance associated with the second luminaire in the area, wherein the second light appearance information is related to the one or more parameters of the trained GAN, wherein the trained GAN is modified based on the second light appearance information to derive the second derived GAN, wherein the trained GAN is modified based on the light appearance information to derive the derived GAN, wherein one or more values of one or more parameters of the second derived GAN are different from the one or more values of the one or more parameters of the trained GAN, wherein the one or more parameters of the trained GAN correspond to the one or more parameters of the second derived GAN, and wherein the second synthetic light appearance depends on the one or more values of the one or more parameters of the second derived GAN; and generating a combined synthetic image of the area that includes a portion of the second synthetic image that includes the luminaire and the synthetic light appearance and a portion of the fourth synthetic image that includes second luminaire and the second synthetic light appearance.

13. A computer implemented lighting appearance virtualization method, comprising:

receiving a user image of an area, luminaire information of one or more luminaires including a luminaire, and light appearance information;

generating, using a trained generative adversarial network (GAN), a first synthetic image of the area based on the user image and the luminaire information, wherein the first synthetic image shows the luminaire in the area; and generating, using a derived GAN, a second synthetic image of the area based on the first synthetic image, wherein the second synthetic image of the area shows the luminaire and a synthetic light appearance associated with the luminaire in the area, wherein the light appearance information is related to one or more parameters of the trained GAN, wherein the trained GAN is modified to derive the derived GAN, wherein one or more values of one or more parameters of the derived GAN are different from one or more values of the one or more parameters of the trained GAN, wherein the one or more parameters of the trained GAN correspond to the one or more parameters of the derived GAN, and wherein the synthetic light appearance depends on the one or more values of the one or more parameters of the derived GAN, wherein the trained GAN is trained such that the synthetic light appearance in the second synthetic image of the area depends on at least one of a type of the luminaire and a location of the luminaire in the area as shown in the second synthetic image of the area.

14. The computer implemented lighting appearance virtualization method of claim 13, wherein the second synthetic image of the area is generated in response to receiving an approval of the first synthetic image of the area from a user.

15. The computer implemented lighting appearance virtualization method of claim 13, wherein the one or more values of the one or more parameters of the trained GAN are modified based on the light appearance information to derive the derived GAN from the trained GAN such that the synthetic light appearance corresponds to a desired light appearance indicated by the light appearance information.

16. The computer implemented lighting appearance virtualization method of claim 15, wherein the light appearance information indicates at least one of a light brightness level, a correlated color temperature, a color, a beam size, a polarization, a beam shape, a micro-shadow level, and an edge sharpness level.

17. The computer implemented lighting appearance virtualization method of claim 13, wherein one or more lighting artifacts are suppressed in the second synthetic image.

18. The computer implemented lighting appearance virtualization method of claim 13, wherein the first light appearance and the second light appearance indicate different ranges of beam sizes and/or beam shapes from each other.

19. The computer implemented lighting appearance virtualization method of claim 13, wherein the one or more values of the one or more parameters of the derived GAN are set such that the synthetic light appearance shows a brightness level that is higher than the trained GAN is configured to generate in the first synthetic image of the area.

20. A computer implemented lighting appearance virtualization method, comprising:

receiving a user image of an area, luminaire information of one or more luminaires including a luminaire, and light appearance information;

generating, using a trained generative adversarial network (GAN), a first synthetic image of the area based on the user image and the luminaire information, wherein the first synthetic image shows the luminaire in the area;

generating, using a derived GAN, a second synthetic image of the area based on the first synthetic image, wherein the second synthetic image of the area shows the luminaire and a synthetic light appearance associated with the luminaire in the area, wherein the light appearance information is related to one or more parameters of the trained GAN, wherein the trained GAN is modified to derive the derived GAN, wherein one or more values of one or more parameters of the derived GAN are different from one or more values of the one or more parameters of the trained GAN, wherein the one or more parameters of the trained GAN correspond to the one or more parameters of the derived GAN, and wherein the synthetic light appearance depends on the one or more values of the one or more parameters of the derived GAN; and receiving luminaire information of a second luminaire, wherein the first synthetic image of the area is generated further based on the luminaire information of the second luminaire such that the first synthetic image shows the luminaire and the second luminaire in the area and wherein the second synthetic image of the area shows the luminaire, the second luminaire, the synthetic light appearance associated with the luminaire, and a second synthetic light appearance associated with the second luminaire.

* * * * *